(12) United States Patent
Tsuchiya et al.

(10) Patent No.: US 9,475,929 B2
(45) Date of Patent: Oct. 25, 2016

(54) FIBER-REINFORCED THERMOPLASTIC RESIN COMPOSITION, REINFORCING FIBER BUNDLE, AND PROCESS FOR PRODUCTION OF FIBER-REINFORCED THERMOPLASTIC RESIN COMPOSITION

(75) Inventors: Atsuki Tsuchiya, Ehime (JP); Hideaki Sasaki, Nagoya (JP); Masato Honma, Otsu (JP); Ichiji Kageishi, Ichihara (JP); Yumi Ando, Ichihara (JP)

(73) Assignee: TORAY INDUSTRIES, INC., Tokyo (JP)

(*) Notice: Subject to any disclaimer, the term of this patent is extended or adjusted under 35 U.S.C. 154(b) by 990 days.

(21) Appl. No.: 13/575,749

(22) PCT Filed: Jan. 26, 2011
(Under 37 CFR 1.47)

(86) PCT No.: PCT/JP2011/051398
§ 371 (c)(1),
(2), (4) Date: Mar. 15, 2013

(87) PCT Pub. No.: WO2011/093297
PCT Pub. Date: Aug. 4, 2011

(65) Prior Publication Data
US 2013/0234361 A1    Sep. 12, 2013

(30) Foreign Application Priority Data

Jan. 29, 2010  (JP) .................. 2010-018295
Jan. 29, 2010  (JP) .................. 2010-018296

(51) Int. Cl.
*C08K 3/04*    (2006.01)
*C08K 7/06*    (2006.01)
(Continued)

(52) U.S. Cl.
CPC ............... *C08L 23/26* (2013.01); *C08J 5/042* (2013.01); *C08L 51/06* (2013.01); *C08L 77/00* (2013.01); *C08L 81/04* (2013.01); *C08J 2333/10* (2013.01)

(58) Field of Classification Search
USPC .................... 524/522; 428/299.1, 297.4
See application file for complete search history.

(56) References Cited

U.S. PATENT DOCUMENTS 3,081,143 A  *  3/1963  Segro et al. .................. 8/116.1
4,433,020 A     2/1984  Narukawa et al.
(Continued)

FOREIGN PATENT DOCUMENTS

GB    1383212 A    2/1975
JP    58-69047 A    4/1983
(Continued)

OTHER PUBLICATIONS

Ekstrand, K., I.E. Ruyter, and H. Wellendorf, Carbon/graphite fiber reinforced poly(methyl methacrylate): Properties under dry and wet conditions, J. of Biomedical Research, vol. 21 (1987), pp. 1065-1080.*
(Continued)

*Primary Examiner* — Vu A Nguyen
(74) *Attorney, Agent, or Firm* — Birch, Stewart, Kolasch & Birch, LLP

(57) ABSTRACT

The present invention relates to fiber-reinforced thermoplastic resin composition comprising 0.1 to 10 mass % of a (meth)acrylic-based polymer, 1 to 70 mass % of reinforcing fiber, and 20 to 98.9 mass % of thermoplastic resin, wherein the (meth)acrylic-based polymer has, in a side chain, at least one functional group selected from a hydroxyl group, a carboxyl group, an amide group, and an urea group, and has a cohesive energy density (CED) of 385 to 550 MPa. The present invention provides, particularly in the case of using a polyolefin-based resin as matrix resin, a fiber-reinforced thermoplastic resin composition and a reinforcing fiber bundle which have high adhesiveness and good mechanical characteristics.

8 Claims, 4 Drawing Sheets

(51) Int. Cl.
*C08L 33/06* (2006.01)
*C08L 33/10* (2006.01)
*C08L 23/26* (2006.01)
*C08J 5/04* (2006.01)
*C08L 77/00* (2006.01)
*C08L 81/04* (2006.01)
*C08L 51/06* (2006.01)

(56) References Cited

U.S. PATENT DOCUMENTS

2009/0004453 A1  1/2009  Murai et al.
2009/0143524 A1* 6/2009  Nakayama ............... C08J 5/042
                                                524/450

FOREIGN PATENT DOCUMENTS

| JP | 59-137573 A | 8/1984 |
| JP | 61-209940 A | 9/1986 |
| JP | 9-176923 A | 7/1997 |
| JP | 11-19998 A | 1/1999 |
| JP | 2003-261359 A | 9/2003 |
| JP | 2005-146431 A | 6/2005 |
| JP | 2009-74229 A | 4/2009 |
| JP | 2009-197359 A | 9/2009 |
| WO | WO 2007/037260 A1 | 4/2007 |
| WO | WO 2007/097436 A1 | 8/2007 |

OTHER PUBLICATIONS

Zhang, C., et al., Morphology and Electrical Properties of Short Carbon Fiber-Filled Polymer Blends: High-Density polyethylene/Poly (methyl methacrylate), J. of Applied Polymer Science, vol. 69 (1998), pp. 1813-1819.*
Machine translation of JP 2009-074229 A to Inoue.*
Machine translation of JP 2003-261359 A to Hayashi et al.*
Launay et al. Carbon, 2007, 45, 2859-2865.*
International Search Report for PCT/JP2011/051398 dated Apr. 26, 2011.
Japanese Office Action and English translation thereof, dated Aug. 12, 2014, for Japanese Application No. 2011-015036.

* cited by examiner

FIBER-REINFORCED THERMOPLASTIC RESIN COMPOSITION, REINFORCING FIBER BUNDLE, AND PROCESS FOR PRODUCTION OF FIBER-REINFORCED THERMOPLASTIC RESIN COMPOSITION

TECHNICAL FIELD

The present invention relates to a fiber-reinforced thermoplastic resin composition, particularly a fiber-reinforced thermoplastic resin composition using a polyolefin-based resin as a matrix resin, and a reinforcing fiber bundle. Furthermore, the present invention relates to a method for manufacturing said fiber-reinforced thermoplastic resin composition. More particularly, the present invention relates to a method for manufacturing said fiber-reinforced thermoplastic resin composition by a take-off manner.

BACKGROUND ART

Fiber-reinforced thermoplastic compositions in which reinforcing fibers are combined with resin are excellent in mechanical characteristics and dimension stability, and thus used in a wide variety of fields, such as automobiles, airplanes, electric/electronic devices, toys, and home electronics. Carbon fibers among other reinforcing fibers have attracted attention in recent years because of their light weight, high strength, and high stiffness.

Also, thermoplastic resins have attracted attention in recent years as matrix resins for fiber-reinforced thermoplastic resin compositions. Among others, polyolefin-based resins, particularly a polypropylene resin which is low in cost, low in specific gravity, and excellent in properties such as moldability and chemical resistance, have attracted attention.

However, the polyolefin-based resin is low in polarity, and its interface adhesiveness to reinforcing fibers is thus inferior. Therefore, attempts have been conducted to improve the interface adhesiveness between reinforcing fibers and their matrix resin by surface treatment of the reinforcing fibers, application of a sizing agent, and the like.

Patent Document 1 describes a carbon fiber covered with polyacrylic acid. Patent Document 2 discloses a reinforcing fiber covered with sodium polyacrylate and polyacrylamide. Patent Document 3 discloses a reinforcing fiber sizing agent that contains a polymer, (A), with a (meth)acrylic ester monomer, (a), unit in which an acryloyloxy group or a methacryloyloxy group is bound to a secondary carbon atom or a tertiary carbon atom. Patent Document 4 describes carbon fibers provided with a (meth)acrylic-based polymer having an aminoalkylene group in the side chain thereof or an oxazoline group-containing polymer. All these patent documents intend to improve the interface adhesiveness between a carbon fiber and a matrix resin by providing the carbon fiber with a polymer having an affinity for polyolefin resin, although in each case, the resulting interface adhesiveness is insufficient.

In addition, various investigations have been carried out to provide a method for manufacturing a fiber-reinforced thermoplastic resin composition.

Patent Document 4 discloses a method for manufacturing a fiber-reinforced thermoplastic resin, where a reinforcing fiber obtained by providing the reinforcing fiber with a predetermined polymer and a molten thermoplastic resin are blended together so that the reinforcing fiber, the polymer, and the thermoplastic resin can be combined together in a predetermined proportion.

Patent Document 5 discloses a method for manufacturing fiber-reinforced thermoplastic resin moldings using a carbon fiber having a mass-average fiber length of 0.5 to 10 mm, and an orientation parameter of −0.25 to 0.25, where the method includes: (I) a step of heat-melting a thermoplastic resin contained in a molding material; (II) a step of placing the molding material in a die; (III) a step of pressurizing the molding material in the die; (IV) a step of solidifying the molding material in the die; and (V) a step of opening the die to take out a fiber-reinforced thermoplastic resin from the die.

Patent document 6 discloses a method for manufacturing a sheet-shaped product, where a binder mainly containing a nonflammable fibrous material and a thermoplastic resin and serving as main component and a slurry liquid containing other predetermined components is supplied to a running or rotating meshed or porous substrate diagonally at an angle of 5 to 60 degrees with respect to the surface of the substrate, followed by dehydration and drying.

The manufacturing method disclosed in Patent Document 4 only applies a (meth)acrylic-based polymer component to a fiber-reinforced web. No consideration is given to productivity, such as take-off properties in subsequent steps. Improvements in the manufacturing method have been required for wide use as fiber-reinforced composite material.

Any of the manufacturing methods disclosed in Patent Documents 5 and 6 does not use any specific means for taking off a molding material, and thus requires much time and troublesome operations for its production. Improvements in the manufacturing method have been required for efficient production of fiber-reinforced thermoplastic resin compositions.

PRIOR ART DOCUMENTS

Patent Documents

Patent Document 1: Japanese Unexamined Patent Application Publication No. SHO 59-137573
Patent Document 2: Japanese Unexamined Patent Application Publication No. SHO 61-209940
Patent document 3: Japanese Unexamined Patent Application Publication No. 2005-146431
Patent document 4: WO 2007/37260
Patent document 5: WO 2007/97436
Patent Document 6: Japanese Unexamined Patent Application Publication No. SHO 58-69047

SUMMARY OF THE INVENTION

Problems to be Solved by the Invention

An object of the present invention is to provide a fiber-reinforced thermoplastic resin composition and a reinforcing fiber bundle, which are excellent in adhesiveness to a matrix resin, particularly adhesiveness between a polyolefin-based matrix resin and a reinforcing fiber.

Another object of the present invention is to provide a method for manufacturing a fiber-reinforced thermoplastic resin composition for obtaining a molded product having excellent mechanical characteristics.

Means of Solving the Problem

A first aspect of the invention proposed in the present application is a tuber-reinforced thermoplastic resin composition that contains 0.1 to 10 mass % of a (meth)acrylic-based polymer, 1 to 70 mass % of a reinforcing fiber, and 20 to 98.9 mass % of a thermoplastic resin, wherein the (meth)acrylic-based polymer contains, in its side chain, at least one functional group selected from a hydroxyl group, a carboxyl group, an amide group, and an urea group, and has a cohesive energy density (CED) of 385 to 550 MPa, which is calculated by the following equation:

$$CED=1.15\times\Sigma\{P(n)\times CE(n)\}/\Sigma\{P(n)\times M(n)\}$$

where assuming that the (meth)acrylic-based polymer contains m kinds of (meth)acrylic-based monomer units and that each of the (meth)acrylic-based monomer units is referred to as (meth)acrylic-based monomer unit (n) (n being an integer from 1 to m), CE(n) denotes the cohesive energy calculated from chemical structure CS(n) of (meth)acrylic-based monomer unit (n), M(n) denoting the molecular weight of (meth)acrylic-based monomer unit (n), and P(n) denoting the molar fraction of (meth)acrylic-based monomer unit (n) in the (meth)acrylic-based polymer so that $\Sigma P(n)=1$.

In addition, the first aspect of the invention proposed in the present application is a reinforcing fiber bundle in which a (meth)acrylic-based polymer is attached to reinforcing fibers, wherein the (meth)acrylic-based polymer contains, in its side chain, at least one functional group selected from a hydroxyl group, a carboxyl group, an amide group, and an urea group, the (meth)acrylic-based polymer having a cohesive energy density (CED) of 385 to 550 MPa as calculated by the equation given below, and the (meth)acrylic-based polymer being attached in an amount of 1 to 30 mass %;

$$CED=1.15\times\Sigma\{P(n)\times CE(n)\}/\Sigma\{P(n)\times M(n)\}$$

where assuming that the (meth)acrylic-based polymer contains m kinds of (meth)acrylic-based monomer units and that each of the (meth)acrylic-based monomer units is referred to as (meth)acrylic-based monomer unit (n) (n being an integer from 1 to m), CE(n) denotes the cohesive energy calculated from chemical structure CS(n) of (meth)acrylic-based monomer unit (n), M(n) denoting the molecular weight of (meth)acrylic-based monomer unit (n), and P(n) denoting the molar fraction of (meth)acrylic-based monomer unit (n) in the (meth)acrylic-based polymer so that $\Sigma P(n)=1$.

A first embodiment of a second aspect of the invention proposed in the present application is a method for manufacturing a fiber-reinforced thermoplastic resin composition including the following steps 1a, 2a, 3a, and 4a:

Step 1a: a step for processing a discontinuous reinforcing fiber bundle into a sheet-shaped reinforcing fiber substrate (A1);

Step 2a: a step for providing 1 to 70 parts by mass of the reinforcing fiber substrate (A1) obtained in the step 1a with 0.1 to 10 parts by mass of a (meth)acrylic-based polymer having a hydroxyl group in a side chain;

Step 3a: a step for obtaining a fiber-reinforced thermoplastic resin composition containing 1.1 to 80 mass % of the reinforcing fiber substrate (A2) and 20 to 98.9 mass % of a thermoplastic resin by combining the reinforcing fiber resin (A2) provided with the (meth)acrylic-based polymer and the thermoplastic resin:

Step 4a: a step for taking off the fiber-reinforced thermoplastic resin composition obtained in the step 3a, at a rate of 1 m/min or more.

A second embodiment of the second aspect of the invention proposed in the present application is a method for manufacturing a fiber-reinforced thermoplastic resin composition including the following steps 1b, 2b, and 3b;

Step 1b: a step for processing the discontinuous reinforcing fiber bundle in which 0.1 to 10 parts by mass of the (meth)acrylic-based polymer having a hydroxyl group in the side chain is attached to 1 to 70 parts by mass of the reinforcing fiber bundle into a sheet-shaped reinforcing fiber substrate (A2);

Step 2b: a step for obtaining a fiber-reinforced thermoplastic resin composition by combining 1.1 to 80 mass % of the reinforcing fiber resin (A2) provided with the (meth)acrylic-based polymer, which is obtained in the step 1b, and 20 to 98.9 mass % of the thermoplastic resin;

Step 3b: a step for taking off the fiber-reinforced thermoplastic resin composition obtained in the step 2b at a rate of 1 m/min or more.

A third embodiment of the second aspect of the invention proposed in the present application is a method for manufacturing a fiber-reinforced thermoplastic resin composition including the following steps 1c, 2c, and 3c;

Step 1c: a step for obtaining a reinforcing fiber substrate (A2) provided with a (meth)acrylic-based polymer by processing discontinuous reinforcing fiber bundles into a sheet-shaped reinforcing fiber substrate (A1), concurrently with providing the reinforcing fiber substrate (A1) with a (meth)acrylic-based polymer having a hydroxyl group in its side chain in an amount of OA to 10 parts by mass per 1 to 70 mass % of the reinforcing fiber substrate (A1);

Step 2c: a step for obtaining a fiber-reinforced thermoplastic resin composition by combining 1.1 to 80 mass % of the reinforcing fiber substrate (A2) provided with a (meth) acrylic-based polymer, which is obtained in the step 1c, and 20 to 98.9 mass % of a thermoplastic resin;

Step 3c: a step for taking off the fiber-reinforced thermoplastic resin composition obtained in the step 2c at a rate of 1 m/min or more.

Effect of the Invention

Since the fiber-reinforced thermoplastic resin composition of the first aspect of the invention proposed in the present application can exert good interface adhesiveness between a reinforcing fiber and a matrix resin, particularly a polyolefin-based matrix resin, a molded product having excellent mechanical characteristics can be obtained. In addition, the reinforcing fiber bundle of the present invention is excellent in adhesiveness to a matrix resin made of a thermoplastic resin, particularly adhesiveness to a polyolefin-based matrix resin. Since a molded product using the fiber-reinforced thermoplastic resin composition and the reinforcing fiber bundle of the first aspect of the invention proposed in the present application is excellent in mechanical characteristics, it is very useful for various kinds of parts and structural components of automobiles, electric/electronic devices, home electronics, and the like.

Furthermore, according to the method for manufacturing the fiber-reinforced thermoplastic resin composition of the second aspect of the invention proposed in the present application, a fiber-reinforced thermoplastic resin composition can be effectively obtained, which is excellent in mechanical characteristics such as specific strength and specific rigidity, high in dispersibility of the reinforcing fiber, and capable of forming a molded product having high uniformity.

MODE FOR CARRYING OUT THE INVENTION

Figure 1:
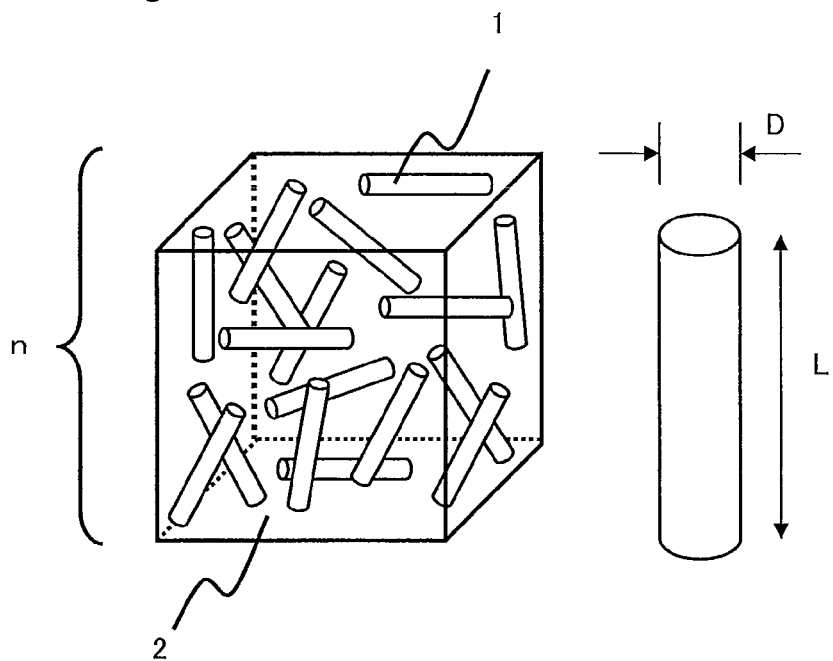
FIG. 1 is a schematic diagram of slurry used for forming a sheet from the reinforcing fiber substrate by a wet process.

A preferred embodiment according to the first aspect of the invention proposed in the present application will be described below.

[Fiber-Reinforced Thermoplastic Resin Composition]

First, components of the fiber-reinforced thermoplastic resin composition will be described. The fiber-reinforced thermoplastic resin composition according to the present invention contains a (meth)acrylic-based polymer, a reinforcing fiber, and a thermoplastic resin. Here, the thermoplastic resin is a matrix resin. Furthermore, the (meth)acrylic-based polymer serves as binder between the reinforcing fiber and the thermoplastic resin.

Examples of the reinforcing fiber include, for example, one or a plurality of fibers having high strength and high elasticity such as carbon fibers, glass fibers, aramid fibers, alumina fibers, carbide fibers, boron fibers, and metal fibers. In particular, carbon fibers such as PAN-based carbon fibers, pitch-based carbon fibers, and rayon-based carbon fibers are preferred from the viewpoint of improvement in mechanical characteristics of a molded product to be obtained and production of light-weight molded products. From the viewpoint of strength and hardness of the molded product to be obtained, the PAN-based carbon fiber is more preferred. In addition, in order to impart conductivity, a reinforcing fiber coated with metal such as nickel, copper, or ytterbium may also be used.

Furthermore, the carbon fiber to be used has a surface oxygen concentration [O/C] of preferably 0.05 to 0.5, more preferably 0.08 to 0.4, further preferably 0.1 to 0.3, which is an atomic number ratio of carbon (C) to oxygen (O) on the surface of the carbon fiber measured by X-ray photoelectron spectroscopy. The surface oxygen concentration of 0.05 or more can ensure a sufficient amount of functional groups on the surface of the carbon fiber to attain strong adhesion to the thermoplastic resin. Furthermore, the upper limit of the surface oxygen concentration is not particularly limited, but it is preferred to adjust it to 0.5 or less from the viewpoint of minimizing the decrease in strength of the carbon fiber itself caused by surface oxidation and from the view point of keeping a good balance between handleability and productivity of the carbon fiber.

The surface oxygen concentration of carbon fiber can be measured by X-ray photoelectron spectroscopy according to the following procedure. First, a carbon fiber bundle from which a sizing agent or the like attached on the surface of carbon fibers has been removed by a solvent is cut into 20-mm pieces, which are then spread out and arranged on a sample holding stage made of copper. The inside of a sample chamber is then kept at $1 \times 10^8$ Torr. Using AlK$\alpha$1,2 as X-ray source, a kinetic energy value (K.E.) of the C1s main peak is adjusted to 1,202 eV as correction value for the peak associated with electrification at the time of measurement. A linear base line is drawn in a K.E. range of 1,191 to 1,205 eV to obtain a $C_{1S}$ peak area. A linear base line is drawn in a K.E. range of 947 to 959 eV to obtain an $O_{1S}$ peak area.

Here, the surface oxygen concentration is calculated as an atomic number ratio from the $O_{1S}$ peak area and $C_{1S}$ peak area using a sensitivity correction value inherent to the apparatus. In the case of using a model ES-200 X-ray photoelectron spectroscopy apparatus manufactured by Kokusai Electric Co., Ltd., the sensitivity calibration value is set to 1.74.

Examples of the means of adjusting the surface oxygen concentration [O/C] to 0.05 to 0.5 include, but not specifically limited to, an electrolytic oxidation process, a chemical oxidation process, and a gas-phase oxidation process. In particular, the electrolytic oxidation process is preferred. Electrolytic solutions which can be preferably used for the electrolytic oxidation process include aqueous solutions that contain any of the following compounds: inorganic acids such as sulfuric acid, nitric acid, and hydrochloric acid; inorganic hydroxides such as sodium hydroxide, potassium hydroxide, and barium hydroxide; inorganic metal salts such as ammonia, sodium carbonate, and sodium hydrogen carbonate; and organic salts such as sodium acetate and sodium benzoate; and organic compounds such as hydrazine. As electrolytic solutions, inorganic acids are particularly preferred. In particular, sulfuric acid and nitric acid are preferably used. To achieve a required degree of electrolytic process, the O/C of the surface of the carbon fiber may be controlled by adjusting the quantity of electricity flown during the electrolytic process.

In addition, the average fiber diameter of the reinforcing fiber is, but not specifically limited to, preferably in the range of 1 o 20 μm and more preferably in the range of 3 to 15 μm from the viewpoint of improvement in mechanical characteristics of a molded product to be obtained and the surface appearance.

Furthermore, the number-average fiber length Ln of the reinforcing fiber is preferably 0.1 to 10 mm, more preferably 0.2 to 7 mm, and still more preferably 0.5 to 5 mm from the viewpoint of improving the fiber reinforcement effect.

The number-average diameter Ln of the reinforcing fiber is calculated as follows: 400 or more reinforcing fibers are randomly sampled from a fiber-reinforced thermoplastic resin composition and the length of each fiber is then measured to the nearest 1 μm using an optical microscope or a scanning electron microscope.

Examples of useful methods for sampling the reinforcing fibers from the fiber-reinforced thermoplastic resin composition include heating a fiber-reinforced thermoplastic resin composition at 500° C. for 1 hour to burn out the other components than the reinforcing fibers, and taking off reinforcing fibers by filtration or the like after dissolving the other components than the reinforcing fibers in a solvent.

The reinforcing fibers may be contained in the form of a reinforcing fiber bundle formed of a combination of a plurality of single threads of reinforcing fibers. In this case, the number of single threads in the reinforcing fiber bundle is, but not specifically limited to, preferably in the range of 100 to 350,000, and more preferably in the range of 1,000 to 250,000. From the viewpoint of productivity of the reinforcing fiber, it preferably contains a large number of single threads in the range of 20,000 to 100,000. When the reinforcing fiber is contained in the form of a reinforcing fiber bundle, it may be provided as required with a composition of urethane-based resin, polyamide-based resin, epoxy-based resin, acrylic-based resin, or the like to provide the reinforcing fiber bundle with bundlability and enhance the handleability thereof. Furthermore, in order to disperse efficiently the reinforcing fibers in the fiber-reinforced thermoplastic resin composition, the reinforcing fiber bundle may be cut into pieces for effective use. In this case, from the viewpoint of enhancing the reinforcing effect of the reinforcing fiber and improving dispersion, the length of the reinforcing fiber bundle is preferably 1 to 60 mm, more preferably 2 to 30 mm, and still more preferably 3 to 10 mm.

Furthermore, from the viewpoint of obtaining mechanically isotropic one, the reinforcing fiber is also preferably in the form of a web- or mat-like sheet where reinforcing fibers are randomly arranged.

It is important that the thermoplastic resin composition of the present invention includes a (meth)acrylic-based polymer having at least one functional group in a side chain, where the functional group is selected from a hydroxyl group, a carboxyl group, an amide group, and a urea group. Having these functional groups enhances the interaction between (meth)acrylic-based polymers and the interaction between the reinforcing fiber and a (meth)acrylic-based polymer, thereby having an effect of enhancing the interface adhesiveness between the reinforcing fiber and the matrix resin. From this point of view, preferably, the (meth)acrylic-based polymer is densely distributed around the reinforcing fiber, and more preferably part of the (meth)acrylic-based polymer is in contact with the reinforcing fiber. Examples of a method for confirming that the (meth)acrylic-based polymer is densely distributed around the reinforcing fiber include: a method in which the fiber-reinforced thermoplastic resin composition and the molded product thereof are cut to expose its cross-section, followed by subjecting the surface of the cross section a reaction with a halogen-based label reagent having a functional group reactive to the above functional group, and analyzing the halogen element using EPMA (electron probe X-ray micro-analyzer) to observe the concentration distribution thereof, thereby confirming dense distribution; and a method in which IR spectrum measurement is performed of the circumference of a cross-section the reinforcing fiber of the fiber-reinforced thermoplastic resin composition or the molded product to confirm the presence or absence of absorption specific to the (meth) acrylic-based polymer and the absorption strength thereof.

To achieve dense distribution of the (meth)acrylic-based polymer around the reinforcing fiber, it is important that the affinity between the (meth)acrylic-based polymer and the reinforcing fiber is high. Therefore, it is important that the (meth)acrylic-based polymer has a specific functional group as mentioned above.

In particular, for the purpose of enhancing the adhesiveness, the (meth)acrylic-based polymer preferably has a functional group selected from a hydroxyl group, an amide group, and an urea group, more preferably has a hydroxyl group, and most preferably has both a hydroxyl group and a carboxyl group. In this case, in consideration of keeping adhesiveness and cost in balance, the hydroxyl value of the (meth)acrylic-based polymer is preferably 10 to 100 mg KOH/g, more preferably 20 to 80 mg KOH/g, still more preferably 30 to 60 mg KOH/g. Here, the "hydroxyl value" refers to the amount of potassium hydroxide required to neutralize acetic acid bonded with hydroxyl groups when 1 g of a sample is acetylated, and is measured based on JIS K0070. In consideration of keeping adhesiveness and cost in balance, furthermore, the acid value of the (meth)acrylic-based polymer is preferably 1 to 10 mg KOH/g, more preferably 2 to 9 mg KOH/g, more preferably 3 to 7 mg KOH/g. Here, the "acid value" refers to the amount of potassium hydroxide required to neutralize the free acid groups existing in 1 g of a sample, and is measured based on JIS K0070.

For the present invention, the (meth)acrylic-based polymer refers to a polymer that contains a repetitive (meth) acrylic-based monomer unit. Here, the (meth)acrylic-based monomer refers to a monomer selected from an acrylic monomer and a methacrylic monomer. In other words, the (meth)acrylic-based polymer is a polymer formed of a monomer selected from the acrylic monomer and the methacrylic monomer, or simply referred to as an acrylic-based polymer.

Examples of the (meth)acrylic-based monomers include monomers having hydroxyl groups such as 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate, glycerol monomethacrylate, glyceryl-1-methacryloyloxyethyl urethane3,4-dihydroxy butyl-1-methacryloyloxyethyl urethane, α-hydroxymethyl acrylate, α-hydroxyethyl acrylate, diethylene glycol monoacrylate, triethylene glycol monoacrylate, polyethylene glycol monoacrylate, dipropylene glycol monoacrylate, tripropylene glycol monoacrylate, polypropylene glycol monoacrylate, dibutanediol monoacrylate, tributanediol monoacrylate, polytetramethylene glycol monoacrylate, diethylene glycol monomethacrylate, triethylene glycol monomethacrylate, polyethylene glycol monomethacrylate, dipropylene glycol monomethacrylate, tripropylene glycol monomethacrylate, polypropylene glycol monomethacrylate, dibutanediol monomethacrylate, tributanediol monomethacrylate, and polytetramethylene glycol monomethacrylate. Of these, 2-hydroxylethyl acrylate and 2-hydroxyethyl methacrylate, which are easily available and tend to improve adhesiveness, are preferred.

Examples of a (meth)acrylic-based monomer having a carboxyl group include acrylic acid, methacrylic acid, maleic acid, maleic anhydride, itaconic acid, and β-carboxyethyl acrylate.

Examples of a (meth)acrylic-based monomer having an amide group include acrylamide, N,N-dimethyl acrylamide, N,N-diethyl acrylamide, N-isopropylacrylamide, N,N-dimethylaminopropyl acrylamide, N,N-diethylamino propylacrylamide, N-methylol acrylamide, N-(2-hydroxyethyl) acrylamide, N-(3-hydroxypropyl acrylamide), and N-(4-hydroxy butyl) acrylamide. Of these, N-(2-hydroxyethyl) acrylamide, which is easily available and tends to improve adhesiveness, is preferred.

Examples of a (meth)acrylic-based monomer having a urea group include N-(2-methacryloxyethyl) ethylene urea and N-(2-methacrylamide ethyl) ethylene urea. Particularly, N-(2-methacryloiloxyethyl) ethylene urea, which is easily available and tends to improve adhesiveness, is preferred.

Examples of other (meth)acrylic-based monomers include methyl acrylate, ethyl acrylate, n-butyl acrylate, isobutyl acrylate, t-butyl acrylate, cyclohexyl acrylate, 2-ethyl hexyl acrylate, lauryl acrylate, stearyl acrylate, benzyl acrylate, isobornyl acrylate, methyl methacrylate, ethyl methacrylate, n-butyl methacrylate, t-butyl methacrylate, isobutyl methacrylate, cyclohexyl methacrylate, 2-ethylhexy methacrylate, lauryl methacrylate, stearyl methacrylate, benzyl methacrylate, and isobornyl methacrylate; acrylic acid (fluoro) alkyl ester such as trifluoroethyl methacrylate; acrylic monomers having dicyclo pentenyl groups such as dicyclopentenyl acrylate, dicyclopentenyl oxyethyl acrylate, dicyclopentenyl methacrylate, and dicyclopentenyloxy ethylmethacrylate; (meth)acrylic-based monomers epoxy groups in side chains, such as glycidyl acrylate, methyl glycidyl acrylate, glycidyl methacrylate, methyl glycidyl methacrylate, vinylbenzyl glycidyl ether, and 3,4-epoxycyclohexyl methylmethacrylate; amino group-containing acrylic monomers such as N,N-dimethylaminoethyl methacrylate and N,N-diethylaminoethyl methacrylate; acrylic monomers having an methoxy group or an etoxy group such as 2-methoxyethyl acrylate, 2-etoxyethyl acrylate, 2-metehoxyethyl methacrylate, and 2-ethoxyethyl methacrylate; carbonyl group-containing acrylic monomers such as N-vinyl-2-pyrrolidone and diacetone acrylamide; and monomers and oligomers that contain metal atoms (such as Zn, aluminum, Ca, Mg, Zr, and Cu) in molecule, such as zinc acrylate, zinc methacrylate, hybrid polyester acrylate oligomer "Sartomer (registered trademark) CN-2402" (Zn-containing acrylic oligomer manufactured by Sartomer Co., Ltd.) hybrid polyurethane oligomer "Sartomer (registered trademark) 2405" (Zn-containing acrylic oligomer manufactured by Sartomer Co., Ltd.). These may be used alone or in combination of two or more.

From the viewpoint of easy availability and improvement in affinity, the (meth)acrylic-based polymer preferably contains one or more (meth)acrylic-based monomer units selected from a 2-hydroxyethyl methacrylate unit, an N-(2-hydroxyethyl) acrylic amide unit, and an N-(2-methacryloyl oxyethyl) ethylene urea unit.

From the viewpoint of obtaining a fiber-reinforced thermoplastic resin composition having excellent mechanical characteristics by increasing the affinity to a reinforcing fiber and affinity to a thermoplastic resin and also from the viewpoint of cost of materials to be used, the (meth)acrylic-based polymer is preferably a (meth)acrylic-based polymer that contains 0 to 5 mass % of a carboxyl group-containing (meth)acrylic-based monomer unit, 3 to 25 mass % of a hydroxyl group-containing (meth)acrylic-based monomer unit, and 70 to 97 mass % of a (meth)acrylic alkyl ester unit having an alkyl group with 1 to 4 carbon atoms. More preferably, the (meth)acrylic-based polymer is a (meth)acrylic-based polymer that contains 0 to 3 mass % of a (meth)acrylic-based monomer unit, 3 to 20 mass % of a hydroxyl group-containing (meth)acrylic-based polymer, and 77 to 97 mass % of a (meth)acrylic alkyl ester unit having an alkyl group with 1 to 4 carbon atoms. Here, the (meth)acrylic alkyl ester means an alkyl acrylate ester or alkyl methacrylate ester.

Identification of the (meth)acrylic-based monomer unit in the (meth)acrylic-based polymer included in the fiber-reinforced thermoplastic composition can be performed using an ordinal technique for analyzing a high molecular compound, such as IR, NMR, mass analysis, and elemental analysis. In order to separate a (meth)acrylic-based polymer from a fiber-reinforced thermoplastic resin composition, if needed, applicable methods include fractionation using liquid chromatography such as GPC, and dissolution of a thermoplastic resin and a (meth)acrylic-based polymer in a solvent that can dissolve both of them, followed by separation through re-precipitation of only the (meth)acrylic-based polymer based on the difference in solubility between the thermoplastic resin and the (meth)acrylic-based polymer.

It is important that the (meth)acrylic-based polymer has a cohesive energy density CED of 385 to 550 MPa as calculated by the following equation. For the present invention, since a (meth)acrylic-based polymer functions as a binder between a reinforcing fiber and a thermoplastic resin, it is important that the (meth)acrylic-based polymer has a good balance between the affinity to the reinforcing fiber and the affinity to the matrix resin. By setting the cohesive energy density to the above range, the permeability, wettablility, and affinity to both the reinforcing fiber and the matrix resin become appropriate, and good interface adhesiveness can be exerted. The cohesive energy density CED is preferably 395 to 500 MPa, more preferably 400 to 450 MPa, and still more preferably 405 to 420 MPa. An excessive or insufficient cohesive energy density disrupts the balance of affinity, causing a decrease in surface adhesiveness.

Here, the method for calculating the cohesive energy density CED of a (meth)acrylic-based copolymer will be described. When the number of kinds of (meth)acrylic-based monomer units contained in the (meth)acrylic-based polymer is denoted by m and each (meth)acrylic-based monomer is referred to as (meth)acrylic-based monomer (n) (n being an integer from 1 to m), CED is calculated by the following formula. Here, $\Sigma P(n)=1$.

$$CED=1.15\times\Sigma\{P(n)\times CE(n)\}/\Sigma\{P(n)\times M(n)\}$$

Here, CE(n) means the cohesive energy calculated from chemical structure CS(n) of (meth)acrylic-based monomer unit (n). Similarly, M(n) means the molecular weight of (meth)acrylic-based monomer unit (n), and P(n) means the molar fraction of (meth)acrylic-based monomer unit (n) in the (meth)acrylic-based polymer. Here, CS(n) represents the chemical structure of (meth)acrylic-based monomer unit (n), that is, the chemical structure of the monomer in which the C=C double bonds are opened. Furthermore, the coefficient of 1.15 represents the specific gravity of the (meth)acrylic-based monomer unit.

CE(n) is calculated by the equation: $CE(n)=\Sigma Ecoh(n)$. Here, $\Sigma Ecoh(n)$ represents the sum of cohesive energies Ecoh(n) of the atomic groups, such as $—CH_3$, $—CH_2—$, $>C<$, $—COOH$, and $—OH$, that constitute the chemical structure CS(n). Here, the cohesive energy of each atomic group used is the cohesive energy Ecoh (J/mol) of an atomic group proposed by R. F. Fedors with reference to Reference: (1) R. F. Fedors: "A Method for Estimating Both the Solubility Parameters and Molar Volumes of Liquids", Polm. Eng. Sci., and 14(2). 147-154 (1974); and "SF value Foundation/Application and Calculation Method" (Sixth ed., p 69, 2008, Johokiko, Co., Ltd.).

As an example, calculated cohesive energy values of chemical structures with radical polymerization of methacrylic acid, 2-hydroxyethyl methacrylate, and methyl methacrylate are listed in Table 1-1.

In Table 1-1, MAA represents a methacrylic acid unit, HEMA represents a 2-hydroxyethyl methacrylate unit, 4HBMA represents a 4-hydroxybutyl methacrylate unit, MMA represents a methyl methacrylate unit, BMA represents an n-butyl methacrylate unit, and EHMA represents a 2-methylhexyl methacrylate unit. These abbreviations will be also used in the following description.

TABLE 1-1

Examples of cohesive energy calculation for chemical structure formed by
radical polymerization of acrylic monomers

| Ecoh (J/mol) of atomic group | | Acrylic monomer | | | | | | | | | | |
|---|---|---|---|---|---|---|---|---|---|---|---|---|
| | | MAA | | HEMA | | 4HBMA | | MMA | | BMA | | EHMA |
| | | Number of atomic groups in and cohesive energy of chemical structures formed by radical polymerization of acrylic monomers | | | | | | | | | | |
| —CH3 | 4710 | 1 | 4710 | 1 | 4710 | 1 | 4710 | 2 | 9420 | 2 | 9420 | 3 | 14130 |
| —CH2— | 4940 | 1 | 4940 | 3 | 14820 | 5 | 24700 | 1 | 4940 | 4 | 19760 | 6 | 29640 |
| >CH— | 3430 | | 0 | | 0 | | 0 | | 0 | | 0 | 1 | 3430 |
| >C< | 1470 | 1 | 1470 | 1 | 1470 | 1 | 1470 | 1 | 1470 | 1 | 1470 | 1 | 1470 |
| =CH2 | 4310 | | 0 | | 0 | | 0 | | 0 | | 0 | | 0 |
| >C= | 4310 | | 0 | | 0 | | 0 | | 0 | | 0 | | 0 |
| =CH— | 4310 | | 0 | | 0 | | 0 | | 0 | | 0 | | 0 |
| Phenyl | 31940 | | 0 | | 0 | | 0 | | 0 | | 0 | | 0 |
| —COOH | 27630 | 1 | 27630 | | 0 | | 0 | | 0 | | 0 | | 0 |
| —COO— | 18000 | | 0 | 1 | 18000 | 1 | 18000 | 1 | 18000 | 1 | 18000 | 1 | 18000 |
| —OH | 21850 | | 0 | 1 | 21850 | 1 | 21850 | | 0 | | 0 | | 0 |
| —O— | 3350 | | 0 | | 0 | | 0 | | 0 | | 0 | | 0 |
| —NH— | 8370 | | 0 | | 0 | | 0 | | 0 | | 0 | | 0 |
| —NH2 | 12560 | | 0 | | 0 | | 0 | | 0 | | 0 | | 0 |
| —NCO | 28460 | | 0 | | 0 | | 0 | | 0 | | 0 | | 0 |
| —CONH— | 33490 | | 0 | | 0 | | 0 | | 0 | | 0 | | 0 |
| —NHCON< | 41860 | | 0 | | 0 | | 0 | | 0 | | 0 | | 0 |
| >NCON< | 20930 | | 0 | | 0 | | 0 | | 0 | | 0 | | 0 |
| —NHCOO | 26370 | | 0 | | 0 | | 0 | | 0 | | 0 | | 0 |
| —CON< | 29510 | | 0 | | 0 | | 0 | | 0 | | 0 | | 0 |
| CE(n) = Σ Ecoh (J/mol) | | | 38750 | | 60850 | | 70730 | | 33830 | | 48650 | | 66670 |

Using MAA as an example, the method for calculating the cohesive energy CE(n) of (meth)acrylic monomeric unit n will be described. The column "Ecoh (J/mol) of atomic group" in Table 1-1 include the cohesive energy of each atomic group such as —CH$_3$—. In the column "MAA", the left frame represents the numbers of the respective atomic groups contained in MAA and the right frame represents the product of the cohesive energy (J/mol) of each atomic group and the number of atomic groups. The cohesive energy CE(n) of MAA is the sum obtained by vertically adding the values in the right frames in the column "MAA".

The method for calculating cohesive energy CE will be described with reference to a (meth)acrylic-based polymer using MAA, HEMA, MMA, and BMA as a (meth)acrylic-based monomer unit.

Here, in this example, the ratio among the respective monomer units is

MMA/BMA/MAA/HEMA=35/54/1/10(=100) (mass %)=0.427/0.464/0.014/0.095(=1.000) (molar fraction).

The monomer unit structure of MMA (in a state where C=C double bond is opened) has a molecular weight of 100 and a cohesive energy of 33,830 J/mol. The monomer unit structure of BMA has a molecular weight of 142 and a cohesive energy of 48,650 J/mol. The monomer unit structure of MAA has a molecular weight of 86 and a cohesive energy of 38,750 J/mol. The monomer unit structure of HEMA has a molecular weight of 130 and a cohesive energy of 60,850 J/mol. Thus, the cohesive energy density CED of the (meth)acrylic-based polymer is as follows: CED=1.15× (0.427×33,830+0.464×48,650+0.014×38,750+0.095×60,850)/(0.427×100+0.464×142+0.014×86+0.095×130)=408 MPa.

It is preferred that, of all the (meth)acrylic-based monomer units in the (meth)acrylic-based polymer, the (meth)acrylic-based monomer units in which an acryloyloxy group or a methacryloyloxy group is attached to a hydrogen and/or primary carbon atom account for 60 mass % or more. It is more preferably 75 mass % or more, and still more preferably 90 mass % or more. This range makes the (meth)acrylic-based polymer comparatively flexible, and keeps an interface, or an adhesion part between the (meth)acrylic-based polymer and the thermoplastic resin when they are bonded together. Thus, an increase in adhesiveness can be attained.

From the viewpoint of keeping the balance between the hardness of the (meth)acrylic-based polymer and the toughness thereof to ensure sufficient bonding strength, tan δ obtained by a dynamic viscoelastic test is preferably 50 to 100° C., more preferably 55 to 90° C., still more preferably 60 to 80° C.

In addition, from the same viewpoint, the Young's modulus E' obtained by the dynamic viscoelastic test for the (meth)acrylic-based polymer is preferably 180 to 600 MPa, more preferably 200 to 580 MPa, and still more preferably 240 to 560 MPa.

The tan δ and Young's modulus E' of the (meth)acrylic-based polymer can be measured using a dynamic viscoelasticity measurement apparatus such as Reogel E4000 (manufactured by UBM Co., Ltd.). The conditions for measurement of tan δ and Young's modulus E' are as follows: Measurement method: A dynamic viscoelasticity measurement (sine wave), Measurement mode: temperature dependency, Chuck: tension, Waveform: sin wave, Vibration type: stop vibration, Initial load: initial strain control (0.02 mm), Conditions: a frequency of 1 Hz, a measurement-starting temperature of 10° C., a step temperature of 1° C., a measurement-finish temperature of 170° C., and a temperature-increasing rate of 4° C./min.

The weight average molecular weight Mw of the (meth)acrylic-based polymer is preferably in the range of 5,000 to 500,000, more preferably 10,000 to 200,000, and still more preferably 20,000 to 50,000 from the viewpoints of possibility of film formation so as to cover the reinforcing fiber uniformly, from the viewpoint of ensuring the strength of the (meth)acrylic-based polymer itself to enhance the adhesiveness, and from the viewpoint of forming entanglement of molecular chains of the (meth)acrylic-based polymer and the matrix resin. Here, the weight average molecular weight is measured using gel permeation chromatography (GPC).

In addition, the (meth)acrylic-based polymer preferably contains a group selected from a carboxylate group, a sulfonate group, and a phosphate group. This is because inclusion of these groups is effective in enhancing the interaction with a reinforcing fiber. The sulfonate group is more preferred. Here, any of these groups is bonded to the (meth)acrylic-based polymer. As a salt, a salt selected from lithium salt, potassium salt, sodium salt, and ammonium salt is industrially preferred. The salt conversion rate is preferably 50 to 100%; more preferably 70 to 100%, and still more preferably 85 to 100%. Thus, the carboxylate group, sulfonate group, and phosphate group in the (meth)acrylic-based polymer are desirably converted into salts completely, or part of free acid groups may be left. Examples of a procedure for analyzing the salt component of the acid groups as described above include a method for detecting a salt-forming metal species by ICP emission spectrometry, and a method for identifying the salt structure of the acid group using IR, NMR, mass analysis, and elemental analysis.

Here, the method for measuring the salt conversion rate will be described taking a sulfonic acid group as an example. In the method, a (meth)acrylic-based polymer may be dissolved in an organic solvent, and titration may be performed using a 0.1-N potassium hydroxide/ethanol standard solution, followed by calculating the acid value of the (meth) acrylic-based polymer by the following equation and calculating the salt conversion rate by making a comparison with the total number of moles of the sulfonic acid group.

$$\text{Acid value} = (5.611 \times A \times F)/B \text{ (mgKOH/g)}$$

A: Amount of 0.1-N potassium hydroxide/ethanol standard solution used (ml)
F: Factor of 0.1-N potassium hydroxide/ethanol standard solution
B: Amount of sample collected (g)

An equation described below is used to convert the acid value calculated as described above into the number of moles of the sulfonic acid group which is not converted into a salt.

Number of moles of sulfonic acid group which is not converted into salt acid value×1000/56 (mole/g).

The conversion rate of a sulfonic acid group into a salt is separately calculated by the following equation using the total number of moles of the sulfonic acid group calculated by quantification of sulfur in the sulfonyl group of the sulfonyl group using IR, NMR, elemental analysis, and the like.

$$\text{Conversion rate } (\%) = (1-r) \times 100 (\%)$$

r: number of moles of sulfonic acid group which is not converted into salt/total number of moles of sulfonic acid group.

Furthermore, from the viewpoint of enhancing the interaction with a reinforcing fiber, the content of sulfonate group in the (meth)acrylic-based polymer is preferably 0.01 to 1 mmol equivalent in total in terms of groups represented as —(O=)S(=O)—O— per gram of the (meth)acrylic-based polymer. It is more preferably 0.03 to 0.8 mmol equivalent, and still more preferably 0.05 to 0.5 mmol equivalent. Examples of a method for analyzing the content of a sulfonate group include a method for quantitatively detecting a metal species that forms the salt by ICP emission analysis and a method for quantitatively detecting a metal species of the sulfonate by using IR, NMR, elemental analysis, and the like.

Next, the thermoplastic resin contained in a fiber-reinforced thermoplastic resin will be described. The thermoplastic resin used is preferably at least one thermoplastic resin selected from the following: crystalline resins, for example, [polyesters such as polyethylene terephthalate (PET), polybutylene terephthalate (PBT), polytrimethylene terephthalate (PTT), polyethylene naphthalate (PEN), and liquid crystal polyester; polyolefins such as polyethylene (PE), polypropylene (PP), and polybutylene; polyoxymethylene (POM); polyamide (PA); polyarylene sulfides such as polyphenylene sulfide (PPS); Poly ketone (PK), polyether ketone (PFK), polyether ether ketone (PEEK), polyether ketone ketone (PEKK), polyether nitrite (PEN); fluorine-based resin such as polytetrafluoroethylene; crystalline polymer (LCP)]; amorphous resins, for example, [styrene-based resin, polycarbonate (PC), polymethyl methacrylate (PMMA), polyvinyl chloride (PVC), polyphenylene ether (PPE), polyimide (PI), polyamideimide (PAI), polyether imide (PEI), poly sulfone (PSU), polyether sulphone, polyarylate (PAR)]; phenol-based resin, phenoxy resin; various kinds of thermoplastic elastomers such as polystyrene-based elastomer, polyolefin-based elastomer, polyurethane-based elastomer, polyester-based elastomer, polyamide-based elastomer, polybutadiene-based elastomer, polyisoprene-based elastomer, fluorine-based resin, and acrylonitrile-based elastomer; and copolymers, modified products, and the like. From the viewpoint of strength, polyamide is preferred. From the viewpoint of surface appearance, amorphous resins such as polycarbonate and styrene-based resin are preferred. From the viewpoint of heat resistance, polyarylene sulfide is preferred. From the viewpoint of continuous use temperature, polyether ether ketone is preferred. From the viewpoint of chemical resistance, fluorine-based resin is preferred. From the viewpoint of lightweight of a molded product to be obtained, polyolefin is preferred. Among them, polyolefin is preferred. In particular, from the viewpoint of cost and industrial applicability, polypropylene is preferred. The thermoplastic resin may be a thermoplastic resin composition containing two or more of these thermoplastic resins as long as the object of the invention is not impaired.

When the polyolefin resin is used as a thermoplastic resin, from the viewpoint of affinity to a (meth)acrylic-based polymer, preferred is a modified polyolefin resin containing at least one kind of functional groups selected from a carboxyl group, an acid anhydride group, and an epoxy group. Examples of the modified polyolefin resin include (anhydrous) maleic acid modified polyethylene, (anhydrous) maleic acid modified ethylene/propylene copolymer, (anhydrous) maleic acid modified polypropylene, (anhydrous) maleic acid modified ethylene/vinyl acetate copolymer, (anhydrous) maleic acid modified polyropylene/ethylene copolymer, glycidyl (meth)acrylate-modified polyethylene, glycidyl (meth)acrylate-modified ethylene/propylene copolymer, glycidyl (meth)acrylate-modified ethylene/vinyl acetate copolymer, glycidyl (meth)acrylate-modified propylene/ethylene copolymer, 2-hydroxyethyl (meth)acrylate-modified ethylene, 2-hydroxyethyl (meth)acrylate-modified ethylene/propylene copolymer, 2-hydroxyethyl (meth)acrylate-modified ethylene/vinyl acetate copolymer, ethylene/ (meth)acrylic acid copolymer, ethylene/2-hydroxyethyl (meth)acrylate copolymer, ethylene/glycidyl (meta)acrylate copolymer, ethylene/polyethylene glycol mono-(meth)acrylate copolymer, ethylene/vinyl acetate/(meth)acrylic acid copolymer, ethylene/ethyl (meth)acrylate/(anhydrous)

maleate copolymer, ethylene/vinyl acetate/(anhydrous) maleate copolymer, ethylene/vinyl acetate/2-hydroxyethyl (meth)acrylate copolymer, ethylene/vinyl acetate/glycidyl (meth)acrylate copolymer, ethylene/vinyl acetate/polyethylene glycol mono(meth)acrylate copolymer, and a partial saponification product of ethylene/vinyl acetate copolymer. Among them, modified products of (anhydrous) maleic acid modified polypropylene, (anhydrous) maleic acid modified ethylene/propylene copolymer, glycidyl (meth)acrylate-modified polypropylene are used preferably. Here, (anhydrous) maleic acid modified polypropylene means maleic acid modified polypropylene or anhydrous maleic acid modified polyropylene.

The content of the (meth)acrylic-based polymer in the fiber-reinforced thermoplastic resin composition needs to be within the range of 0.1 to 10 mass %. If the content is less than 0.1 mass %, good adhesiveness may be not exerted. On the other hand, if the content exceeds 10 mass %, the mechanical characteristics of the molded product may be extremely decreased. The content of the (meth)acrylic-based polymer is preferably 0.1 to 8 mass %, more preferably 0.1 to 5 mass %.

In addition, the content of the reinforcing fiber in the fiber-reinforced thermoplastic resin composition needs to be 1 to 70 mass %. If the content of the reinforcing fiber is less than 1 mass %, the reinforcing effect of the reinforcing fiber becomes insufficient. Thus, the resulting molded product may have insufficient mechanical characteristics. If the content of the reinforcing fiber exceeds 70 mass %, the impregnation of the thermoplastic resin between the reinforcing fibers becomes insufficient. Thus, the resulting molded product may have insufficient mechanical characteristics. The content of the reinforcing fiber is preferably 5 to 60 mass %, more preferably 10 to 45 mass %.

In addition, the content of the thermoplastic resin in the fiber-reinforced thermoplastic resin composition needs to be 20 to 98.9 mass %. If the content of the thermoplastic resin is less than 20%, the impregnation of the thermoplastic resin between the reinforcing fibers becomes insufficient. Thus, the resulting molded product may have insufficient mechanical characteristics. The content of the thermoplastic resin is preferably 30 to 98.9 mass %, more preferably 40 to 94.9 mass %, and more preferably 50 to 89.9 mass %.

[Reinforcing Fiber Bundle]

In the reinforcing fiber bundle to which the (meth)acrylic-based polymer of the present invention is attached, it is important that the amount of the (meth)acrylic-based polymer attached to the reinforcing fiber is in the range of 0.1 to 30 mass % with respect to the total amount of the (meth) acrylic-based polymer and the reinforcing fiber. If the amount of the (meth)acrylic-based polymer attached is less than 0.1 mass %, some parts uncovered by the reinforcing fiber exists and good adhesiveness may not be stability exerted. Furthermore, the handleability of the reinforcing fiber bundle may become insufficient. The term "handleability" used herein refers to, for example, the hardness of the fiber bundle at the time of winding the reinforcing fiber bundle onto a bobbin, or easiness of relaxing. In the case of cutting the reinforcing fiber bundle and using as a chopped thread, it also refers to the bundlability of a chopped yarn. On the other hand, if the amount of the (meth)acrylic-based polymer attached exceeds 30 mass %, the mechanical characteristics of the resulting molded product may be decreased and the reinforcing fiber bundle may be extremely hardened to cause troubles such as impossibility in winding on a bobbin. The amount of the (meth)acrylic-based polymer attached is preferably 1 to 20 mass %, and more preferably 3 to 10 mass % in consideration of the balance between the adhesiveness and the handleability of the reinforcing fiber bundle.

A reinforcing fiber to be used for the reinforcing fiber bundle can be selected based on the same philosophy as that for the reinforcing fiber in the above fiber-reinforced thermoplastic resin composition.

In addition, a (meth)acrylic-based polymer to be used in the reinforcing fiber bundle can be selected based on the same philosophy as that for the (meth)acrylic-based polymer in the above fiber-reinforced thermoplastic resin composition.

In particular, it is preferred that, among all the (meth) acrylic-based monomer units in the (meth)acrylic-based polymer, the proportion of a (meth)acrylic-based monomer unit in which an acryloyloxy group or a methacryloyloxy group is attached to a hydrogen and/or primary carbon atom is 60 mass % or more, more preferably 75 mass % or more, and still more preferably 90 mass % or more. This range makes the (meth)acrylic-based polymer comparatively flexible, and ensures adhesiveness, while increasing the handleability of the reinforcing fiber bundle.

In addition, the reinforcing fiber bundle may be attached together with another component in addition to the (meth) acrylic-based polymer as long as the effects of the present invention are not impaired. For example, in the case of providing the reinforcing fiber bundle with an emulsion of (meth)acrylic-based polymer, a surfactant or the like for stabilizing the emulsion may be added separately. Furthermore, any composition of urethane-based resin, polyamide-based resin, epoxy-based resin, or acrylic-based resin may be suitably added from the viewpoint of providing the reinforcing fiber bundle with bundlability to ensure handleability.

As a reinforcing fiber, a chopped thread obtained by cutting the reinforcing fiber bundle may be used. In this case, from the viewpoint of enhancing a reinforcing effect of the reinforcing fiber and the viewpoint of improving dispersion, the length of the chopped thread is preferably 1 to 60 mm, more preferably 2 to 30 mm, and still more preferably 3 to 10 mm.

A method for attaching the (meth)acrylic-based polymer to the reinforcing fiber bundle is preferably, but not specifically limited to, a method where the reinforcing fiber bundle is provided with an emulsion of the (meth)acrylic-based polymer and then dried. The method for providing the reinforcing fiber bundle with the emulsion may be a method where application is performed using any known technique, such as a roller-dipping method, a roller-transfer method, or a splay method.

As an index of the adhesiveness between the reinforcing fiber bundle carrying the (meth)acrylic-based polymer and the matrix resin of the present invention, the interface shear strength with the matrix resin is evaluated. The higher the interface shear strength is the higher the adhesiveness tends to increase. The interface shear strength is preferably 12 MPa or more, and more preferably 13 MPa or more. Here, the matrix resin to be used in evaluation is a polypropylene resin composition consisting of 50 mass % of unmodified polypropylene resin ("Prime Polypro (registered trademark)" J105G, manufactured by Prime Polymer Co., Ltd.) and 50 mass % of acid-modified polypropylene resin (Admer QB510 manufactured by Mitsui Chemicals Co., Ltd.).

Hereinafter, the evaluation of interface shear strength will be described in detail. Evaluation was performed by reference to Drzal, L. T., Mater. Sci. Eng. A126, and 289 (1990).

One single fiber of 20 cm in length is taken out from the reinforcing fiber bundle to which the (meth)acrylic-based polymer is attached. Then, two sheets of 150-μm-thick resin film of 20×20 cm square are prepared, each of which consists of 50 mass % of unmodified polypropylene resin (Prime Polypro (registered trademark) J105G, manufactured by Prime Polymer Co., Ltd.) and 50 mass % of acid-modified polypropylene resin (Adorer (registered trademark) QB510 manufactured by Mitsui Chemicals Co., Ltd.). Then, the single fiber taken out above is linearly arranged on one of the resin films. The other of the resin films is put on it so that the single fiber is sandwiched between the resin film sheets, and then they are pressed at a pressure of 0.5 MPa at 200° C. for 3 minutes to prepare a sample in which the single fiber is embedded in the resin. The resulting sample is cut to obtain test pieces of 0.2 mm in thickness, 10 mm in width, and 70 mm in length where a short fiber is embedded in the center thereof. Ten test pieces are prepared in the same manner as above.

Using an ordinary tension test jig, the test pieces are set to a test length of 25 mm and subjected to a tension test with a strain rate of 0.5 mm/min. When breakage of the single fiber no longer occurs, the lengths of all the fractions of the single fiber are measured using a transmission-type microscope, and then averaged to obtain the average broken fiber length l.

The interface shear strength (t) is obtained from the following equation.

$$\tau = (\sigma f \cdot d)/(2 \cdot lc)$$

$$lc = (4/3) \cdot 1$$

where 1 (μm) is the average value of the final broken fiber lengths; σf (MPa) is the tensile strength of the single fiber; and d (μm) is the diameter of the single fiber.

σf is obtained by the following method on the assumption that the tensile strength distribution of the reinforcing fiber follows the Weibull distribution. From the average tensile strengths from the respective sample lengths of 5 mm, 25 mm, and 50 mm, the relational equation between sample lengths and average tensile strengths is obtained by a least square method, and the average tensile strength at a sample length of lc is calculated.

One of preferred shapes of the reinforcing fiber bundle of the present invention is any of chopped threads obtained by cutting a continuous fiber, roving, into a predetermined length from and milled thread obtained by milling. From the viewpoint of handleability, chopped thread is used preferably. The fiber length of the chopped thread is, but not specifically limited to, preferably in the range of 1 to 30 mm, and more preferably in the range of 2 to 15 mm from the viewpoint of exerting sufficient bundlability, sufficiently retaining the shape after cutting, and being easy to handle. If the bundlability of chopped threads is insufficient, fuzz may occur due to scratch caused by the transportation of chopped threads, or the like and make a fiber ball, resulting in poor handleability. In particular, when using in a compound application, fiber ball generation may result in insufficient supply of chopped threads to an extruder and lower productivity.

A matrix resin combined with the reinforcing fiber bundle carrying the (meth)acrylic-based polymer of the present invention can be selected with the same philosophy as that of the thermoplastic resin in the fiber-reinforced thermoplastic resin composition as described above.

In the case of preparing a resin composition by combining the reinforcing fiber bundle carrying the (meth)acrylic-based polymer of the present invention with a thermoplastic resin, from the view point of an reinforcing effect of the reinforcing fiber, and moldability and light weight, it is preferred that the reinforcing fiber bundle carrying the (meth)acrylic-based polymer accounts for 1 to 70 mass % and the thermoplastic resin accounts for 30 to 99 mass %. More preferably, the reinforcing fiber bundle carrying the (meth)acrylic-based polymer accounts for 5 to 60 mass %, and the thermoplastic resin accounts for 40 to 95 mass %. Still more preferably, the reinforcing fiber bundle carrying the (meth)acrylic-based polymer accounts for 10 to 50 mass %, and the thermoplastic resin accounts for 50 to 90 mass %.

A molding method using the fiber-reinforced thermoplastic resin composition of the present invention is, but not specifically limited to, any of usual molding methods such as injection molding, hot-press molding, and stamping molding. Among them, the injection molding and the stamping molding are preferred because of their short molding cycles and excellent productivity.

Examples of the molding method using the fiber-reinforced thermoplastic resin composition of the present invention include, but not specifically limited to, (1) a molding method using a compound pellet prepared by once carrying out melt-kneading of a the reinforcing fiber bundle carrying the (meth)acrylic-based polymer of the present invention with a matrix resin; (2) a direct-molding method where the reinforcing fiber bundle carrying the (meth)acrylic-based polymer is mixed with a matrix resin pellet is directly supplied to a molding apparatus, or the reinforcing fiber bundle carrying the (meth)acrylic-based polymer and a matrix resin pellet are individually supplied to a molding machine, injected into a molding die, and solidified by cooling; and (3) a molding method using a long fiber pellet where the reinforcing fiber bundle carrying the (meth) acrylic-based polymer is covered with a matrix resin.

Hereinafter, a preferred embodiment of the second aspect of the invention proposed in the present application will be described.

[Method for Producing Fiber-Reinforced Thermoplastic Resin Composition]

A first embodiment of the method for producing the fiber-reinforced thermoplastic resin composition of the present application is a method for manufacturing a fiber-reinforced thermoplastic resin composition including the following steps 1a, 2a, 3a, and 4a:

Step 1a: a step for processing a discontinuous reinforcing fiber bundle into a sheet-shaped reinforcing fiber substrate (A1);

Step 2a: a step for providing 1 to 70 parts by mass of the reinforcing fiber substrate (A1) obtained in the step 1a with 0.1 to 10 parts by mass of (meth)acrylic-based polymer having a hydroxyl group in a side chain;

Step 3a: a step for obtaining a fiber-reinforced thermoplastic resin composition by combining 1.1 to 80 mass % of the reinforcing fiber substrate (A2) provided with the (meth)acrylic-based polymer, which is obtained in the step 2a, with 20 to 98.9 mass % of the thermoplastic resin;

Step 4a: a step for taking off the fiber-reinforced thermoplastic resin composition obtained in the step 3a at a rate of 1 m/min or more.

Here, the term "reinforcing fiber bundle" means a fiber bundle composed of reinforcing fibers. In addition, the number of single fibers in the reinforcing fiber bundle is, but not specifically limited to, preferably 24,000 or more, and more preferably 48,000 or more from the viewpoint of productivity. The upper limit number of singe fibers is, but not specifically limited to, preferably not more than 300,000 in consideration of keeping dispersibility and handleability in balance.

The length of the reinforcing fiber is preferably 1 to 30 mm, and more preferably 3 to 30 mm. If it is less than 1 mm, it may be difficult to allow the reinforcing fiber to effectively exert a reinforcing effect. If it exceeds 30 mm, in contrast, it may be difficult to keep good dispersion. The "length of the reinforcing fiber bundle" means the length of single fibers in the reinforcing fiber bundle determined by measuring the length in the fiber axial direction of the reinforcing fiber bundle with a vernier caliper or by taking single fibers from the reinforcing fiber bundle and observing them under a microscope. Furthermore, the measurement of the length of the reinforcing fiber in a molding material can be performed by separating reinforcing fibers from the fiber-reinforced thermoplastic resin composition as described below. Part of the fiber-reinforced thermoplastic resin composition is cut out, and a solvent that dissolves the binding thermoplastic resin is then used to dissolve the thermoplastic resin sufficiently. Subsequently, any of publicly known operations, such as filtration, is performed to separate the reinforcing fiber from the thermoplastic resin. Alternatively, part of the fiber-reinforced thermoplastic resin composition is cut out and heated at 2 hours at 500° C., and the reinforcing fiber is then separated from the thermoplastic resin by burning out the thermoplastic resin. From the separated reinforcing fibers, 400 fibers are randomly selected and their lengths were then measured in the order of up to 10 μm with an optical microscope or a scanning electron microscope. The average value of the lengths is defined as a fiber length.

The reinforcing fiber used in the method for producing the fiber-reinforced thermoplastic resin composition of the present invention can be selected based on the same philosophy as that for the reinforcing fiber in the fiber-reinforced thermoplastic resin composition described above.

In the step 1a, a dry process or a wet process can be used for processing discontinuous reinforcing fiber bundles into a sheet-shaped reinforcing fiber substrate (A1). To obtain the isotropic reinforcing fiber substrate (A1) having high mechanical characteristics, it is preferred that the reinforcing fiber bundles are highly dispersed to make the substrate having uniformly dispersed reinforcing fibers.

In the case of performing the step 1a by the dry process, the sheet-shaped reinforcing fiber substrate (A1) can be obtained by dispersing the reinforcing fiber bundles in a gas phase and depositing the reinforcing fiber bundles after dispersion.

To disperse the reinforcing fiber bundles in the gas phase, there are two processes: one is to open the reinforcing fiber bundles in a non-contacting manner and deposit the opened reinforcing fiber bundles (non-contact process) and the other is to open the reinforcing fiber bundles in a contacting manner and deposit the opened reinforcing fiber bundles (contacting process).

The non-contact process is a process for opening without contacting the reinforcing fiber bundle to a solid or an opening device. Examples of such a process include processes for blowing air and gas such as inert gas on the reinforcing fiber bundle. Among them, the process for pressurizing and blowing air is preferred because of its advantage in cost.

In the process using airflow, the conditions for applying the air flow to the reinforcing fiber bundle are not specifically limited. As an example, pressure air (generally the air flow that can cause a pressure of 0.1 MPa or more but not more than 10 MPa, preferably 0.5 MPa or more but not more than 5 MPa) is applied to the reinforcing fiber bundle until the bundle is opened. In the process for using the air flow, an example of apparatuses which can be used is, but not specifically limited to, a container having an air duct and cable of air aspiration in which the reinforcing fiber bundle can be housed. The use of such a container allows the reinforcing fiber bundles to be opened and deposited in one container.

The contact process is a process for physically contacting the reinforcing fiber bundle with a solid or an opening apparatus. Examples of the contact process include carding, needle punch, and roller opening. Among them, the carding or needle punch is preferred, and the process based on the carding is more preferred. The operation conditions of the contact process are not specifically limited. The conditions for opening the reinforcing fiber bundle can be suitably determined.

When performing the step 1a by the wet process, the reinforcing fiber bundles are dispersed in water and the resulting slurry is formed into a sheet form, thereby obtaining the sheet-shaped reinforcing fiber substrate (A1).

Water for dispersion of the reinforcing fiber bundle (dispersion liquid) is usually tap water, or may be distilled water, purified water, or other kinds of water. The water can be mixed with a surfactant or a thicker if required. Surfactants are classified into cationic, anionic, nonionic, and amphoteric types, respectively. Among them, the nonionic surfactants are preferably used, and particularly polyoxyethylene lauryl ether is more preferred. Thickeners which can be preferably used include polyacrylamide, polyethylene oxide, starch, and the like. The concentration of the surfactant or thicker in mixture with water is preferably 0.0001 mass % or more but not more than 0.1 mass % or more, more preferably 0.0003 mass % or more but not more than 0.05 mass % or more.

The term "slurry" refers to a suspension in which solid components are dispersed. The concentration of the solid components in the slurry is preferably 0.001 mass % or more but not more than 1 mass %, more preferably 0.01 mass % or more but not more than 0.5 mass %. Here, the "concentration of solid components in the slurry" means the mass content ratio of the reinforcing fiber in the slurry when the slurry contains only the reinforcing fibers as the solid components. Alternatively, it means the mass content ratio of all the solid components in the slurry when the slurry contains not only the reinforcing fibers but also other solid components such as fibers or particles of thermoplastic resin. When the concentration of the solid components in the slurry is 0.01 mass % or more but not more than 1 mass % or less, a slurry with uniform dispersion can be obtained within a short time period and formed into a sheet shape efficiently. When dispersing the reinforcing fiber bundles in water (dispersion liquid), stirring is performed if required.

The slurry is formed into a sheet shape by taking up water from the slurry. The processing of the slurry into a sheet shape can be performed in a manner analogous to the so-called paper-making process. As an example, the slurry is flowed into a tank where the bottom thereof has a sheet-making surface and water can be taken up from the bottom, and water is then taken up. An example of the tank is a tank having a mesh conveyor having a sheet-making surface of 200 mm in width on the bottom, No. 2553-1 (item name) manufactured by Kumagaya Riki Kogyo Co., Ltd. Thus, the reinforcing fiber substrate (A1) is obtained.

In order to form a sheet product in which solid components are uniformly blended, it is common to dilute the concentration of slurry before supplying the raw material slurry into a sheet-forming step (see, for example, Japanese Unexamined Patent Application Publication No. 2006-104608). Specifically, in order to maintain the dispersibility of the reinforcing fiber in the slurry, there is a proposal in which a slurry having the high concentration of the reinforcing fiber is prepared and then diluted to make a slurry having the low concentration of the reinforcing fiber. However, it takes two steps, so that activity can be complicated. In the case of the reinforcing fiber having low affinity to the dispersion medium in the slurry, there is a problem in that the production of a slurry having the high concentration of the reinforcing fiber is extremely difficult.

Thus, when the reinforcing fiber substrate (A1) is produced by the wet process, it is preferably produced by the following method. Specifically, the method for manufacturing a reinforcing fiber substrate (A1) may comprise a step (i) for introducing a discontinuous reinforcing fiber bundle into a dispersion medium; a step (ii) for preparing a slurry in which reinforcing fibers that form the reinforcing fiber bundle are dispersed in the dispersion medium; a step (iii) for obtaining a reinforcing fiber substrate (A1) by removing the dispersion medium from the slurry, wherein assuming the mass content ratio of the reinforcing fibers in the slurry prepared in the step (ii) to be C1 and the mass content ratio of the reinforcing fibers in the slurry at the beginning of the step (iii) to be C2, the ratio of C1/C2 is in the range of 0.8 or more but not more than 1.2. The method for manufacturing the reinforcing fiber substrate (A1) is preferred because it is applicable to reinforcing fibers with low affinity to the dispersion medium in the step of slurry preparation, keeps the fiber dispersibility of the reinforcing fibers at the time of forming a sheet, and is able to produce a reinforcing fiber substrate (A1) that imparts excellent mechanical characteristics to a molded product when the molded product is prepared by blending a resin and so on. C1/C2 is preferably in the range of 0.8 or more but not more than 1.2, and more preferably in the range of 0.9 or more but not more than 1.1.

The time required for the step (ii) is preferably 10 minutes or less, more preferably 5 minutes or less, and still more preferably 3 minutes or less. If it exceeds 10 minutes, depending on kinds of the reinforcing fibers, the reinforcing fibers dispersed in the slurry may flocculate again. The time required fro the step (ii) is, but not specifically limited to, usually 1 minute or more.

The flow rate of the slurry fed to the step (iii) is preferably 0.001 m$^3$/sec or more but not more than 0.1 m$^3$/sec, and more preferably 0.005 m$^3$/sec or more but not more than 0.05 m$^3$/sec. If it is less than 0.001 m$^3$/sec, productivity may be decreased because the amount of supply is too small and the process takes much time. If it exceeds 0.1 m$^3$/sec, the flow rate of slurry is too high, and the degree of dispersion may be insufficient because the slurry tends to suffer from excessive shearing.

In the steps (ii) to (iii), fiber concentration parameter $nL^3$ is preferably controlled in the range of $(0<) nL^3 < L/D$ to make a sheet. Here, each parameter is as follows:
n: Number of reinforcing fibers contained per unit volume of slurry
L: Length of reinforcing fibers
D: Diameter of reinforcing fibers FIG. 1 is a schematic diagram illustrating slurry consisting of a dispersion medium 2 and reinforcing fibers 1 contained in it. Doi, M, and Edwards, S. F., and The Theory of Polymer Dynamics 324 (1986) describes that slurry is considered to be in a dilute state when the fiber concentration parameter $nL^3$ is $nL^3 < 1$ and in a semi-dilute state when $1 < nL^3 < L/D$. The fiber concentration parameter $nL^3$ of less than L/D is preferred because the reinforcing fibers 1 dispersed in the slurry do not mechanically interfere with each other significantly, thereby preventing re-cohesion and enhancing the dispersibility of the reinforcing fibers 1 in the slurry. The concentration of the reinforcing fibers 1 decreases as the dispersibility of the reinforcing fiber 1 increases. Thus, a lower concentration of the reinforcing fibers 1 is preferred. However, in the case of ensuring a high metsuke (weight per unit area) or thickness of the resulting reinforcing fiber substrate (A1) or increasing the productivity of the reinforcing fiber substrate (A1), a higher concentration of the reinforcing fiber 1 is advantageous. Therefore, it is preferred to form a sheet shape at a reinforcing fiber concentration of $1 < nL^3 < L/D$, i.e., in a sub-dilute state.

In addition, the water content of the reinforcing fiber substrate (A) obtained is preferably adjusted to 10 mass % or less, and more preferably 5 mass % or less by a dehydration or drying step before being provided with a (meth) acrylic-based polymer in the step of providing the (meth) acrylic-based polymer in the step 2a. Therefore, the time required for the step 2a can be shortened and a prepreg can be obtained within a short time.

From the viewpoint that the dispersion of the reinforcing fibers is achieved effectively without being encumbered, and from the viewpoint that an effective reinforcing effect can be exerted by combining the reinforcing fiber substrate (A1) with the thermoplastic resin, the proportion of the reinforcing fiber in the reinforcing fiber substrate (A1) is preferably 80 mass % or more but not more than 100 mass %, more preferably 90 mass % or more but not more than 100 mass %. In this case, the proportion of the thermoplastic resin impregnated in the reinforcing fiber substrate in the subsequent step increases.

On the other hand, from the viewpoint of allowing the thermoplastic resin to be easily impregnated in the reinforcing fiber substrate (A1), fibrous or particulate thermoplastic resin is preferably mixed in the reinforcing fiber resin (A1) during the production of the reinforcing fiber resin (A1). As a result, the thermoplastic resin is arranged inside the reinforcing fiber substrate (A1). Thus, the thermoplastic resin can be easily impregnated in the reinforcing fiber substrate (A1) in the step of combining it with the thermoplastic resin by heat-melting. In this case, the thermoplastic resin is in a state of being preliminarily combined with the reinforcing fiber substrate (A1). In the dry process, this can be achieved by mixed carding of reinforcing fiber bundles and fibrous thermoplastic resin in the step 1a. In the wet process, for example, this can be achieved by mixing and processing reinforcing fiber bundles and fibrous thermoplastic resin into a sheet in, for example, the step 1a.

The metsuke (weight per unit area) of the reinforcing fiber substrate (A1) is preferably 10 g/m$^2$ or more but not more than 500 g/m$^2$, and more preferably 50 g/m$^2$ or more but not more than 300 g/m$^2$. If the metsuke is less than 10 g/m$^2$, the substrate may be broken and handleability may be decreased. If the metsuke exceeds 500 g/m$^2$, handleability may be decreased in the subsequent process because the wet process may take much time to dry the substrate or the dry process may lead to a thick web.

In the step 2a, 1 to 70 parts by mass of the reinforcing fiber substrate (A1) obtained in the step 1a is provided with 0.1 to 10 parts by mass of a (meth)acrylic-based polymer having a hydroxyl group in a side chain thereof. The (meth)acrylic-based polymer is important in order to improve the handleability of the reinforcing fiber substrate (A2) in the step and enhance the interface adhesiveness between the reinforcing fiber and the thermoplastic resin. If the (meth)acrylic-based polymer accounts for less than 0.1 parts by mass, it is difficult to withdraw the reinforcing fiber substrate (A2), and the productive efficiency of the fiber-reinforced thermoplastic resin composition decreases. If it exceeds 10 parts by mass, the interface adhesiveness between the reinforcing fiber and the thermoplastic resin decreases.

The use of a (meth)acrylic-based polymer having a hydroxyl group causes an increase in the interaction between (meth)acrylic-based polymer molecules and have an effect of enhancing the handleability of the reinforcing fiber substrate (A2). In addition, it also has an effect of enhancing the interface adhesiveness between the reinforcing fiber and the thermoplastic resin.

Examples of (meth)acrylic-based monomer units having a hydroxyl group that can form a (meth)acrylic-based polymer having a hydroxyl group in a side chain thereof include hydroxyl group-containing (meth)acrylic-based monomer units such as 2-hydroxyethyl acrylate, 2-hydroxypropyl acrylate, 4-hydroxybutyl acrylate, 2-hydroxyethyl methacrylate, 2-hydroxypropyl methacrylate, 4-hydroxybutyl methacrylate, glycerol monomethacrylate, glyceryl-1-methacryloyloxyethyl urethane3, 4-dihydroxy butyl-1-methacryloyloxyethyl urethane, α-hydroxymethyl acrylate, α-hydroxyethyl acrylate, diethylene glycol monoacrylate, triethylene glycol monoacrylate, polyethylene glycol monoacrylate, dipropylene glycol monoacrylate, tripropylene glycol monoacrylate, polypropylene glycol monoacrylate, dibutanediol monoacrylate, tributanediol monoacrylate, polytetramethylene glycol monoacrylate, diethylene glycol monomethacrylate, triethylene glycol monomethacrylate, polyethylene glycol monomethacrylate, dipropylene glycol monomethacrylate, tripropylene glycol monomethacrylate, polypropylene glycol monomethacrylate, dibutanediol monomethacrylate, tributanediol monomethacrylate, and polytetramethylene glycol monomethacrylate. Among others, 2-hydroxylethyl acrylate and 2-hydroxyethyl methacrylate, which are easily available, are preferred. These monomers may be used independently or in combination.

Other (meth)acrylic-based monomer units that form a (meth)acrylic-based polymer having a hydroxyl group in a side chain include: carboxyl group-containing (meth)acrylic-based monomers such as acrylic acid, methacrylic acid, maleic acid, maleic anhydride, itaconic acid, and β-carboxyethyl acrylate; (meth)acrylic acid (fluoro) alkyl esters such as methyl acrylate, ethyl acrylate, a n-butyl acrylate, isobutyl acrylate, t-butyl acrylate, cyclohexyl acrylate, and 2-ethylhexyl acrylate; lauryl acrylate, acrylic acid stearyl, benzyl acrylate isobornyl acrylate, methyl methacrylate, ethyl methacrylate, n-butyl methacrylate, t-butyl methacrylate, isobutyl methacrylate, cyclohexyl methacrylate, 2-ethylhexyl methacrylate, lauryl methacrylate, stearyl methacrylate, benzyl methacrylate, isobornyl methacrylate, and trifluoroethyl methacrylate; (meth)acrylic-based monomer units each having a dicyclo pentenyl group such as dicyclopentenyl acrylate, dicyclopentenyl oxyethyl acrylate, dicyclopentenyl methacrylate, and dicyclopentenyl oxyethyl methacrylate; amino group-containing (meth)acrylic-based monomer units such as N,N-dimethylaminoethyl methacrylate and N,N-diethylamino ethyl methacrylate; epoxy group-containing (meth)acrylic-based monomer units such as glycidyl acrylate, methyl glycidyl acrylate, glycidyl methacrylate, methyl glycidyl methacrylate, vinylbenzyl glycidyl ether, and 3, 4-epoxycyclohexyl methylmethacrylate; amid group-containing (meth)acrylic-based monomer units such as acrylamide, N,N-dimethyl acrylamide, N,N-diethyl acrylamide, N-isopropylacrylamide, N,N-dimethylaminopropyl acrylamide, N,N-diethylamino propylacrylamide, N-methylol acrylamide, N-(2-hydroxyethyl) acrylamide, N-(3-hydroxypropyl acrylamide), and N-(4-hydroxy butyl) acrylamide; urea group-containing (meth) acrylic-based monomer units such as N-(2-methacryloiloxy ethyl) ethylene urea, and N-(2-methacrylamide ethyl) ethylene urea; methoxy or ethoxy group-containing (meth) acrylic-based monomer units such as 2-methoxyethyl acrylate, 2-ethoxyethyl acrylate, 2-metoxyethyl methacrylate, and 2-ethoxyethyl methacrylate; carbonyl group-containing (meth)acrylic-based monomer units such as N-vinyl-polymers 2-pyrrolidone, and diacetone acrylamide; monomers and oligomers that contain metal atoms (such as Zn, Al, Ca, Mg, Zr, and Cu) in their molecules, such as zinc acrylate, zinc methacrylate, hybrid polyester acrylate oligomer "Sartomer (registered trademark) CN-2402" (Zn-containing acrylic oligomer of Sartomer Co., Ltd.), and hybrid polyester acrylate oligomer "Sartomer (registered trademark) 2405" (Zn-containing acrylic oligomer of Sartomer Co., Ltd.). They may be used independently or in combination.

The cohesive energy density CED of the (meth)acrylic-based copolymer having a hydroxyl group is preferably 385 to 500 MPa, more preferably 395 to 450 MPa, and still more preferably 405 to 420 MPa. If the cohesive energy density is 385 MPa or more, the permeability, wettablility, and affinity to the reinforcing fiber substrate (A1) and the thermoplastic resin increase favorably, and high interface adhesiveness tends to be achieved.

Here, with respect to the method for calculating the cohesive energy density CED (in MPa) of the above (meth) acrylic-based copolymer, it can be calculated in the same way as for the calculation of the cohesive energy density CED (in MPa) of the (meth)acrylic-based copolymer in a fiber-reinforced thermoplastic resin composition as described previously.

Regarding the (meth)acrylic-based monomer units having a hydroxyl group and other kinds of (meth)acrylic-based monomer units, the (meth)acrylic-based monomer units in which an acryloyloxy group or a methacryloyloxy group is bonded to a hydrogen and/or primary carbon atom preferably account for 60 mass % or more of the total (meth) acrylic-based monomer units that constitute the (meth) acrylic-based polymer in which an acryloyloxy group or a methacryloyloxy group is bonded to a hydrogen and/or primary carbon atom. It is more preferably 75 mass % or more, and still more preferably 90 mass % or more. In this range, the (meth)acrylic-based polymer is comparatively flexible and the handleability of the reinforcing fiber substrate (A2) can be improved. Besides, the comparatively high flexibility of the (meth)acrylic-based polymer serves to keep a flexible interface portion, or a flexible adhesion portion, for the adhesion between the reinforcing fiber and the (meth)acrylic-based polymer and between the (meth) acrylic-based polymer and the thermoplastic resin, leading to enhanced adhesiveness.

Providing a reinforcing fiber substrate (A1) with a (meth) acrylic-based polymer is preferably carried out in an aqueous solution, an emulsion, or a suspension which contains the (meth)acrylic-based polymer. The term "aqueous solution" means a solution in which the (meth)acrylic-based polymer is substantially completely dissolved in water. The term "emulsion" means a state in which a liquid containing a (meth)acrylic-based polymer forms fine particles dispersed in another liquid, or a dispersion medium. The term "suspension" means a state in which a solid (meth)acrylic-based polymer is suspended in water. The particle size of the components in the liquid is in the order of; aqueous solution<emulsion<suspension. Available methods for attaching a (meth)acrylic-based polymer to a reinforcing fiber substrate (A1) include, but not specifically limited to, immersing a reinforcing fiber substrate (A1) in an aqueous solution, emulsion, or suspension that contains the (meth) acrylic-based polymer, and spraying an aqueous solution emulsion, or suspension that contains the (meth)acrylic-based polymer over the reinforcing fiber substrate (A1). After the attachment step, it is preferred to remove the excess amount of the aqueous solution, emulsion, or suspension is preferably removed by, for example, suction or absorption using an absorber such as absorbent paper.

In this case, furthermore, the reinforcing fiber substrate (A1) is preferably heated in the step 2a after attaching the (meth)acrylic-based polymer. This removed water from the reinforcing fiber substrate (A1) provided with the (meth) acrylic-based polymer, shortens the time required for the step 3a, and produces a fiber-reinforced thermoplastic resin composition in a short period of time. The heating temperature can be set appropriately, and is preferably 100° C. or more but not more than 300° C., and more preferably 120° C. or more but not more than 250° C.

To produce a large amount of a reinforcing fiber substrate (A2) provided with a (meth)acrylic-based polymer in a short time in the step 2a, it is preferred to take it off by pulling. In this case, it is preferably pulled out under a tensile strength of 1 N/cm or more to avoid the generation of creases and warps on the reinforcing fiber substrate (A2). The tensile strength is more preferably 3 N/cm or more, and still more preferably 5 N/cm or more. The tensile strength to be applied to the reinforcing fiber substrate (A2) can be controlled by changing the type of (meth)acrylic-based polymer and the amount thereof attached. The larger the amount attached, the larger the tensile strength that can be applied. In addition, when the tensile strength applied is less than 1 N/cm, the reinforcing fiber substrate (A2) tends to break off easily. From the viewpoint of handleability of the reinforcing fiber substrate (A2), the tensile strength is preferably 1 N/cm$^2$ or more. Although the upper limit of the tensile strength is not specifically limited, a low tensile strength up to 100 N/cm serves sufficiently to increase the handleability of the reinforcing fiber substrate (A2).

In the step 3a, a thermoplastic resin is impregnated in the reinforcing fiber substrate (A2) provided with the (meth) acrylic-based polymer obtained in the step 2a to combine the reinforcing fiber substrate (A2) and the thermoplastic resin, thereby obtaining a fiber-reinforced thermoplastic resin composition. Here, the thermoplastic resin can be selected based on the same philosophy as that for the thermoplastic resin in the aforementioned fiber-reinforced thermoplastic resin composition. Particularly, from the viewpoint of lightweight of the resulting molded product, polyolefin is preferred. From the viewpoint of strength, polyamide is preferred. From the viewpoint of surface appearance, an amorphous resin such as polycarbonate or styrene-based resin is preferred. From the viewpoint of heat resistance, polyarylene sulfide is preferred. From the viewpoint of continuous operation temperature, polyether ether ketone is preferred. From the viewpoint of chemical resistance, fluorine-based resin is preferred. Here, the thermoplastic resin to be used may be a thermoplastic resin composition composed of two or more of these thermoplastic resins as long as the object of the present invention is not impaired.

With respect to the contents of the reinforcing fiber, (meth)acrylic-based polymer and thermoplastic resin in the resulting fiber-reinforced thermoplastic resin composition, the reinforcing fiber account for 1 to 70 mass %, the (meth)acrylic-based polymer (B) for 0.1 to 10 mass %, and the thermoplastic resin for 20 to 98.9 mass %. Contents in these ranges lead to easy production of a molded product that can allow the reinforcing fiber to work efficiently for reinforcement. It is more preferred that the reinforcing fiber account for 10 to 60 mass %, the (meth)acrylic-based polymer for 0.5 to 10 mass %, and the thermoplastic resin for 30 to 89.5 mass %. It is still more preferred that the reinforcing fiber account for 20 to 60 mass %, the (meth) acrylic-based polymer for 1 to 8 mass %, and the thermoplastic resin for 32 to 79 mass %.

A thermoplastic resin and a reinforcing fiber substrate (A2) provided with a (meth)acrylic-based polymer can be combined together by contacting the thermoplastic resin to the reinforcing fiber substrate (A2). In this case, the form of the thermoplastic resin is, but not specifically limited to, preferably at least one selected from, for example, textiles, nonwoven fabrics, and films. Although the contacting method is not specifically limited, an exemplary method is to prepare two sheets of textiles, fabrics, or films made of the thermoplastic resin and attach the sheets to the upper and lower surfaces of the reinforcing fiber substrate (A2) provided with a (meth)acrylic-based polymer.

A combination of the thermoplastic resin and the reinforcing fiber substrate (A2) provided with a (meth)acrylic-based polymer is preferably formed by carrying out pressurization and/or heating, and more preferably formed by simultaneously carrying out pressurization and heating. The applied pressure is preferably 0.01 MPa or more but not more than 10 MPa, and more preferably 0.05 MPa or more but not more than 5 MPa. The heating is preferably performed at a temperature that allows the thermoplastic resin used to dissolve or flow, and is preferably in the temperature range of 50° C. or more but not more than 400° C., and more preferably 80° C. or more but not more than 350° C. Pressurization and/or heating can be performed in a state where the thermoplastic resin is in contact with the reinforcing fiber substrate (A2) provided with a (meth)acrylic-based polymer. For example, there is a method in which two sheets of textiles, fabrics, or films made of the thermoplastic resin are prepared and attached to the upper and lower surfaces of the reinforcing fiber substrate (A2) provided with a (meth)acrylic-based polymer, followed by being pressurized and/or heated from both sides (e.g., sandwiching in a double belt press apparatus).

The present invention further includes a step 4a in addition to the above steps 1a to 3a. The step 4a is a step of taking off the fiber-reinforced thermoplastic resin composition obtained in the step 3a at a speed of 1 m/min or more. By forming a composite of a (meth)acrylic-based polymer having a hydroxyl group in a side chain thereof and a thermoplastic resin, the reinforcing fiber substrate (A2) is more firmly reinforced by the thermoplastic resin to allow the fiber-reinforced thermoplastic resin to be pulled at the above-mentioned speed. The fiber-reinforced thermoplastic resin composition can be taken off by winding it around a roll. The pulling speed is preferably 3 m/min, more preferably 5 m/min, and still more preferably 10 m/min or more. The upper limit of the pulling speed is 100 m/min or less, and more preferably 30 m/min or less.

To allow the fiber-reinforced thermoplastic resin composition to be obtained in a short time, it is more preferred that all the steps from 1a to 4a are carried out on-line. The term "on-line" is used to describe a process where the steps are performed continuously as a series and is a word having a meaning opposite to that of the term "off-line" where the respective steps are independently performed.

Furthermore, in the step 1a, it is preferred that the dispersion medium and the reinforcing fiber bundle are continuously introduced and the steps (i) to (iii) are continuously performed. Thus, the reinforcing fiber substrate (A1) can be obtained in a larger amount in a shorter time. In addition, if a large amount of slurry is introduced at a time, part of the slurry may take a long time to be shaped into a sheet to cause poor dispersion. However, by continuously carrying out from the step (i) to the step (iii), the slurry can be introduced in a small amount at a time to efficiently form a sheet while keeping a good dispersion state. Here, the term "continuously performed" means that raw materials are intermittently or continuously introduced in the step (i), followed by continuous implementation of the steps (i) to (iii). In other words, it means a state of where supply of raw material for dispersed slurry and the supply of the slurry to the subsequent steps are performed continuously and it is a process that takes mass production into account. Examples of the continuous introduction method include feeding at a constant speed and feeding a nearly constant amount at predetermined intervals. Typical conditions for feeding at a constant speed include feeding rates of $1\times10^3$ g/min or more but not more than $1\times10^7$ g/min for the dispersion medium, and 0.1 g/min or more but not more than $1\times10^5$ g/min for the reinforcing fiber. Typical conditions for feeding a nearly constant amount at predetermined intervals include feeding at intervals of 1 to 5 minutes a dispersion medium at a rate of $1\times10^3$ g or more but not more than $1\times10^7$ g and a reinforcing fiber bundle at a rate of 0.1 g or more but not more than $1\times10^5$ g.

A second embodiment of the method for manufacturing the fiber-reinforced thermoplastic resin composition of the present invention is a fiber-reinforced thermoplastic resin composition production process consisting of the steps 1b, 2b, and 3b described below.

Step 1b: a step for processing discontinuous reinforcing fiber bundles in which 0.1 to 10 parts by mass of the (meth)acrylic-based polymer having a hydroxyl group in a side chain is attached to 1 to 70 parts by mass of the reinforcing fiber bundles into a sheet-shaped reinforcing fiber substrate (A2);

Step 2b: a step for obtaining a fiber-reinforced thermoplastic resin composition by combining 1.1 to 80 mass % of the reinforcing fiber substrate (A2) provided with the (meth)acrylic-based polymer, which is obtained in the step 1b, with 20 to 98.9 mass % of the thermoplastic resin;

Step 3b: a step for taking off the fiber-reinforced thermoplastic resin composition obtained in the step 2b at a rate of 1/min or more.

The difference from the first embodiment is that a reinforcing fiber bundle previously provided with a (meth)acrylic-based polymer is used in the step 1b. Specifically, a reinforcing fiber bundle previously provided with a (meth)acrylic-based polymer can be prepared by immersing the reinforcing fiber bundle in an aqueous solution, emulsion, or suspension of the (meth)acrylic-based polymer, spraying any of them over the reinforcing fiber bundle, or immersion by the curtain coat method, followed by drying.

The step 2b and the step 3b are the same as the step 3a and the step 4b of the first embodiment, respectively.

A third embodiment of the method for manufacturing the fiber-reinforced thermoplastic resin composition of the present invention is a fiber-reinforced thermoplastic resin composition production process consisting of the steps 1c, 2c, and 3c described below.

Step 1c: a step for obtaining a reinforcing fiber substrate (A2) provided with a (meth)acrylic-based polymer by processing discontinuous reinforcing fiber bundles into a sheet-shaped reinforcing fiber substrate (A1), concurrently with providing the reinforcing fiber substrate (A1) with a (meth)acrylic-based polymer having a hydroxyl group in a side chain in an amount of 0.1 to 10 parts by mass per 1 to 70 mass % of the reinforcing fiber substrate (A1);

Step 2c: a step for obtaining a fiber-reinforced thermoplastic resin composition by combining 1.1 to 80 mass % of the reinforcing fiber substrate (A2) provided with a (meth)acrylic-based polymer, which is obtained in the step 1c, with 20 to 98.9 mass % of the thermoplastic resin;

Step 3c: a step for taking off the fiber-reinforced thermoplastic resin composition obtained in the step 2c at a rate of 1 m/min or more.

The difference from the first embodiment is that discontinuous reinforcing fiber bundles are processed into a sheet-shaped reinforcing fiber substrate (A1) while at the same time the (meth)acrylic-based polymer is attached in the step 1c. Specifically, when the step 1c is performed by a dry process, available methods include applying a jet of a gas such as air and inert gas to the reinforcing fiber bundle to open it while at the same time spreading or spraying an aqueous solution, emulsion, or suspension of the (meth)acrylic-based polymer over the reinforcing fiber bundles. When the reinforcing fiber bundle is opened by a non-contact process such as carding, needle punch, or roller opening, an aqueous solution, emulsion, or suspension of the (meth)acrylic-based polymer is attached by immersion, spreading, or spraying. When performing the step 1c by a wet process, the (meth)acrylic-based polymer is previously introduced into a dispersion tank where the reinforcing fiber bundles are dispersed, and the reinforcing fiber bundles are dispersed to prepare the reinforcing fiber substrate (A1) and simultaneously the reinforcing fiber substrate (A1) is provided with the (meth)acrylic-based polymer.

The steps 2c and 3c are the same as the steps 3a and 4a, respectively, of the first embodiment.

In the first embodiment, the (meth)acrylic-based polymer is attached in a subsequent step. Thus, reinforcing fiber bundles can be easily dispersed in the first embodiment compared with the second embodiment where reinforcing fiber bundles are provided with the (meth)acrylic-based polymer and bundled in advance. Similarly, the first embodiment allows the reinforcing fiber bundles to be dispersed more easily compared with the third embodiment where the reinforcing fiber bundle is processed into a sheet-shaped reinforcing fiber substrate (A1) and simultaneously provided with the (meth)acrylic-based polymer. For example, in the wet process, a large amount of (meth)acrylic-based polymer is introduced into a dispersion tank in the third embodiment, whereas there is no need of introducing the (meth)acrylic-based polymer into a dispersion tank in the first embodiment. Therefore, the reinforcing fiber bundles can be easily dispersed. Therefore, the first embodiment is most preferred.

To process the fiber-reinforcing thermoplastic resin composition into a molding material to be used for injection molding, an additional step for cutting the obtained fiber-reinforced thermoplastic composition into pieces of 3 to 30 mm in both the length and width directions may be provided after any of the steps 4a, 3b, and 3c. In consideration of the handleability of the molding material (e.g., supply stability to an injection molding apparatus) and the mechanical characteristics of the resulting molded product, it is preferred to cut to 3 to 10 mm in both the length and width directions.

The fiber-reinforced thermoplastic resin composition and the reinforcing fiber bundle of the present invention can be used in various applications. It is particularly suitable for automobile parts like various modules such as instrumental panels, door beams, under covers, lamp housings, pedal housings, radiator supports, spare tire covers, and front ends; parts of electric and electronic apparatuses such as laptop computers, cell phones, digital still cameras, PDAs, and plasma displays; and parts of household and office electric appliances such as telephone sets, facsimiles, VTRs, copiers, television sets, electronic ovens, acoustic devices, toiletries, laser discs, refrigerators, and air conditioners; parts of civil engineering and construction; and aircraft parts. Among them, the parts of electric and electronic apparatuses and the parts of automobiles are preferred.

EXAMPLES

The present invention wilt be described below in further details. Here, the raw materials used in the examples are as follows:

(Raw Material 1) Reinforcing Fiber Bundle A1 (PAN-Based Carbon Fiber)

Reinforcing fiber bundle A1 was produced as follows. Using a copolymer consisting of 99.4 mol % of acrylonitrile (AN) and 0.6 mol % of methacrylic acid, an acrylic-based fiber bundle having a single fiber denier of 1 d and the number of filaments of 24,000 was obtained by the wet-and-dry spinning method. The acrylic-based fiber bundle obtained was heated at a temperature of 240 to 280° C. in air at a draw ratio of 1.05 to covert it into fire-retardant fiber. Subsequently, a temperature-increasing rate was set to 200° C./min, and 10% extension was then performed in the temperature range of 300 to 900° C. in a nitrogen atmosphere. After that, sintering was performed after increasing the temperature to 1,300° C., thereby obtaining a carbon fiber bundle. In an aqueous solution containing sulfuric acid as electrolyte, the carbon fiber bundle was subjected to electrolytic surface treatment at 3 coulombs per gram of carbon fiber, and then dried in air heated at a temperature of 120° C., thereby obtaining a reinforcing fiber bundle A1 (PAN-based carbon fiber). The physical properties of reinforcing bundle A1 are as listed below.

Total number of filaments: 24,000
Diameter of single fiber: 7 μm
Mass per unit length: 0.8 g/m
Specific gravity: 1.8 g/cm$^3$
Tensile strength: 4.2 GPa
Modulus of elongation: 230 GPa
O/C: 0.10.

(Raw Material 2) Reinforcing Fiber Bundle A2 (PAN-Based Carbon Fiber)

Reinforcing fiber bundle A2 was produced as follows. Using a copolymer consisting of 99.4 mol % of acrylonitrile (AN) and 0.6 mol % of methacrylic acid, an acrylic-based fiber bundle having a single fiber denier of 1 d and the number of filaments of 24,000 was obtained by the wet-and-dry spinning method. The acrylic-based fiber bundle obtained was heated at a temperature of 240 to 280° C. in air at a draw ratio of 1.05 to covert it into fire-retardant fiber. Subsequently, a temperature-increasing rate was set to 200° C./min, and 10% extension was then performed in the temperature range of 300 to 900° C. in a nitrogen atmosphere. After that, sintering was performed after increasing the temperature to 1,300° C., thereby obtaining a carbon fiber bundle. In an aqueous solution containing ammonium bicarbonate as electrolyte, the carbon fiber bundle was subjected to electrolytic surface treatment at 80 coulombs per gram of carbon fiber, and then dried in air heated at a temperature of 120° C., thereby obtaining a reinforcing fiber bundle A2 (PAN-based carbon fiber). The physical properties of reinforcing bundle A2 are described below.

Total number of filaments: 24,000
Diameter of single fiber: 7 μm
Mass per unit length: 0.8 g/m
Specific gravity: 1.8 g/cm$^3$
Tensile strength: 4.2 GPa
Modulus of elongation: 230 GPa
O/C: 0.20.

(Raw Material 3) Reinforcing Fiber Bundle A3 (PAN-Based Carbon Fiber)

Reinforcing fiber bundle A3 was produced as follows: Using a copolymer consisting of 99.4 mol % of acrylonitrile (AN) and 0.6 mol % of methacrylic acid, an acrylic-based fiber bundle having a single fiber denier of 1 d and the number of filaments of 24,000 was obtained by the wet-and-dry spinning method. The acrylic-based fiber bundle obtained was heated at a temperature of 240 to 280° C. in air at a draw ratio of 1.05 to covert it into fire-retardant fiber. Subsequently, a temperature-increasing rate was set to 200° C./min, and 10% extension was then performed in the temperature range of 300 to 900° C. in a nitrogen atmosphere. After that, sintering was performed after increasing the temperature to 1,300° C., thereby obtaining a carbon fiber bundle. In an aqueous solution containing ammonium bicarbonate as electrolyte, the carbon fiber bundle was subjected to electrolytic surface treatment at 3 coulombs per gram of carbon fiber, provided with a sizing agent by the dipping method, and then dried in air heated at a temperature of 120° C., thereby obtaining a reinforcing fiber bundle A3 (PAN-based carbon fiber). The physical properties of reinforcing bundle A3 are illustrated.

Total number of filaments: 24,000
Diameter of single fiber: 7 μm
Mass per unit length: 0.8 g/m
Specific gravity: 1.8 g/cm$^3$
Tensile strength: 4.2 GPa
Modulus of elongation: 230 GPa
O/C: 0.10
Type of sizing agent: polyoxyethylene oleyl ether
Amount of sizing agent attached: 1.5 mass %

(Row Material 4) (Meth)Acrylic-Based Polymer P (1)

To a 1-litter four-neck flask equipped with an agitating device, a temperature sensor, a reflux condenser, and a monomer-dropping opening, 137.4 g of ion-exchanged water was poured, and then deoxidized by repeating deaeration and bubbling with nitrogen gas several times until a dissolved oxygen concentration of 2 mg/L or less was attained. Subsequently, heating was started. Blowing of nitrogen gas was continued in the subsequent emulsion-polymerization step.

One hundred grams of an acrylic monomer mixture containing 35.0 g of methyl methacrylate (MMA), 54.0 g of n-butyl methacrylate (BMA), 1.0 g of methacrylic acid (MA), and 10.0 g of 2-hydroxyethyl methacrylate (HEM) was mixed with 8.0 g of Adeka Reasoap (registered trademark) SR-1025 (reactive emulsifier, 25% aqueous solution, manufactured by Adeka Co., Ltd.) and 39.7 g of ion-exchanged water for pre-emulsion production, and the mixture was then emulsified by an emulsifier at 10,000 rpm for 10 minutes to produce a pre-emulsion.

When the inner temperature of the flask reached a polymerization temperature of 75° C., 10 wt % (14.8 g) of the pre-emulsion was fed in the flask. At the time when the inner temperature of the flask was recovered to the polymerization temperature of 75° C., 0.2 g of ammonium persulfate, which was used as polymerization initiator, was added, followed by continuing emulsion polymerization at 75° C. for 1 hour.

After dropping the remainder, 90 wt % (132.9 g), of pre-emulsion into the flask over 3 hours, polymerization was further performed at 75° C. for 30 minutes. Subsequently, an aging reaction was performed by heating for 30 minutes to increase the temperature to 80° C. After 30 minutes of heating, 0.020 g of ammonium persulfate and 0.400 g of ion-exchanged water were added. After another 30 minutes, 0.010 g of ammonium persulfate and 0.200 g of ion-exchanged water were further added. After the addition, the aging reaction was further carried out for 30 minutes, followed by cooling.

Cooling was performed until the temperature reached 40° C. or less. Then, 0.05 g of Adekanate (registered trademark) B-1016 (defoaming agent, manufactured by Adeka Co., Ltd.) was added, followed by further stirring for 30 minutes. Subsequently, 0.47 g of 25% ammonia water and 393.5 g of ion-exchanged dilution water were added, thereby producing an emulsion containing 15.0 mass % of a (meth)acrylic-based polymer (P1).

Hereinafter, in the description in tables as well, (meth) acrylic-based polymers may be abbreviated as follows: methyl methacrylate (MMA), n-butyl methacrylate (BMA), cyclohexyl acrylate (CHA), methacrylic acid isobornyl (IBOMA), acrylic acid (AA) methacrylic acid (MAA), 2-hydroxyethyl methacrylate (HEMA), N-(2-methacryloiloxy-ethyl) ethylene urea (MEEU), and N-2-hydroxyethyl acrylamide (HEAA).

(Raw Materials 5 to 13) (Meth)Acrylic-Based Polymer P (2-8, 11, 12)

Using the compositions of (meth)acrylic-based monomers and reactive emulsifiers listed in Tables 1-2 to 1-6, emulsions containing 15.0 mass % of (meth)acrylic-based polymers were prepared in a manner similar to that for the (meth)acrylic-based polymer P(1).

(Raw Material 14) (Meth)Acrylic-Based Polymer P (9)

Polyacrylamide (50 mass % aqueous solution) manufactured by Aldrich was used.

(Raw Material 15) (Meth)Acrylic-Based Polymer P (10)

Polyment (registered trademark) SK1000 manufactured by Nippon Shokubai Co., Ltd. was used.

(Raw Material 16) Thermoplastic Resin (Unmodified Polypropylene Resin)

Prim Polypro (registered trademark) J105G manufactured by Prime Polymer Co., Ltd. was used. The physical properties thereof are as follows:
Specific gravity: 0.91
Melting point: 160° C.

(Raw Material 17) Thermoplastic Resin (Acid-Modified Polypropylene Resin)

Adomer (registered trademark) QE510 manufactured by Mitsui Chemicals, Inc. was used. The physical properties thereof are as follows:
Specific gravity: 0.91
Melting point: 160° C.

(Raw Material 18) Thermoplastic Resin (Polyamide-6 Resin)

Amilan (registered trademark) CM1001 manufactured by Toray Industries, Inc. was used. The physical properties thereof are as follows:
Specific gravity: 1.13
Melting point: 225° C.

(Raw Material 19) Reinforcing Fiber Bundle A4 (PAN-Based Carbon Fiber)

Reinforcing fiber bundle A4 was produced as follows. Using a copolymer consisting of 99.4 mol % of acrylonitrile (AN) and 0.6 mol % of methacrylic acid, an acrylic-based fiber bundle having a single fiber denier of 1 d and the number of filaments of 12,000 was obtained by the wet-and-dry spinning method. The acrylic-based fiber bundle obtained was heated at a temperature of 240 to 280° C. in air at a draw ratio of 1.05 to covert it into fire-retardant fiber. Subsequently, the temperature-increasing rate was set to 200° C./min, and 10% extension was then performed in the temperature range of 300 to 900° C. in a nitrogen atmosphere. After that, sintering was performed after increasing the temperature to 1,300° C., thereby obtaining a carbon fiber bundle. In an aqueous solution containing sulfuric acid as electrolyte, the carbon fiber bundle was subjected to electrolytic surface treatment at 3 coulombs per gram of carbon fiber, provided with a sizing agent by the dipping method, and then dried in air heated at a temperature of 120° C., thereby obtaining a reinforcing fiber bundle A4 (PAN-based carbon fiber). The physical properties of reinforcing fiber bundle A4 are described below.
Total number of filaments: 12,000
Diameter of single fiber: 7 μm
Mass per unit length: 0.8 g/m
Specific gravity: 1.8 g/cm$^3$
Tensile strength: 4.2 GPa
Modulus of elongation: 230 GPa
O/C: 0.10
Type of sizing agent: polyoxyethylene oleyl ether
Amount of sizing agent attached: 0.6 mass %

(Raw Material 20) Reinforcing Fiber Bundle A5 (PAN-Based Carbon Fiber)

Reinforcing fiber bundle A5 was produced as follows: Using a copolymer of 99.4 mol % of acrylonitrile (AN) and 0.6 mol % of methacrylic acid, an acrylic-based fiber bundle having a single fiber denier of 1 d and the number of filaments of 24,000 was obtained by the wet-and-dry spinning method. The acrylic-based fiber bundle obtained was heated at a temperature of 240 to 280° C. in air at a draw ratio of 1.05 to covert it into fire-retardant fiber. Subsequently, the temperature-increasing rate was set to 200° C./min, and 10% extension was then performed in the temperature range of 300 to 900° C. in a nitrogen atmosphere. After that, sintering was performed after increasing the temperature to 1,300° C., thereby obtaining a carbon fiber bundle. In an aqueous solution containing ammonium bicarbonate as electrolyte, the carbon fiber bundle was subjected to electrolytic surface treatment at 80 coulombs per gram of carbon fiber, provided with a sizing agent by the dipping method, and then dried in air heated at a temperature of 120° C., thereby obtaining a reinforcing fiber bundle A5 (PAN-based carbon fiber). The physical properties of reinforcing fiber bundle A5 are described below.
Total number of filaments: 2,4000
Diameter of single fiber: 7 μm
Mass per unit length: 0.8 g/m
Specific gravity; 1.8 g/cm$^3$
Tensile strength: 4.2 GPa
Modulus of elongation: 230 GPa
O/C: 0.20
Type of sizing agent: polyoxyethylene oleyl ether
Sizing agent attached: 1.5 mass %

(Raw Material 21) Reinforcing Fiber Bundle A6 (Glass Fiber)

PF-E 001 (trade name) manufactured by Nitto Boseki Co., Ltd. was used as reinforcing fiber bundle A6.

(Raw Material 22) Reinforcing Fiber Bundle A7 (PAN-Based Carbon Fiber)

Reinforcing fiber bundle A7 was produced as follows: Using a copolymer of 99.4 mol % of acrylonitrile (AN) and 0.6 mol % of methacrylic acid, an acrylic-based fiber bundle having a single fiber denier of 1 d and the number of filaments of 24,000 was obtained by the wet-and-dry spinning method. The acrylic-based fiber bundle obtained was heated at a temperature of 240 to 280° C. in air at a draw ratio of 1.05 to covert it into fire-retardant fiber. Subsequently, the temperature-increasing rate was set to 200° C./min, and 10% extension was then performed in the temperature range of 300 to 900° C. in a nitrogen atmosphere. After that, sintering was performed after increasing the temperature to 1,300° C., thereby obtaining a carbon fiber bundle. In an aqueous solution containing sulfuric acid as electrolyte, the carbon fiber bundle was subjected to electrolytic surface treatment at 3 coulombs per gram of carbon fiber, provided with a sizing agent by the dipping method, and then dried in air heated at a temperature of 120° C., thereby obtaining a reinforcing fiber bundle A7 (PAN-based carbon fiber). The physical properties of reinforcing fiber bundle A7 are described below.

Total number of filaments: 2,4000
Diameter of single fiber: 7 μm
Mass per unit length; 0.8 g/m
Specific gravity: 1.8 g/cm³
Tensile strength: 4.2 GPa
Modulus of elongation: 230 GPa
O/C: 0.10
Type of sizing agent: (meth)acrylic-based polymer B1
Sizing agent attached: 0.5 mass %

(Raw Material 23) (Meth)Acrylic-Based Polymer B1

An emulsion containing 15.0 mass % of (meth)acrylic-based polymer B1 was produced in a manner similar to that for the (meth)acrylic-based polymer P (1), except using 100 g of a (meth)acrylic monomer mixture containing 35.0 g of methyl methacrylate, 54.0 g of n-butyl methacrylate, 1.0 g of acrylic acid, and 10.0 g of 2-hydroxyethyl methacrylate.

(Raw Material 24) (Meth)Acrylic-Based Polymer B2

An emulsion containing 15.0 mass % of (meth)acrylic-based polymer B2 was produced in a manner similar to that for the (meth)acrylic-based polymer B1, except using 100 g of a (meth)acrylic monomer mixture containing 60.0 g of n-butyl methacrylate, 36.0 g of isobornyl methacrylate, 1.0 g of acrylic acid, and 3.0 g of 2-ethylhexyl methacrylate.

(Raw Material 25) (Meth)Acrylic-Based Polymer B3

An emulsion containing 15.0 mass % of (meth)acrylic-based polymer B3 was produced in a manner similar to that for the (meth)acrylic-based polymer B1, except that 100 g of a (meth)acrylic monomer mixture was used. The mixture contained 29.0 g of methyl methacrylate, 60.0 g of cyclohexyl acrylate, 1.0 g of acrylic acid, and 10.0 g of 2-hydroxyethyl methacrylate.

(Raw Material 26) (Meth)Acrylic-Based Polymer B4

In a manner similar to that for (meth)acrylic-based polymer B1, an emulsion containing 15.0 mass % of (meth) acrylic-based polymer B4 was produced, except using 100 g of a (meth)acrylic monomer mixture containing 30.0 g of methyl methacrylate, 50.0 g of cyclohexyl acrylate, 10.0 g of 2-hydroxyethyl methacrylate and 10.0 g of N-(2-methacryloyloxyethyl)ethylene urea.

(Raw Material 27) (Meth)Acrylic-Based Polymer B5

An emulsion containing 15.0 mass % of (meth)acrylic-based polymer B5 was produced in a manner similar to that for the (meth)acrylic-based polymer B1, except using 100 g of a (meth)acrylic monomer mixture containing 30M g of methyl methacrylate, 50.0 g of cyclohexyl acrylate, and 20.0 g of N-2-hydroxyethyl acrylamide.

(Raw Material 28) (Meth)Acrylic-Based Polymer B6

An emulsion containing 15.0 mass % of (meth)acrylic-based polymer B6 was produced in a manner similar to that for the (meth)acrylic-based polymer B1, except using 100 g of a (meth)acrylic monomer mixture containing 35.0 g of methyl methacrylate, 54.0 g of n-butyl methacrylate, 1.0 g of acrylic acid, and 10.0 g of 2-ethylhexyl methacrylate.

(Raw Material 29) Polyvinyl Alcohol B7

Polyvinyl alcohol (polymerization degree: 200) manufactured by Nacalai Tesque, Inc. was used.

(Raw Material 30) Thermoplastic Resin (PPS Resin)

Torelina (registered trademark) A900 manufactured by Toray Industries, Inc. was used. The physical properties thereof are as follows:

Specific gravity: 1.34
Melting point: 278° C.

<Measurement of Tensile Strength and Tensile Modulus of Reinforcing Fiber Bundle>

The tensile strength and tensile modulus of a reinforcing fiber bundle were calculated by the procedure described in Japanese Industrial Standard (JIS)-R-7601 "Resin Impregnated. Strand Test Methods". Here, the resin impregnated strand of carbon fibers to be measured was formed by impregnating carbon fibers with Bakelite (registered trademark) ERL4221 (100 parts by mass)/boron trifluoride monoethylamine (3 parts by mass)/acetone (4 parts by mass), and curing at 130° C. for 30 minutes. The number of stands measured was six and the average values of the measurement results were assumed to represent the tensile strength and tensile modulus of the carbon fibers.

<Measurement of O/C of Reinforcing Fiber Bundle>

The surface oxygen concentration (O/C) of a reinforcing fiber bundle was calculated by the following procedure using X-ray photoelectron spectroscopy. First, carbon fibers, from which extraneous matter on the surface was removed with a solvent, were cut to 20 mm and then spread and placed on a sample-holding stage made of cupper. AlKα1,2 was used as X ray source, and the inside of a specimen chamber was kept at 1×10⁸ Torr. As the correcting value of the peak for electrification during the measurement, the kinetic energy value (K.E.) of the main peak of $C_{1s}$ was fitted to 1,202 eV. The $C_{1s}$ peak area was determined by drawing a straight base line in the range of 1,191 to 1,205 eV as K.E. The $O_{1s}$ peak area was determined as K.E. by drawing a straight base line in the range of 947 to 959 eV.

O/C was determined as an atom number ratio using a sensitivity correcting value inherent in a device from the ratio of the $O_{1s}$ peak area and the $C_{1s}$ peak area. As a device for X ray photoelectron spectroscopy for chemical analysis, Model ES-200 manufactured by International Electric Co., Ltd. was used and the sensitivity correcting value was assumed to be 1.74.

<Measurement of the Amount of Sizing Agent Adhered to Reinforcing Fiber Bundle>

Approximately 5 g of a sizing-agent-adhered reinforcing fiber bundle was taken as a sample and placed in a heat-resistant container. Then, the container was dried at 120° C. for 3 hours. It was cooled to room temperature in a desiccator with care to avoid moisture absorption. After that, the mass measured was defined as $W_1$ (g). Subsequently, the entire container was heated at 450° C. in a nitrogen atmosphere for 15 minutes, and similarly cooled to room temperature in a desiccator with care to avoid moisture absorption. After that, the mass measured was defined as $W_2$ (g). After the above procedure, the amount of the sizing agent adhered to the carbon fiber was calculated from the following equation.

$$\text{Adhered amount (mass \%)} = 100 \times \{(W_1 - W_2)/W_2\}$$

Here, the measurement was performed three times and the average was employed as the adhered amount.

<Measurement of the Amount of (Meth)Acrylic-Based Polymer Adhered to Reinforcing Fiber Bundle>

Approximately 5 g of a (meth)acrylic-based polymer-adhered carbon fiber was taken as a sample and placed in a heat-resistant container. Then, the container was dried at 120° C. for 3 hours. It was cooled to room temperature in a desiccator with care to avoid moisture absorption. After that, the mass measured was defined as $W_1$ (g). Subsequently, the entire container was heated at 450° C. in a nitrogen atmosphere for 15 minutes, and similarly cooled to room temperature in a desiccator with care to avoid moisture absorption. After that, the mass measured was defined as $W_2$ (g). After the above procedure, the amount of the (meth)acrylic-based polymer adhered to the carbon fiber was calculated from the following equation.

$$\text{Adhered amount (mass \%)} = 100 \times \{(W_1 - W_2)/W_2\}$$

Here, the measurement was performed three times and the average was employed as the adhered amount.

<Measurement of Tan δ and Young's Modulus E' of (Meth)Acrylic-Based Polymer>

Using Reogel E4000 (dynamic viscoelasticity measuring apparatus, manufactured by UBM Co., Ltd.), tan δ and Young's modulus E' of (meth)acrylic-based polymer were measured. The measurement conditions were as follows: Measuring method: dynamic viscoelasticity measurement (sin wave), measurement mode: temperature dependency, chuck: tension, waveform: sin wave, vibration type: stop vibration, initial load: initial strain control (0.02 mm), conditions; a frequency of 1 Hz, a measurement-starting temperature of 10° C., a step temperature of 1° C., a measurement-finish temperature of 170° C., and a temperature-increasing rate of 4° C./min.

<Measurement of Acid Value and Hydroxyl Value of (Meth)Acrylic-Based Polymer>

The acid value and hydroxyl value of (meth)acrylic-based polymer were measured based on JIS K0070.

(<Measurement of Weight Average Molecular Weight of (Meth)Acrylic-Based Polymer>

The molecular weight of a (meth)acrylic-based polymer was measured by gel permeation chromatography (GPC). A GPC column filled with a polystyrene cross-linked gel was used. The measurement was carried out using 1,2,4-trichlorobenzene as solvent at 150° C. The molecular weight was calculated as weight molecular weight in terms of standard polystyrene.

Reference Example 1

Method for Manufacturing Injection-Molded Product

A reinforcing fiber bundle on which a (meth)acrylic-based polymer was adhered was obtained by providing the reinforcing fiber bundle with an emulsion or an aqueous solution of a (meth)acrylic-based polymer by dipping and then drying at 140° C. for 5 minutes. The adhered amount was adjusted using either appropriately adjusting the concentration of the emulsion or aqueous solution of a (meth)acrylic-based polymer or repeating dipping and drying several times, or performing both of them. The resulting reinforcing fiber bundle was cut to a length of ¼ inch by a cartridge cutter to obtain chopped threads.

Using a TEX-30α type twin screw extruder (30 mm in screw diameter and L/D=32) (manufactured by Japan Steel Works Co., Ltd.), thermoplastic resin was supplied from the main hopper. Subsequently, the chopped treads were supplied from the side hopper located on the downstream side and then kneaded at a screw rotation speed of 150 rpm at a temperature of 220° C. (in the case of polypropylene-based resin) or 260° C. (in the case of polyamide-6 resin). The supply of chopped threads was adjusted so that the mass content of the chopped threads would be 20% of the total amount of the resulting fiber-reinforced thermoplastic resin composition. After kneading, the strand extruded from a dice mouth of 5 mm in diameter was cooled and then cut by a cutter to obtain a pellet-type molding material.

The pellet-type molding material was injection-molded into a molded product for evaluating the properties using a J350EIII injection-molding apparatus manufactured by Japan Steel Works Co., Ltd. at a cylinder temperature of 220° C. and a mold temperature of 60° C. (in the case of polypropylene resin).

Reference Example 2

Method for Manufacturing Press-Molded Product

A reinforcing fiber bundle was cut to a length of ¼ inch by a cartridge cutter to obtain chopped threads.

To a dispersion solution consisting of water and a surfactant (polyoxyethylene lauryl ether (trade name), manufactured by Nacalai Tesque, Inc.) at a concentration of 0.1 mass %, the chopped threads were added so that the chopped threads would have a fiber content by mass of 0.02 mass %. After preparing a slurry by stirring for 5 minutes, water was removed by aspiration, thereby obtaining a reinforcing fiber substrate of 300 mm in square. Next, from the upper side of the reinforcing fiber substrate, an emulsion liquid containing 1 mass % (meth)acrylic-based polymer was sprayed. The excess emulsion liquid was removed by aspiration and then drying was performed at 200° C. for 15 minutes, thereby obtaining a reinforcing fiber substrate provided with the (meth)acrylic-based polymer. The adhered amount is described in the table.

Thermoplastic resin was put on both the upper and lower sides of the reinforcing fiber substrate provided with the (meth)acrylic-based polymer so that the reinforcing fiber substrate would have a mass content of 30 mass %. Then, it was pressurized at 10 MPa for 3 minutes at 220° C. (in the case of polypropylene-based resin) or 250° C. (in the case of polyamide-6 resin) and then cooled to 50° C. while keeping the pressure. As a result, a press-molded product was obtained.

The evaluation standards obtained in the examples are as follows.

(Evaluation of Interface Shear Strength of Reinforcing Fiber Bundle)

Details of the evaluation were according to Drzal, L. T., Mater. Sci. Eng. A126, 289(1990). One single fiber of 200 cm in length was taken from a reinforcing fiber bundle carrying a (meth)acrylic-based polyer. Then, two sheets of 150-µm-thick resin film of 20×20 cm square were prepared, each of which consisted of 50 weight % of unmodified polypropylene resin (Prime Polypro (registered trademark) J105G, manufactured by Prime Polymer Co., Ltd.) and 50 weight % of acid-modified polypropylene resin (Admer (registered trademark) QB510 manufactured by Mitsui Chemicals Co., Ltd.). Then, the single fiber taken out above was linearly arranged on one of the resin films. The other of the resin films was put on it so that the single fiber is sandwiched between the resin film sheets, and then they were pressed at a pressure of 0.5 MPa at 200° C. for 3 minutes to prepare a sample in which the single fiber was embedded in the resin. The resulting sample was cut to obtain test pieces of 0.2 mm in thickness, 10 mm in width, and 70 mm in length where the single fiber was embedded at the center thereof. Ten test pieces were prepared in the same manner as above.

Using an ordinary tension test jig, the test pieces were set to a test length of 25 mm and subjected to a tension test with a strain rate of 0.5 mm/min. When breakage of the single fiber no longer occurred, the lengths of all the fractions of the single fiber were measured using a transmission-type microscope, and then averaged to obtain an average broken fiber length 1.

The interface shear strength (τ) was determined by the following equation.

$$\tau(\sigma f \cdot d)/(2 \cdot lc)$$

$$lc = (4/3) \cdot 1$$

where 1 (μm) is the average value of the final broken fiber lengths; σf (MPa) is the tensile strength of the single fiber; and d (μm) is the diameter of the single fiber. σf is obtained by the following method on the assumption that the tensile strength distribution of the reinforcing fiber follows the Weibull distribution. That is, the single fibers not yet impregnated with the propylene-based resins were used, and the tensile strengths of the single fibers with a sample length of 5, 25 or 50 mm were obtained according to JIS R 7606. Specifically, a carbon fiber bundle was divided nearly into quarters, and from the four divided bundles, 100 single fibers each were sampled in succession. In this case, the samples were selected as impartially as possible from each divided bundle as a whole. The sampled single fibers were fixed on a perforated mount using an adhesive. The mount having the single fibers fixed thereon was attached to a tensile tester, and a tensile test was performed at a strain rate of 1 mm/min using 100 single fiber samples. From the obtained average tensile strengths, the relational formula between sample lengths and average tensile strengths was obtained by a least square method, and the average tensile strength at a sample length of lc was calculated.

The interface shear strength was evaluated according to the following criterion.
A: 14 MPa or more
B: 13 MPa or more but less than 14 MPa
C: 12 MPa or more but less than 13 MPa
D: less than 12 MPa
(Evaluation of Flexural Strength of Fiber-Reinforced Thermoplastic Resin Composition)

Test pieces were cut out from the resulting molded product and subjected to measurement of flexural strength according to ASTM D-790 (2004). The test pieces were prepared by cutting along four different directions, 0°, +45°, −45°, and 90° directions with respect to a 0° direction which is arbitrary defined. The number of the measurements in each direction was set to n=5, and the average of all the measurement values (n=20) was assumed to represent the flexural strength. The measurement apparatus used was Instron (registered trademark) type 5565 universal tester (manufactured by Instron Japan Co., Ltd.).

The evaluation was carried out based on the flexural strength measurements of the molded products according to the following criterion.
AA: 200 MPa or more
A: 150 MPa or more but less than 200 MPa
B: 130 MPa or more but less than 150 MPa
C: 100 MPa or more but less than 130 MPa
D: less than 100 MPa (Evaluation of Izod Impact Strength (Notched) of Fiber-Reinforced Thermoplastic Resin Composition)

Test pieces were cut out from the resulting molded product and subjected to the measurement of Izod impact strength (notched) according to ASTM D-256 (2004). The test pieces were prepared by cutting along four different directions, 0°, +45°, −45°, and 90° directions with respect to a 0° direction which is arbitrary defined. The number of the measurements in each direction was set to n=5, and the average of all the measurement values (n=20) was defined as Izod impact strength (notched).

The evaluation was carried out based on the flexural strength measurements of the molded product according to the following criterion.
A. 150 J/m or more
B: 120 J/m or more but less than 150 J/m
C: 100 J/m or more but less than 120 J/m
D: less than 100 J/m
(Evaluation of Productive Efficiency of Fiber-Reinforced Thermoplastic Resin Composition)

The time required for production of 10 kg of a fiber-reinforced thermoplastic resin composition was measured and evaluated according to the following criterion.
A: less than 30 min.
B: more than 30 min. but less than 60 min.
C: more than 60 min. but less than 120 min.
D: 120 min or more.
(Evaluation of Reinforcing Fiber Dispersion State in Fiber-Reinforced Thermoplastic Resin Composition)

From arbitrary portions of the resulting reinforcing fiber substrate (A2), 50 mm×50 mm square-shaped pieces were cut out and observed using a microscope. The number of carbon fiber bundles in which 10 or more single carbon fibers were bundled, or insufficiently dispersed, was measured. The measurement was repeated 20 times by the same procedure. The average value of the measurements was used for evaluation in terms of the number of bundles with insufficiently dispersed carbon fibers. The evaluation was carried out according to the following criterion.
A: the number of bundles of insufficiently dispersed carbon fibers is less than 1
B: the number of bundles of insufficiently dispersed carbon fibers is 1 or more but less than 5
C: the number of bundles of insufficiently dispersed carbon fibers is 5 or more but less than 10
D: the number of bundles of insufficiently dispersed carbon fibers is 10 or more
(Evaluation of Specific Strength of Fiber-Reinforced Thermoplastic Resin Composition)

The resulting fiber-reinforced thermoplastic resin composition was cut into 200 mm×200 mm pieces and dried at 120° C. for 1 hour. Four dried sheets of the fiber-reinforced thermoplastic resin composition were stacked, and then subjected to 5-minute press-molding at a pressure of 30 MPa at a temperature of 230° C. in the case where the thermoplastic resin is acid-modified polypropylene resin, a temperature of 250° C. in the case of polyamide-6 resin, or a temperature of 300° C. in the case of PPS resin. Subsequently, they were cooled to 50° C. while the pressure was being kept. As a result, a molded product of 1.0 mm in thickness was obtained. A test piece was cut out from the molded product and subjected to measurement of the specific gravity ρ of the molded product according to ISO 1183 (1987). Subsequently, test pieces were cut out from the molded product and subjected to measurement of the tensile strength of the molded product according to a method of ISO 527-3 (1995). Here, test pieces were prepared by cutting along four different directions at 0°, +45°, −45°, and 90° from a 0° direction which is arbitrary defined. The number of the measurements for each direction was set to n=5, and the average of all the measurement values (n=20) was defined as tensile strength δc. The measurement apparatus used was Instron (registered trademark) type 5565 universal tester 4201 (manufactured by Instron Japan Co., Ltd.). The specific strength of the molded product was calculated from the obtained results using the following equation.

Specific strength of molded product=σc/ρ

The evaluation was carried out based on the specific strength of the molded product according to the following criterion.

AAA: specific strength of 350 MPa or more
AA: strength of 325 MPa or more but less than 350 MPa
A: specific strength of 300 MPa or more but less than 325 MPa
B: specific strength of 275 MPa or more but less than 300 MPa
C: specific strength of 250 MPa or more but less than 275 MPa
D: specific strength of less than 250 MPa (Evaluation of Specific Rigidity of Fiber-Reinforced Thermoplastic Resin Composition)

The resulting fiber-reinforced thermoplastic resin composition was cut out into 200 mm×200 mm pieces and dried at 120° C. for 1 hour. Four dried sheets of the fiber-reinforced thermoplastic resin composition were stacked, and then subjected to 5-minute press-molding at a pressure of 30 MPa at a temperature of 230° C. in the case where the thermoplastic resin is acid-modified polypropylene resin, a temperature of 250° C. in the case of polyamide-6 resin, or a temperature of 300° C. in the case of PPS resin, Subsequently, they were cooled to 50° C. while the pressure was being kept. As a result, a molded product of 1.0 mm in thickness was obtained. A test piece was cut out from the molded product and subjected to measurement of the flexural modulus of the molded product according to a method of ISO 178 (1993). Test pieces were prepared by cutting along four different at 0°, +45°, −45°, and 90° from a 0° direction which is arbitrary defined. The number of the measurements for each direction was set to n=5, and the average of all the measurement values (n=20) was defined as flexural modulus Ec. The measurement apparatus used was Instron (registered trademark) type 5565 universal tester (manufactured by Instron Japan Co., Ltd.). The specific rigidity of the molded product was calculated from the results using the following equation.

Specific rigidity of molded product=$Ec^{1/3}/\rho$ (ρ: Specific gravity of molded product)

The evaluation was carried out based on the specific rigidity of the molded product according to the following criterion.

A: specific rigidity of 2.20 or more
B: specific rigidity of 2.00 or more but less than 2.20
C: specific rigidity of 1.50 or more but less than 2.00
D: specific rigidity of less than 1.50

(Evaluation of Uniformity of Molded Product)

The coefficient of variation (CV value) of the evaluation results for the tensile strength of a molded product was evaluated. The evaluation was carried out based on the variation coefficient (CV value) according to the following criterion.

A: variation coefficient of less than 5
B: variation coefficient of 5 or more but less than 10
C: variation coefficient of 10 or more but less than 15
D: variation coefficient of 15 or more.

(Evaluation of Tensile Strength of Reinforcing Fiber Substrate (A2))

Test pieces of 12.5 mm in width and 200 mm in length were prepared from the reinforcing substrate (A2) by cutting along four different directions at 0°, +45°, −45°, and 90° from a 0° direction which is arbitrary defined. A tensile test was performed at a tensile rate of 1.6 mm/min. The load at break of the reinforcing fiber substrate (A2) was divided by a width of 12.5 mm to determine its tensile strength (N/cm). The number of the measurements for each direction was set to n=5, and the average of all the measurement values (n=20) was assumed to represent the tensile strength.

Example 1-1

An injection-molded product was obtained in a manner described in Reference example 1 using reinforcing fiber A1, (meth)acrylic-based polymer P(1), and thermoplastic resin (acid modified polypropylene resin). The evaluation results are summarized in Table 1-2.

Example 1-2

An injection-molded product was obtained in a manner described in Reference example 1 using reinforcing fiber A1, (meth)acrylic-based polymer P(2), and thermoplastic resin (acid modified polypropylene resin). The evaluation results are summarized in Table 1-2.

Example 1-3

An injection-molded product was obtained in a manner described in Reference example 1 using reinforcing fiber A1, (meth)acrylic-based polymer P(3), and thermoplastic resin (acid modified polypropylene resin). The evaluation results are summarized in Table 1-2.

Example 1-4

An injection-molded product was obtained in a manner described in Reference example 1 using reinforcing fiber A1, (meth)acrylic-based polymer P(4), and thermoplastic resin (acid modified polypropylene resin). The evaluation results are summarized in Table 1-2.

Example 1-5

An injection-molded product was obtained in a manner described in Reference example 1 using reinforcing fiber A1, (meth)acrylic-based polymer P(5), and thermoplastic resin (acid modified polypropylene resin). The evaluation results are summarized in Table 1-3.

Example 1-6

An injection-molded product was obtained in a manner described in Reference example 1 using reinforcing fiber A1, (meth)acrylic-based polymer P(6), and thermoplastic resin (acid modified polypropylene resin). The evaluation results are summarized in Table 1-3, Example 1-7

An injection-molded product was obtained in a manner described in Reference example 1 using reinforcing fiber A1, (meth)acrylic-based polymer P(7), and thermoplastic resin (acid modified polypropylene resin). The evaluation results are summarized in Table 1-3.

Example 1-8

An injection-molded product was obtained in a manner described in Reference example 1 using reinforcing fiber A1, (meth)acrylic-based polymer P(1), and thermoplastic resin (polyamide-6 resin). The evaluation results are summarized in Table 1-3.

Example 1-9

An injection-molded product was obtained in a manner described in Reference example 1 using reinforcing fiber A1, (meth)acrylic-based polymer P(1), and thermoplastic resin (acid modified polypropylene resin). The evaluation results are summarized in Table 1-4.

Example 1-10

An injection-molded product was obtained in a manner described in Reference example 1 using reinforcing fiber A1, (meth)acrylic-based polymer P(1), and thermoplastic resin (acid modified polypropylene resin). The evaluation results are summarized in Table 1-4.

Example 1-11

An injection-molded product was obtained in a manner described in Reference example 1 using reinforcing fiber A2, (meth)acrylic-based polymer P(1), and thermoplastic resin (acid modified polypropylene resin). The evaluation results are summarized in Table 1-4.

Example 1-12

A press-molded product was obtained in a manner described in Reference example 2 using reinforcing fiber A3, (meth)acrylic-based polymer P(1), and thermoplastic resin (acid modified polypropylene resin). The evaluation results are summarized in Table 1-4. Here, the press-molded product comprised randomly oriented reinforcing fibers, and the variation in flexural strength with respect to the measurement direction was small, resulting in better properties compared with the injection-molded products.

Example 1-13

A press-molded product was obtained in a manner described in Reference example 2 using reinforcing fiber A3, (meth)acrylic-based polymer P(1), and thermoplastic resin (polyamide-6 resin). The evaluation results are summarized in Table 1-4. Here, the press-molded product comprised randomly oriented reinforcing fibers, and a variation in flexural strength thereof in the measurement direction was small, resulting in better properties compared with the injection-molded products.

Comparative Example 1-1

An injection-molded product was obtained in a manner described in Reference example 1 using reinforcing fiber A2 and thermoplastic resin (acid modified polypropylene resin) but not using any (meth)acrylic-based polymer. The evaluation results are summarized in Table 1-5.

Comparative Example 1-2

An injection-molded product was obtained in a manner described in Reference example 1 using reinforcing fiber A1, (meth)acrylic-based polymer P(8), and thermoplastic resin (acid modified polypropylene resin). The evaluation results are summarized in Table 2.

Comparative Example 1-3

The injection-molded product was obtained in the way of the statement to reference example 1 using fiber reinforced A1, (meth)acrylic-based polymer P (9), and thermoplastic resin (acid modified polypropylene resin). The evaluation results are summarized in Table 1-5.

Comparative Example 1-4

An injection-molded product was obtained in a manner described in Reference example 1 using reinforcing fiber A1, (meth)acrylic-based polymer P(10), and thermoplastic resin (acid modified polypropylene resin). The evaluation results are summarized in Table 1-5.

Comparative Example 1-5

An injection-molded product was obtained in a manner described in Reference example 1 using reinforcing fiber A1, (meth)acrylic-based polymer P(11), and thermoplastic resin (acid modified polypropylene resin) The evaluation results are summarized in Table 1-6.

Comparative Example 1-6

An injection-molded product was obtained in a manner described in Reference example 1 using reinforcing fiber A1, (meth)acrylic-based polymer P(12), and thermoplastic resin (acid modified polypropylene resin). The evaluation results are summarized in Table 1-6.

Comparative Example 1-7

An injection-molded product was obtained in a manner described in Reference example 1 using reinforcing fiber A1, (meth)acrylic-based polymer P(1), and thermoplastic resin (acid modified polypropylene resin). The evaluation results are summarized in Table 1-6.

Comparative Example 1-8

An injection-molded product was obtained in a manner described in Reference example 1 using reinforcing fiber A1, (meth)acrylic-based polymer P(1), and thermoplastic resin (acid modified polypropylene resin). The evaluation results are summarized in Table 1-6.

TABLE 1-2

|  |  |  | Example 1-1 | Example 1-2 | Example 1-3 | Example 1-4 |
|---|---|---|---|---|---|---|
| Reinforcing fiber | Type | — | Carbon fiber A1 | Carbon fiber A1 | Carbon fiber A1 | Carbon fiber A1 |
|  | Mixing amount | mass % | 19.4 | 19.4 | 19.4 | 19.4 |
|  | Surface oxygen conc. (O/C) | — | 0.10 | 0.10 | 0.10 | 0.10 |
|  | Number of single fibers | Number | 24,000 | 24,000 | 24,000 | 24,000 |
| (meth)acrylic-based polymer | Type | — | P(1) | P(2) | P(3) | P(4) |
|  | Mixing amount | mass % | 0.6 | 0.6 | 0.6 | 0.6 |
| (meth)acrylic-based monomer | MMA | parts by mass | 35 | 35 |  | 29 |
|  | BMA | parts by mass | 54 | 54 | 61 |  |
|  | CHA | parts by mass |  |  |  | 60 |
|  | IBOMA | parts by mass |  |  | 33 |  |
|  | AA (carboxyl group) | parts by mass |  |  |  |  |
|  | MAA (carboxyl group) | parts by mass | 1 | 1 | 1 | 1 |
|  | HEMA (hydroxyll group) | parts by mass | 10 | 10 | 5 | 10 |
|  | MEEU (urea group) | parts by mass |  |  |  |  |
|  | AAm (amide group) | parts by mass |  |  |  |  |
|  | HEAA (amide group) | parts by mass |  |  |  |  |
|  | Others | parts by mass |  |  |  |  |
| Reactive emulsifier | ADEKA REASOAP (ammonium salt sulfonate) | parts by mass | 8 | 0 | 8 | 8 |
|  | Amount of sulfonate | mmol equivalent | 0.08 | 0 | 0.08 | 0.08 |
|  | Cohesive energy density CED | MPa | 408 | 408 | 388 | 416 |
|  | Hydroxyl group number | mgKOH/g | 34 | 34 | 17 | 34 |
|  | Acid number | mgKOH/g | 6.5 | 6.5 | 6.5 | 6.5 |
|  | tan δ | °C. | 67 | 70 | 56 | 52 |
|  | Young's modulus E' | MPa | 240 | 250 | 200 | 260 |
|  | Weight average molecular weight Mw | — | 50,000 | 50,000 | 50,000 | 50,000 |
|  | Amount of (meth)acrylic-based polymer attached to reinforcing fiber | mass % | 3 | 3 | 3 | 3 |
|  | Interface shear strength | — | A | B | C | A |
| Thermoplasitc resin | Type | — | Acid-modified PP | Acid-modified PP | Acid-modified PP | Acid-modified PP |
|  | Mixing amount | mass % | 80 | 80 | 80 | 80 |
| Molded product evaluation (injection molding) | Flexural strength | — | B | C | C | B |
|  | Izod impact strength (notched) | — | A | B | B | B |

TABLE 1-3

|  |  |  | Example 1-5 | Example 1-6 | Example 1-7 | Example 1-8 |
|---|---|---|---|---|---|---|
| Reinforcing fiber | Tyoe | — | Carbon fiber A1 | Carbon fiber A1 | Carbon fiber A1 | Carbon fiber A1 |
|  | Mixing amount (O/C) | mass % | 19.4 | 19.4 | 19.4 | 19.4 |
|  | Surface oxygen conc. (O/C) | — | 0.10 | 0.10 | 0.10 | 0.10 |
|  | Number of single fibers | Number | 24,000 | 24,000 | 24,000 | 24,000 |
| (meth)acrylic-based polymer | Type | — | P(5) | P(6) | P(7) | P(1) |
|  | Mixing amount | mass % | 0.6 | 0.6 | 0.6 | 0.6 |
| (meth)acrylic-based monomer | MMA | parts by mass | 30 | 30 | 30 | 35 |
|  | BMA | parts by mass |  |  |  | 54 |
|  | CHA | parts by mass | 50 | 60 | 50 |  |
|  | IBOMA | parts by mass |  |  |  |  |
|  | AA (carboxyl group) | parts by mass |  |  |  |  |
|  | MAA (carboxyl group) | parts by mass |  |  |  | 1 |
|  | HEMA (hydroxyl group) | parts by mass | 10 |  |  | 10 |
|  | MEEU (urea group) | parts by mass | 10 |  |  |  |
|  | AAm (amide group) | parts by mass |  |  |  |  |
|  | HEAA (amide group) | parts by mass |  | 10 | 20 |  |
|  | Others | parts by mass |  |  |  |  |
| Reactive emulsifier | ADEKA REASOAP (ammonium salt sulfonate) | parts by mass | 8 | 8 | 8 | 8 |
|  | Amount of sulfonate | mmol equivalent | 0.08 | 0.08 | 0.08 | 0.08 |
|  | Cohesive energy density CED | MPa | 427 | 434 | 467 | 408 |
|  | Hydroxyl group number | mgKOH/g | 34 | 35 | 0 | 34 |
|  | Acid number | mgKOH/g | 0 | 0 | 0 | 6.5 |
|  | tan δ | °C. | 68 | 65 | 70 | 67 |
|  | Young's modulus E' | MPa | 280 | 330 | 430 | 240 |
|  | Weight average molecular weight Mw | — | 50,000 | 50,000 | 50,000 | 50,000 |
|  | Amount of (meth)acrylic-based polymer attached to reinforcing fiber | mass % | 3 | 3 | 3 | 3 |
|  | Interface shear strength | — | B | B | C | B |

TABLE 1-3-continued

|  |  |  | Example 1-5 | Example 1-6 | Example 1-7 | Example 1-8 |
|---|---|---|---|---|---|---|
| Thermoplastic resin | Type | — | Acid-modified PP | Acid-modified PP | Acid-modified PP | Ny6 |
|  | Mixing ratio | mass % | 80 | 80 | 80 | 80 |
| Molded product evaluation (injection molding) | Flexural strength | — | B | C | C | A |
|  | Izod impact strength (notched) | — | B | C | B | B |

TABLE 1-4

|  |  |  | Example 1-9 | Example 1-10 | Example 1-11 | Example 1-12 | Example 1-13 |
|---|---|---|---|---|---|---|---|
| Reinforcing fiber | Type | — | Carbon fiber A1 | Carbon fiber A1 | Carbon fiber A2 | Carbon fiber A3 | Carbon fiber A3 |
|  | Mixing amount | mass % | 19.9 | 14 | 14 | 29.1 | 29.1 |
|  | Surface oxygen conc. (O/C) | — | 0.10 | 0.10 | 0.20 | 0.10 | 0.10 |
|  | Number of single fibers | Number | 24,000 | 24,000 | 24,000 | 24,000 | 24,000 |
| (meth)acrylic-based polymer | Type | — | P(1) | P(1) | P(1) | P(1) | P(1) |
|  | Mixing amount | mass % | 0.1 | 6 | 6 | 0.9 | 0.9 |
|  | (meth)acrylic-based monomer — MMA | parts by mass | 35 | 35 | 35 | 35 | 35 |
|  | BMA | parts by mass | 54 | 54 | 54 | 54 | 54 |
|  | CHA | parts by mass |  |  |  |  |  |
|  | IBOMA | parts by mass |  |  |  |  |  |
|  | AA (carboxyl group) | parts by mass |  |  |  |  |  |
|  | MAA (carboxyl group) | parts by mass | 1 | 1 | 1 | 1 | 1 |
|  | HEMA (hydroxyl group) | parts by mass | 10 | 10 | 10 | 10 | 10 |
|  | MEEU (urea group) | parts by mass |  |  |  |  |  |
|  | AAm (amide group) | parts by mass |  |  |  |  |  |
|  | HEAA (amide group) | parts by mass |  |  |  |  |  |
|  | Others | parts by mass |  |  |  |  |  |
|  | Reactive emulsifier ADEKA REASOAP (ammonium salt sulfonate) | parts by mass | 8 | 8 | 8 | 8 | 8 |
|  | Amount of sulfonate | mmol equivalent | 0.08 | 0.08 | 0.08 | 0.08 | 0.08 |
|  | Cohesive energy density CED | MPa | 408 | 408 | 408 | 408 | 408 |
|  | hydroxyl group number | mgKOH/g | 34 | 34 | 34 | 34 | 34 |
|  | acid number | mgKOH/g | 6.5 | 6.5 | 6.5 | 6.5 | 6.5 |
|  | tan δ | °C. | 67 | 67 | 67 | 67 | 67 |
|  | Young's modulus E' | MPa | 240 | 240 | 240 | 240 | 240 |
|  | Weight average molecular weight Mw | — | 50,000 | 50,000 | 50,000 | 50,000 | 50,000 |
|  | Amount of (meth)acrylic-based polymer attached to reinforcing fiber | mass % | 0.5 | 30 | 30 | 3 | 3 |
|  | Interface shear strength | — | A | A | A | A | A |
| Thermoplasitc resin | Type | — | Acid-modified PP | Acid-modified PP | Acid-modified PP | Acid-modified PP | Ny6 |
|  | Mixing amount | mass % | 80 | 80 | 80 | 70 | 70 |
| Molded product evaluation (injection molding) | Flexural strength | — | C | C | A | AA | AA |
|  | Izod impact strength (notched) | — | C | B | A | A | A |

TABLE 1-5

|  |  |  | Comparative example 1-1 | Comparative example 1-2 | Comparative example 1-3 | Comparative example 1-4 |
|---|---|---|---|---|---|---|
| Reinforcing fiber | Type | — | Carbon fiber A1 | Carbon fiber A1 | Carbon fiber A1 | Carbon fiberA1 |
|  | Mixing amount | mass % | 20 | 19.4 | 19.4 | 19.4 |
|  | Surface oxygen conc. (O/C) | — | 0.10 | 0.10 | 0.10 | 0.10 |
|  | Number of single fibers | Number | 24,000 | 24,000 | 24,000 | 24,000 |
| (meth)acrylic-based polymer | Type | — | — | P(8) | P(9) | P(10) |
|  | Mixing amount | mass % | 0 | 0.6 | 0.6 | 0.6 |
|  | (meth)acrylic-based monomer — MMA | parts by mass |  |  |  | 90 |
|  | BMA | parts by mass |  |  |  |  |
|  | CHA | parts by mass |  |  |  |  |
|  | IBOMA | parts by mass |  |  |  |  |

TABLE 1-5-continued

|  |  |  |  | Comparative example 1-1 | Comparative example 1-2 | Comparative example 1-3 | Comparative example 1-4 |
|---|---|---|---|---|---|---|---|
|  |  | AA (carboxyl group) | parts by mass |  | 100 |  |  |
|  |  | MAA (carboxyl group) | parts by mass |  |  |  |  |
|  |  | HEMA (hydroxyl group) | parts by mass |  |  |  |  |
|  |  | MEEU (urea group) | parts by mass |  |  |  |  |
|  |  | AAm (amide group) | parts by mass |  |  | 100 |  |
|  |  | HEAA (amide group) | parts by mass |  |  |  |  |
|  |  | Others | parts by mass |  |  |  | 10 amine-modified |
|  | Reactive emulsifier | ADEKA REASOAP (ammonium salt sulfonate) | parts by mass |  | 8 | 0 | 0 |
|  |  | Amount of sulfonate | mmol equivalent |  | 0.08 | 0 | 0 |
|  | Cohesive energy density CED |  | MPa |  | 575 | 813 | 380 |
|  | hydroxyl group number |  | mgKOH/g |  | 0 | 0 | 0 |
|  | acid number |  | mgKOH/g |  | 3400 | 0 | 0 |
|  | tan δ |  | ° C. |  | 52 | 54 | 50 |
|  | Young's modulus E' |  | MPa |  | 180 | 190 | 190 |
|  | Weight average molecular weight Mw |  | — |  | 50,000 | 10,000 | 50,000 |
|  | Amount of (meth)acrylic-based polymer attached to reinforcing fiber |  | mass % | — | 3 | 3 | 3 |
|  | Interface shear strength |  | — |  | D | D | D |
| Thermoplasitc resin | Type |  | — | — | Acid-modified PP | Acid-modified PP | Acid-modified PP |
|  | Mixing amount |  | mass % |  | 80 | 80 | 80 |
| Molded product evaluation (injection molding) | Flexural strength |  | — | — | D | D | C |
|  | Izod impact strength (notched) |  | — | — | D | D | D |

TABLE 1-6

|  |  |  |  | Comparative example 1-5 | Comparative example 1-6 | Comparative example 1-7 | Comparative example 1-8 |
|---|---|---|---|---|---|---|---|
| Reinforcing fiber | Type |  | — | Carbon fiber A1 | Carbon fiber A1 | Carbon fiber A1 | Carbon fiberA1 |
|  | Mixing amount |  | mass % | 19.4 | 19.4 | 19.94 | 8 |
|  | Surface oxygen conc. (O/C) |  | — | 0.10 | 0.10 | 0.10 | 0.10 |
|  | Number of single fibers |  | Number | 24,000 | 24,000 | 24,000 | 24,000 |
| (meth)acrylic-based polymer | Type |  | — | P(11) | P(12) | P(1) | P(1) |
|  | Mixing amount |  | mass % | 0.6 | 0.6 | 0.06 | 12 |
|  | (meth)acrylic-based monomer | MMA | parts by mass |  |  | 35 | 35 |
|  |  | BMA | parts by mass | 60 | 60 | 54 | 54 |
|  |  | CHA | parts by mass |  |  |  |  |
|  |  | IBOMA | parts by mass | 25 | 36 |  |  |
|  |  | AA (carboxyl group) | parts by mass |  |  |  |  |
|  |  | MAA (carboxyl group) | parts by mass |  | 1 | 1 | 1 |
|  |  | HEMA (hydroxyl group) | parts by mass |  | 3 | 10 | 10 |
|  |  | MEEU (urea group) | parts by mass |  |  |  |  |
|  |  | AAm (amide group) | parts by mass |  |  |  |  |
|  |  | HEAA (amide group) | parts by mass |  |  |  |  |
|  |  | Others | parts by mass | 15 Epox-modified |  |  |  |
|  | Reactive emulsifier | ADEKA REASOAP (ammonium salt sulfonate) | parts by mass | 8 | 8 | 8 | 8 |
|  |  | Amount of sulfonate | mmol equivalent | 0.08 | 0.08 | 0.08 | 0.08 |
|  | Cohesive energy density CED |  | MPa | 380 | 384 | 408 | 408 |
|  | hydroxyl group number |  | mgKOH/g | 0 | 10 | 34 | 34 |
|  | acid number |  | mgKOH/g | 0 | 6.5 | 6.5 | 6.5 |
|  | tan δ |  | ° C. | 45 | 45 | 67 | 67 |
|  | Young's modulus E' |  | MPa | 150 | 160 | 240 | 240 |
|  | Weight average molecular weight Mw |  | — | 50,000 | 50,000 | 50,000 | 50,000 |
|  | Amount of (meth)acrylic-based polymer attached to reinforcing fiber |  | mass % | 3 | 3 | 0.3 | 60 |
|  | Interface shear strength |  | — | D | D | D | C |
| Thermoplasitc resin | Type |  | — | Acid-modified PP | Acid-modified PP | Acid-modified PP | Acid-modified PP |
|  | Mixing amount |  | mass % | 80 | 80 | 80 | 80 |
| Molded product evaluation (injection molding) | Flexural strength |  | — | C | C | D | D |
|  | Izod impact strength (notched) |  | — | D | D | C | C |

As described above, in Examples 1-1 to 1-11, injection-molded products with good mechanical characteristics could be obtained. In addition, the press-molded products obtained in Examples 1-12 and 1-13 showed good results including small variations in flexural strength over the measurement direction range examined.

On the other hand, Comparative example 1-1 resulted in a molded product having inferior mechanical characteristics because of the absence of any (meth)acrylic-based polymer. Comparative examples 1-2 and 1-3 resulted in molded products having poor mechanical characteristics because of an excessive cohesive energy of the (meth)acrylic-based polymer. In addition, Comparative examples 1-4 to 1-6 resulted in molded products having poor mechanical characteristics because of a small cohesive energy density of the (meth)acrylic-based polymer. Furthermore, as in Comparative examples 1-7 and 1-8, an excessively small or an excessively large content of a (meth)acrylic-based polymer also led to molded products with poor mechanical characteristics. Therefore, the mechanical characteristics of the resulting molded products were insufficient in the cases of a (meth)acrylic-based polymer with an excessively large or an excessively small cohesive energy density.

Figure 2:
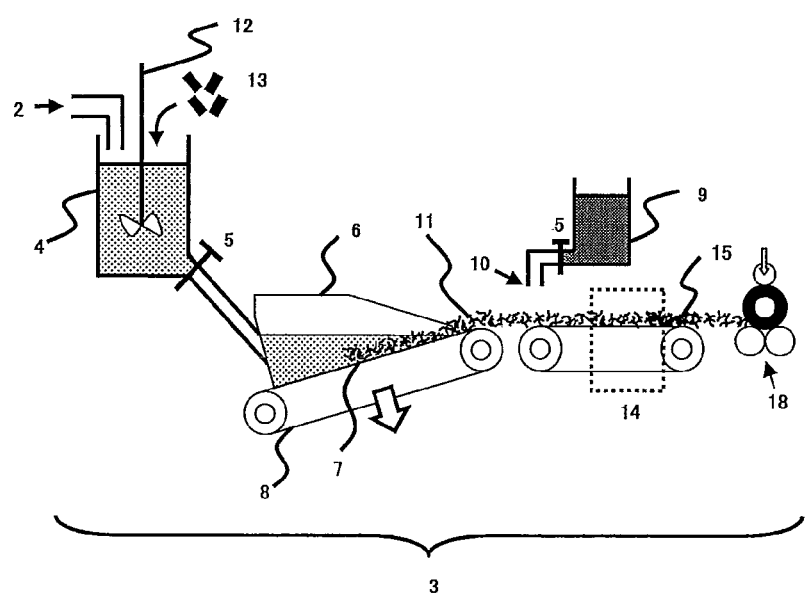
FIG. 2 is a model diagram of an apparatus for manufacturing the reinforcing fiber substrates (A1) and (A2).

(Example 2-1) Production of Fiber-Reinforced Thermoplastic Resin Composition Using Wet Process Reinforcing fiber substrate (A2) was produced using the apparatus 3 illustrated in FIG. 2. The apparatus 3 has a dispersion tank 4, a sheet-forming tank 6, and a supply tank 9. The dispersion tank 4 is a cylindrical container of 500 mm in diameter, and the lower part thereof has an opening cock 5. The sheet-forming tank 6 is provided with a mesh conveyor 8 having a sheet-forming surface 7 of 300 mm in width on the bottom thereof. The supply tank 9 supplies an emulsion of a (meth)acrylic-based polymer to a fiber-reinforced substrate (A1) 11. The supply tank 9 has an opening cock 5. The (meth)acrylic-based polymer emulsion supply part 10 is of a curtain coat type, and is able to spray a (meth)acrylic-based polymer emulsion uniformly on the reinforcing fiber substrate (A1) 11. A stirrer 12 is attached to an opening part of the upper side of the dispersion tank 4, so that reinforcing fiber bundles 13 and a dispersion medium 2 can be introduced from the opening part.

First, reinforcing fiber bundle A3 (carbon fiber) was cut into 6-mm pieces by a cartridge cutter to obtain chopped carbon fibers.

To the dispersion tank 4, a dispersion solution consisting of water and a surfactant (polyoxyethylene lauryl ether (trade name) manufactured by Nacalai Tesque, Inc.) was added to a concentration of 0.1 mass %, and the chopped carbon fibers were then added so that the mass content of the fibers would be 0.02 mass %. After preparing a slurry by stirring for 5 minutes, the opening cock 5 on the lower part of the container was opened to make the slurry flow onto the mesh conveyor 8 having the sheet-forming surface 7 of 300 mm in thickness. Then, water was removed by aspiration to provide a reinforcing fiber substrate (A1) 11 having a length of 15 m and a width of 300 mm. Next, the opening cock 5 of the supply tank 9 was opened, and the 1-mass % emulsion liquid of (meth)acrylic-based polymer B1 was sprayed on the upper surface of the reinforcing fiber substrate (A1). After suctioning the excess amount of the emulsion liquid, the reinforcing fiber substrate was allowed to pass through a baking furnace 14 at 200° C. in 3 minutes, followed by rolling up by a reeler 18. Consequently, a reinforcing fiber substrate (A2) 15 provided with the (meth)acrylic-based polymer B1 was obtained.

Figure 3:
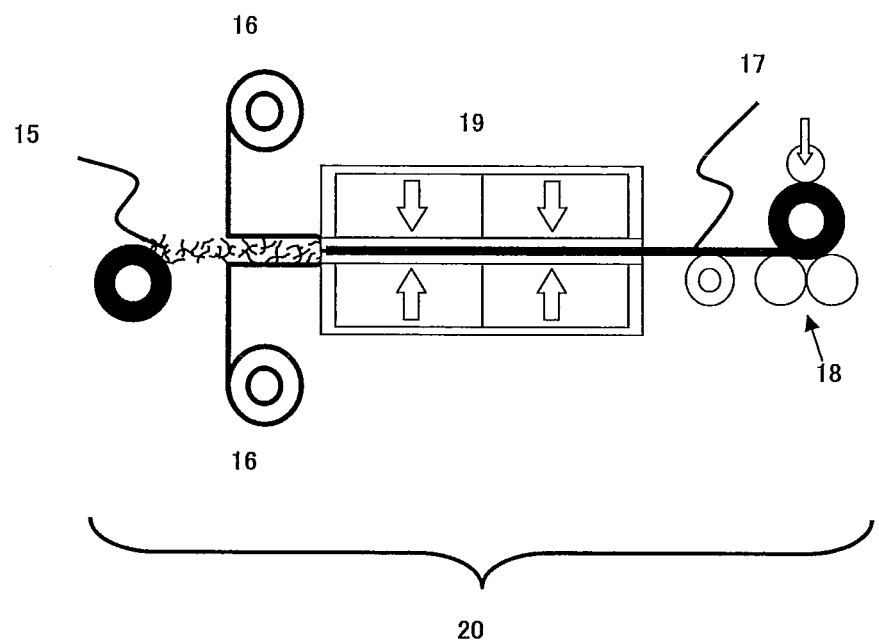
FIG. 3 is a model diagram of an apparatus for manufacturing the fiber-reinforced thermoplastic resin composition.

The resulting reinforcing fiber substrate (A2) 15 was taken out from the manufacturing apparatus 3, and then placed in an apparatus 20 in FIG. 3 provided with a double-belt press device 19 which could be pressurized, heated, and cooled. The apparatus 20 includes a creel 16 for housing nonwoven fabric of thermoplastic resin in two portions, upper and lower, in the introduction part of the double belt press apparatus 19, and also includes a reeler 18 for taking a fiber-reinforced resin composition 17 in which thermoplastic resin is impregnated in the reinforcing fiber substrate (A2) 15.

The nonwoven fabric (weight per unit area: 100 g/m$^2$) of thermoplastic resin (acid modified polypropylene resin) supplied from the creel 16 to the reinforcing fiber substrate (A2) was sandwiched from above and below, and then introduced into the double belt press apparatus 19. In the double belt press apparatus 19, the fabric was heated and pressurized at 230° C. at 3.5 MPa in a first half part thereof and cooled and pressurized at 60° C. at 3.5 MPa in the second half part to obtain a fiber-reinforced thermoplastic resin composition 17 as a composite consisting of the reinforcing fiber substrate (A2) and the thermoplastic resin (acid modified polypropylene resin).

The mixing amounts of the reinforcing fiber bundle, (meth)acrylic-based polymer, and the thermoplastic resin are listed in Table 2-1. In addition, the implementation conditions of the various steps and the results of the evaluation of the reinforcing fiber substrates and the fiber-reinforced thermoplastic resin compositions obtained are listed in Table 2-1.

Example 2-2

Figure 4:
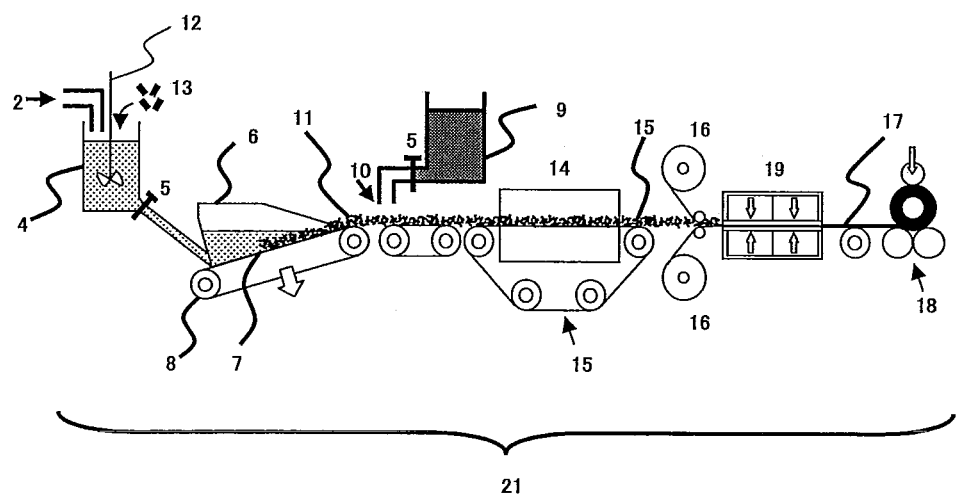
FIG. 4 is a model diagram of an apparatus for manufacturing the reinforcing fiber substrates (A1) and (A2) and the fiber-reinforced thermoplastic resin composition.

Production of Fiber-Reinforced Thermoplastic Resin Composition Using Wet Process A fiber-reinforced thermoplastic resin composition was produced using an apparatus 21 illustrated in FIG. 4. The apparatus 21 is one in which the apparatus 20 was united with the apparatus 3. The fiber-reinforced thermoplastic resin composition was obtained in a manner similar to Example 2-1, except that the apparatus 21 was used, the reinforcing fiber bundles and a dispersion-medium were introduced continuously, and all the steps were performed on-line. The mixing amounts of the respective materials, the implementation conditions of the respective steps, the evaluation results of the resulting reinforcing fiber substrate and the resulting fiber-reinforced thermoplastic resin composition are listed in Table 2-1.

Example 2-3

Production of Fiber-Reinforced Thermoplastic Resin Composition Using Wet Process A fiber-reinforced thermoplastic resin composition was obtained in a manner similar to Example 2-2, except that the mixing amount of the (meth)acrylic-based polymer was 0.4 mass %. The mixing amounts of the respective materials, the implementation conditions of the respective steps, the evaluation results of the resulting reinforcing fiber substrate and the resulting fiber-reinforced thermoplastic resin composition are listed in Table 2-1.

Example 2-4

Figure 5:
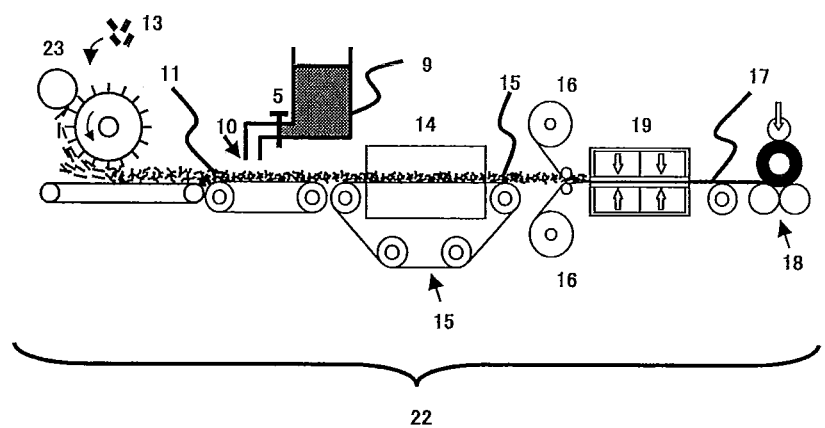
FIG. 5 is a model diagram of an apparatus for manufacturing the reinforcing fiber substrates (A1) and (A2) and the fiber-reinforced thermoplastic resin composition.

Production of Fiber-Reinforced Thermoplastic Resin Composition Using Dry Process A fiber-reinforced thermoplastic resin composition was produced using an apparatus 22 illustrated in FIG. 5. The apparatus 22 is one in which the structure of a sheet-forming part of the apparatus 21 was replaced with a carding apparatus 23. The fiber-reinforced thermoplastic resin composition was obtained in a manner similar to Example 2-2, except that the apparatus 22 was used, reinforcing fiber bundles A4 were continuously introduced as the reinforcing fiber bundles into the carding apparatus 23, and all the steps were performed on-line. The mixing amounts of the respective materials, the implementation conditions of the respective steps, the evaluation results of the resulting reinforcing fiber substrate and the resulting fiber-reinforced thermoplastic resin composition are listed in Table 2-1.

Example 2-5

Production of Fiber-Reinforced Thermoplastic Resin Composition Using Wet Process A fiber-reinforced thermoplastic resin composition was obtained in a manner similar to Example 2-2, except that the concentration of the reinforcing fiber in the slurry in the dispersion tank 4 was 0.04 mass %, the concentration of the reinforcing fiber in the slurry was diluted to 0.02 mass % by continuous supply of the dispersion medium 2 in the sheet-forming tank 6. The mixing amounts of the respective materials, the implementation conditions of the respective steps, the evaluation results of the resulting reinforcing fiber substrate and the resulting fiber-reinforced thermoplastic resin composition are listed in Table 2-2.

Example 2-6

Production of Fiber-Reinforced Thermoplastic Resin Composition Using Wet Process A fiber-reinforced thermoplastic resin composition was obtained in a manner similar to Example 2-2, except that the concentration of the reinforcing fiber in the slurry in the dispersion tank 4 was 1.5 mass %. The mixing amounts of the respective materials, the implementation conditions of the respective steps, the evaluation results of the resulting reinforcing fiber substrate and the resulting fiber-reinforced thermoplastic resin composition are listed in Table 2-2.

Example 2-7

Production of Fiber-Reinforced Thermoplastic Resin Composition Using Wet Process A fiber-reinforced thermoplastic resin composition was obtained by in a manner similar to Example 2-2, except that the concentration of the reinforcing fiber in the slurry in the dispersion tank 4 was 0.1 mass %. The mixing amounts of the respective materials, the implementation conditions of the respective steps, the evaluation results of the resulting reinforcing fiber substrate and the resulting fiber-reinforced thermoplastic resin composition are listed in Table 2-2.

Example 2-8

Production of Fiber-Reinforced Thermoplastic Resin Composition Using Wet Process A fiber-reinforced thermoplastic resin composition was obtained in a manner similar to Example 2-2, except that reinforcing fibers and the cut fibers (3 dtex in single fiber degree and 6 mm in cut length) of thermoplastic resin (acid modified polypropylene resin) were introduced into a slurry in the dispersion tank 4, the concentration of the reinforcing fibers was 0.02 mass % and the concentration of the cut fibers of the thermoplastic resin was 0.03 mass %, the total concentration of solid components was 0.05 mass %, and the introduction to the double belt press apparatus 19 was performed without using any nonwoven fabric of the thermoplastic resin (acid modified polypropylene resin) supplied from the creel 16. The mixing amounts of the respective materials, the implementation conditions of the respective steps, the evaluation results of the resulting reinforcing fiber substrate are listed in Table 2-2.

Example 2-9

Production of Fiber-Reinforced Thermoplastic Resin Composition Using Wet Process A fiber-reinforced thermoplastic resin composition was obtained in a manner similar to Example 2-2, except that (meth)acrylic-based polymer B2 was used as the (meth)acrylic-based polymer. The mixing amounts of the respective materials, the implementation conditions of the respective steps, the evaluation results of the resulting reinforcing fiber substrate and the resulting fiber-reinforced thermoplastic resin composition are listed in Table 2-3.

Example 2-10

Production of Fiber-Reinforced Thermoplastic Resin Composition Using Wet Process A fiber-reinforced thermoplastic resin composition was obtained in a manner similar to Example 2-2, except that (meth)acrylic-based polymer B3 was used as the (meth)acrylic-based polymer. The mixing amounts of the respective materials, the implementation conditions of the respective steps, the evaluation results of the resulting reinforcing fiber substrate and the resulting fiber-reinforced thermoplastic resin composition are listed in Table 2-3.

Example 2-11

Production of Fiber-Reinforced Thermoplastic Resin Composition Using Wet Process A fiber-reinforced thermoplastic resin composition was obtained in a manner similar to Example 2-2, except that reinforcing fiber bundle A5 was used as the reinforcing fiber bundle. The mixing amounts of the respective materials, the implementation conditions of the respective steps, the evaluation results of the resulting reinforcing fiber substrate and the resulting fiber-reinforced thermoplastic resin composition are listed in Table 2-3.

Example 2-12

Production of Fiber-Reinforced Thermoplastic Resin Composition Using Wet Process A fiber-reinforced thermoplastic resin composition was obtained in a manner similar to Example 2-2, except that reinforcing fiber bundle A6 was used as the reinforcing fiber bundle. The mixing amounts of the respective materials, the implementation conditions of the respective steps, the evaluation results of the resulting reinforcing fiber substrate and the resulting fiber-reinforced thermoplastic resin composition are listed in Table 2-3.

Example 2-13

Production of Fiber-Reinforced Thermoplastic Resin Composition Using Wet Process A fiber-reinforced thermoplastic resin composition was obtained in a manner similar to Example 2-2, except that (meth)acrylic-based polymer B4 was used as the (meth)acrylic-based polymer. The mixing amounts of the respective materials, the implementation conditions of the respective steps, the evaluation results of the resulting reinforcing fiber substrate and the resulting fiber-reinforced thermoplastic resin composition are listed in Table 2-4.

Example 2-14

Production of Fiber-Reinforced Thermoplastic Resin Composition Using Wet Process A fiber-reinforced thermoplastic resin was obtained in a manner similar to Example 2-2, except that (meth)acrylic-based polymer B5 was used as the (meth)acrylic-based polymer. The mixing amounts of the respective materials, the implementation conditions of the respective steps, the evaluation results of the resulting reinforcing fiber substrate and the resulting fiber-reinforced thermoplastic resin composition are listed in Table 2-4.

Example 2-15

Production of Fiber-Reinforced Thermoplastic Resin Composition Using Wet Process A fiber-reinforced thermoplastic resin composition was obtained in a manner similar to Example 2-2, except that polyamide-6 resin was used as the thermoplastic resin, the first half part of the double belt press apparatus 19 was set to a temperature of 250° C. The mixing amounts of the respective materials, the implementation conditions of the respective steps, the evaluation results of the resulting reinforcing fiber substrate and the resulting fiber-reinforced thermoplastic resin composition are listed in Table 2-4.

Example 2-16

Production of Fiber-Reinforced Thermoplastic Resin Composition Using Wet Process A fiber-reinforced thermoplastic resin composition was obtained in a manner similar to Example 2-2, except that PPS resin was used as the thermoplastic resin, the first half part of the double belt press apparatus 19 was set to a temperature of 300° C. The mixing amounts of the respective materials, the implementation conditions of the respective steps, the evaluation results of the resulting reinforcing fiber substrate and the resulting fiber-reinforced thermoplastic resin composition are listed in Table 2-4.

Example 2-17

Production of Fiber-Reinforced Thermoplastic Resin Composition Using Dry Process In an apparatus 22 illustrated in FIG. 5, a fiber-reinforced thermoplastic resin composition was obtained in a manner similar to Example 2-4, except that any supply tank 9 for (meth)acrylic-based polymer was not used, and fiber reinforcing fiber bundle A7 previously provided with the (meth)acrylic-based polymer was introduced into the carding apparatus 23. The mixing amounts of the respective materials, the implementation conditions of the respective steps, the evaluation results of the resulting reinforcing fiber substrate and the resulting fiber-reinforced thermoplastic resin composition are listed in Table 2-5.

Example 2-18

Production of Fiber-Reinforced Thermoplastic Resin Composition Using Wet Process In an apparatus 21 illustrated in FIG. 4, Except having used reinforcing fiber bundle A7 which gave the (meth)acrylic-based polymer beforehand not using supply tank 9 of a (meth)acrylic-based polymer, it processed like Example 2-2, and fiber-reinforced thermoplastic resin composition was obtained. The mixing amounts of the respective materials, the implementation conditions of the respective steps, the evaluation results of the resulting reinforcing fiber substrate and the resulting fiber-reinforced thermoplastic resin composition are listed in Table 2-5.

Example 2-19

Figure 7:
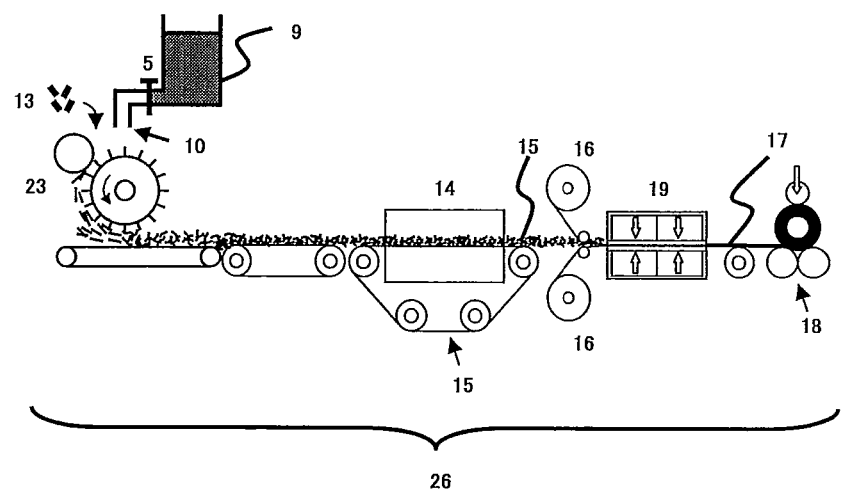
FIG. 7 is a model diagram of an apparatus for manufacturing the reinforcing fiber substrates (A1) and (A2) and the fiber-reinforced thermoplastic resin composition.

Production of Fiber-Reinforced Thermoplastic Resin Composition Using Dry Process A fiber-reinforced molding substrate was produced using an apparatus 26 illustrated in FIG. 7. The apparatus 26 is one in which the supply tank 9 for (meth)acrylic-based polymer emulsion of the apparatus 22 is mounted on the carding apparatus 23 and, simultaneously with the production of the reinforcing fiber substrate (A1), the reinforcing fiber substrate (A1) can be provided with the (meth)acrylic-based polymer. The fiber-reinforced thermoplastic resin composition was obtained in a manner similar to Example 2-4, except that the apparatus 26 was used, and reinforcing fiber bundles A3 were continuously introduced as the reinforcing fiber bundles into the carding apparatus 23. The mixing amounts of the respective materials, the implementation conditions of the respective steps, the evaluation results of the resulting reinforcing fiber substrate and the resulting fiber-reinforced thermoplastic resin composition are listed in Table 2-6.

Example 2-20

Figure 8:
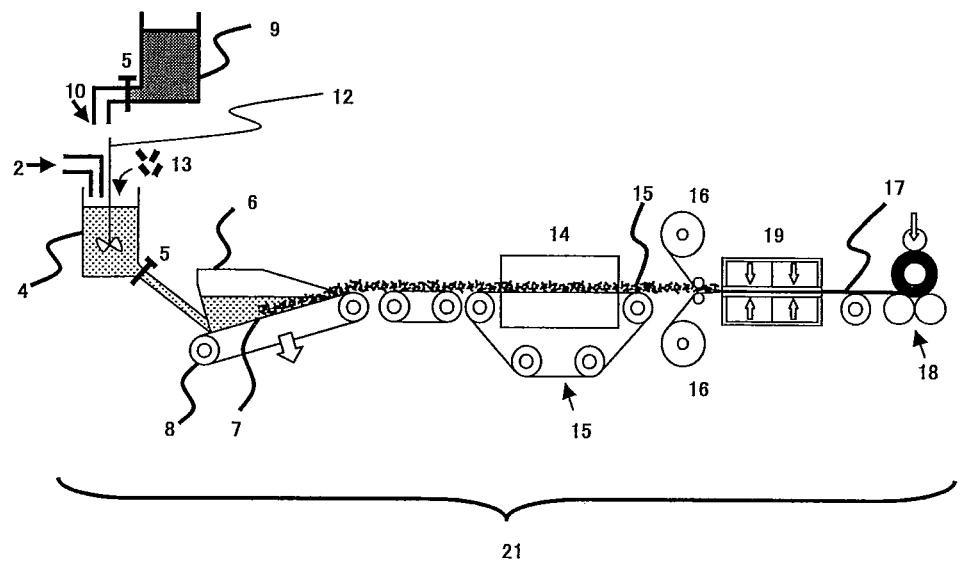
FIG. 8 is a model diagram of an apparatus for manufacturing the reinforcing fiber substrates (A1) and (A2) and the fiber-reinforced thermoplastic resin composition.

Production of Fiber-Reinforced Thermoplastic Resin Composition Using Wet Process A fiber-reinforced molding substrate was produced using an apparatus 27 illustrated in FIG. 8. The apparatus 27 is one in which the supply tank 9 for (meth)acrylic-based polymer emulsion of the apparatus 27 is mounted on the dispersion tank 4. The (meth)acrylic-based polymer can be continuously supplied to the dispersion tank 4 and, simultaneously with the production of the reinforcing fiber substrate (A1), the reinforcing fiber substrate can be provided with the (meth)acrylic-based polymer. A fiber-reinforced thermoplastic resin composition was obtained in a manner similar to Example 2-2, except that the (meth)acrylic-based polymer was continuously supplied to the dispersion tank 4 by using the apparatus 26. The mixing amounts of the respective materials, the implementation conditions of the respective steps, the evaluation results of the resulting reinforcing fiber substrate and the resulting fiber-reinforced thermoplastic resin composition are listed in Table 2-6.

Comparative Example 2-1

Production of Fiber-Reinforced Thermoplastic Resin Composition Using Wet Process A fiber-reinforced thermoplastic resin composition was obtained in manner similar to Example 2-2, except that any (meth)acrylic-based polymer was not used. The mixing amounts of the respective materials, the implementation conditions of the respective steps, the evaluation results of the resulting reinforcing fiber substrate and the resulting fiber-reinforced thermoplastic resin composition are listed in Table 2-7.

Comparative Example 2-2

Production of Fiber-Reinforced Thermoplastic Resin Composition Using Wet Process A fiber-reinforced thermoplastic resin composition was obtained in a manner similar to Example 2-2, except that polyvinyl alcohol B7 was used instead of the (meth)acrylic-based polymer. The mixing amounts of the respective materials, the implementation conditions of the respective steps, the evaluation results of the resulting reinforcing fiber substrate and the resulting fiber-reinforced thermoplastic resin composition are listed in Table 2-7.

Reference Example 2-1

Figure 6:
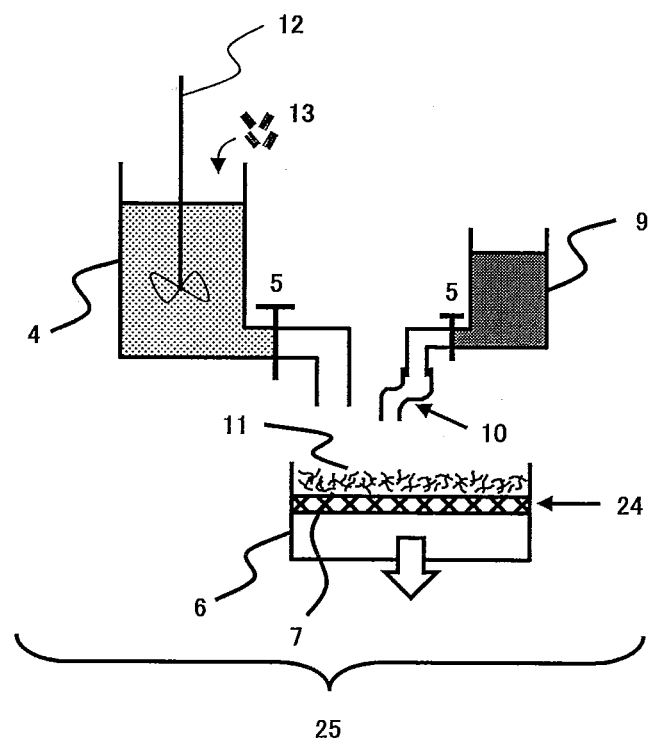
FIG. 6 is a model diagram of an apparatus for manufacturing the reinforcing fiber substrate (A1).

Production of Fiber-Reinforced Thermoplastic Resin Composition Using Wet Process Reinforcing fiber substrate (A2) was produced using an apparatus 25 illustrated in FIG. 6. The apparatus 6 includes a dispersion tank 4, a sheet-forming tank 6, and a supply tank 9. The dispersion tank 4 is a cylindrical container of 500 mm in diameter, and the lower part thereof has an opening cock 5. The sheet-forming tank 6 is provided with a mesh sheet 24 having a sheet-forming surface 7 of 300 mm in square on the bottom thereof. The supply tank 9 supplies an emulsion of (meth)acrylic-based polymer to a fiber-reinforced substrate (A1) 11. The supply tank 9 has an opening cock 5. A (meth)acrylic-based polymer emulsion providing part 10 has a movable type opening cock outlet and is able to sprinkle a (meth)acrylic-based polymer emulsion uniformly on the reinforcing fiber substrate (A1) 11. A stirrer 12 is attached to an opening part of the upper side of the dispersion tank 4, so that reinforcing fiber bundles 13 and a dispersion medium 2 can be introduced from the opening part. Here, the device 6 is a batch-type manufacturing device and cannot take out the reinforcing fiber substrate (A1). The reinforcing fiber substrate (A1) 11 is formed on the sheet-forming surface 7 of the mesh sheet 24, and then provided with a (meth)acrylic-based polymer. The reinforcing fiber substrate 25 provided with (meth)acrylic-based polymer is taken out and placed in a dryer. Consequently, a reinforcing fiber substrate (A2) was obtained.

The nonwoven fabric (weight per unit area 100 g/m$^2$) of acid modified polypropylene resin as a thermoplastic resin was placed one by one on the upper and lower sides of the reinforcing fiber substrate (A2). Then, the fabric was heated at a temperature of 230° C. under a pressure of 3.5 MPa for 5 minutes, and then cooled at a temperature of 60° C. under a pressure of 3.5 MPa for 5 minutes. Consequently, a fiber-reinforcing thermoplastic resin composition having a combination between the reinforcing fiber substrate (A2) and the thermoplastic resin. The mixing amounts of the respective materials, the implementation conditions of the respective steps, the evaluation results of the resulting reinforcing fiber substrate and the resulting fiber-reinforced thermoplastic resin composition are listed in Table 2-7.

Reference Example 2-2

Production of Fiber-Reinforced Thermoplastic Resin Composition Using Wet Process A fiber-reinforced thermoplastic resin composition was obtained in a manner similar to Example 2-2, except that (meth)acrylic-based polymer B6 was used as the (meth)acrylic-based polymer. The mixing amounts of the respective materials, the implementation conditions of the respective steps, the evaluation results of the resulting reinforcing fiber substrate and the resulting fiber-reinforced thermoplastic resin composition are listed in Table 2-7.

TABLE 2-1

| | | | Example 2-1 | Example 2-2 | Example 2-3 | Example 2-4 |
|---|---|---|---|---|---|---|
| Raw materials | Reinforcing fiber bundle | Type | A3 | A3 | A3 | A4 |
| | | Cut length [mm] | 6 | 6 | 6 | 6 |
| | | Mixing amount [mass %] | 40 | 40 | 40 | 40 |
| | (meth)acrylic-based polymer | Type | B1 | B1 | B1 | B1 |
| | | Cohesive energy density CED [MPa] | 408 | 408 | 408 | 408 |
| | | Mixing amount [mass %] | 2 | 2 | 0.4 | 2 |
| | Thermoplasitc resin | Type | Acid-modified polypropylene | Acid-modified polypropylene | Acid-modified polypropylene | Acid-modified polypropylene |
| | | Structure | Nonfabric | Nonfabric | Nonfabric | Nonfabric |
| | | Mixing amount [mass %] | 58 | 58 | 59.6 | 58 |

TABLE 2-1-continued

|  |  |  | Example 2-1 | Example 2-2 | Example 2-3 | Example 2-4 |
|---|---|---|---|---|---|---|
| Process conditions | Step 1a | Substrate-formation process | Wet process | Wet process | Wet process | Dry process |
|  |  | Conc. of solid component in slurry [mass %] | 0.02 | 0.02 | 0.02 | — |
|  |  | Concentration ratio C1/C2 | 1.0 | 1.0 | 1.0 | — |
|  |  | Reinforcing fiber weight per unit area [g/m$^2$] | 100 | 100 | 100 | 100 |
|  |  | Moisture content of reinforcing fiber substrate (A1)[mass %] | 8 | 8 | 8 | 0 |
|  |  | Reinforcing fiber/solid content [mass %] | 100 | 100 | 100 | 100 |
|  | Step 2a | Heating after providing (meth)acrylic-based polymer | Present | Present | Present | Present |
|  |  | take-off speed [m/min] | 5 | 5 | 2 | 5 |
|  |  | Tensile strength [N/cm] | 7 | 7 | 0.5 | 7 |
|  | Step 3a | Pressurization step | Present | Present | Present | Present |
|  |  | Heating step | Present | Present | Present | Present |
|  |  | Cooling step | Present | Present | Present | Present |
|  | Step 4a | Take-off step | Present | Present | Present | Present |
|  |  | take-off speed [m/min] | 5 | 5 | 2 | 5 |
|  | On-line step |  | Step 1a-Step 2a-Step 3a-Step 4a | Step 1a-Step 2a-Step 3a-Step 4a | Step 1a-Step 2a-Step 3a-Step 4a | Step 1a-Step 2a-Step 3a-Step 4a |
|  | Off-line step |  | Step 2a-Step 3a | — | — | — |
| Evaluation | Production efficiency | ABCD | B | A | B | A |
|  | Dispersion state of reinforcing fiber | ABCD | A | A | A | C |
|  | specific strength | ABCD | A | A | B | C |
|  | specific rigidity | ABCD | A | A | A | A |
|  | Uniformity of molded product | ABCD | A | A | A | C |

TABLE 2-2

|  |  |  | Example 2-5 | Example 2-6 | Example 2-7 | Example 2-8 |
|---|---|---|---|---|---|---|
| Raw materials | Reinforcing fiber bundle | Type | A3 | A3 | A3 | A3 |
|  |  | Cut length [mm] | 6 | 6 | 6 | 6 |
|  |  | Mixing amount [mass %] | 40 | 40 | 40 | 40 |
|  | (meth)acrylic-based polymer | Type | B1 | B1 | B1 | B1 |
|  |  | Cohesive energy density CED [MPa] | 408 | 408 | 408 | 408 |
|  |  | Mixing amount [mass %] | 2 | 2 | 2 | 2 |
|  | Thermoplasitc resin | Type | Acid-modified polypropylene | Acid-modified polypropylene | Acid-modified polypropylene | Acid-modified polypropylene |
|  |  | Structure | Nonfabric | Nonfabric | Nonfabric | Cut fiber |
|  |  | Mixing amount [mass %] | 58 | 58 | 58 | 58 |
| Process conditions | Step 1a | Substrate-formation process | Wet process | Wet process | Wet process | Wet process (mixed resin fiber sheet) |
|  |  | Conc. of solid component in slurry [mass %] | 0.04 | 1.5 | 0.1 | 0.05 |
|  |  | Concentration ratio C1/C2 | 2.0 | 1.0 | 1.0 | 1.0 |
|  |  | Reinforcing fiber weight per unit area [g/m$^2$] | 100 | 100 | 100 | 100 |
|  |  | Moisture content of reinforcing fiber substrate (A1) [mass %] | 8 | 8 | 8 | 8 |
|  |  | Reinforcing fiber/solid content [mass %] | 100 | 100 | 100 | 41 |
|  | Step 2a | Heating after providing (meth)acrylic-based polymer | Present | Present | Present | Present |
|  |  | take-off speed [m/min] | 3 | 5 | 5 | 5 |
|  |  | Tensile strength [N/cm] | 7 | 7 | 7 | 7 |
|  | Step 3a | Pressurization step | Present | Present | Present | Present |
|  |  | Heating step | Present | Present | Present | Present |
|  |  | Cooling step | Present | Present | Present | Present |
|  | Step 4a | Take-off step | Present | Present | Present | Present |
|  |  | take-off speed [m/min] | 3 | 5 | 5 | 5 |
|  | On-line step |  | Step 1a-Step 2a-Step 3a-Step 4a | Step 1a-Step 2a-Step 3a-Step 4a | Step 1a-Step 2a-Step 3a-Step 4a | Step 1a-Step 2a-Step 3a-Step 4a |
|  | Off-line step |  | — | — | — | — |

TABLE 2-2-continued

|  |  |  | Example 2-5 | Example 2-6 | Example 2-7 | Example 2-8 |
|---|---|---|---|---|---|---|
| Evaluation | Production efficiency | ABCD | B | A | A | A |
|  | Dispersion state of reinforcing fiber | ABCD | B | C | B | C |
|  | specific strength | ABCD | B | C | B | B |
|  | specific rigidity | ABCD | A | A | A | A |
|  | Uniformity of molded product | ABCD | B | B | B | B |

TABLE 2-3

|  |  |  | Example 2-9 | Example 2-10 | Example 2-11 | Example 2-12 |
|---|---|---|---|---|---|---|
| Raw materials | Reinforcing fiber bundle | Type | A3 | A3 | A5 | A6 |
|  |  | Cut length [mm] | 6 | 6 | 6 | 6 |
|  |  | Mixing amount [mass %] | 40 | 40 | 40 | 40 |
|  | (meth)acrylic-based polymer | Type | B2 | B3 | B1 | B1 |
|  |  | Cohesive energy density CED [MPa] | 384 | 416 | 408 | 408 |
|  |  | Mixing amount [mass %] | 2 | 0.4 | 2 | 2 |
|  | Thermoplastic resin | Type | Acid-modified polypropylene | Acid-modified polypropylene | Acid-modified polypropylene | Acid-modified polypropylene |
|  |  | Structure | Nonfabric | Nonfabric | Nonfabric | Nonfabric |
|  |  | Mixing amount [mass %] | 58 | 59.6 | 58 | 58 |
| Process conditions | Step 1a | Substrate-formation process | Wet process | Wet process | Wet process | Wet process |
|  |  | Conc. of sold component in slurry [mass %] | 0.02 | 0.02 | 0.02 | 0.02 |
|  |  | Concentration ratio C1/C2 | 1.0 | 1.0 | 1.0 | 1.0 |
|  |  | Reinforcing fiber weight per unit area [g/m$^2$] | 100 | 100 | 100 | 100 |
|  |  | Moisture content of reinforcing fiber substrate (A1) [mass %] | 8 | 8 | 8 | 8 |
|  |  | Reinforcing fiber/solid content [mass %] | 100 | 100 | 100 | 100 |
|  | Step 2a | Heating after providing (meth)acrylic-based polymer | Present | Present | Present | Present |
|  |  | take-off speed [m/min] | 5 | 1 | 5 | 5 |
|  |  | Tensile strength [N/cm] | 7 | 1 | 7 | 7 |
|  | Step 3a | Pressurization step | Present | Present | Present | Present |
|  |  | Heating step | Present | Present | Present | Present |
|  |  | Cooling step | Present | Present | Present | Present |
|  | Step 4a | Take-off step | Present | Present | Present | Present |
|  |  | take-off speed [m/min] | 5 | 1 | 5 | 5 |
|  | On-line step |  | Step 1a-Step 2a-Step 3a-Step 4a | Step 1a-Step 2a-Step 3a-Step 4a | Step 1a-Step 2a-Step 3a-Step 4a | Step 1a-Step 2a-Step 3a-Step 4a |
|  | Off-line step |  | — | — | — | — |
| Evaluation | Production efficiency | ABCD | A | C | A | A |
|  | Dispersion state of reinforcing fiber | ABCD | A | A | A | A |
|  | specific strength | ABCD | C | A | AA | B |
|  | specific rigidity | ABCD | A | A | A | C |
|  | Uniformity of molded product | ABCD | A | A | A | A |

TABLE 2-4

|  |  |  | Example 2-13 | Example 2-14 | Example 2-15 | Example 2-16 |
|---|---|---|---|---|---|---|
| Raw materials | Reinforcing fiber bundle | Type | A3 | A3 | A3 | A3 |
|  |  | Cut length [mm] | 6 | 6 | 6 | 6 |
|  |  | Mixing amount [mass %] | 40 | 40 | 40 | 40 |
|  | (meth)acrylic-based polymer | Type | B4 | B5 | B1 | B1 |
|  |  | Cohesive energy density CED [MPa] | 427 | 467 | 408 | 408 |
|  |  | Mixing amount [mass %] | 2 | 2 | 2 | 2 |
|  | Thermoplasitc resin | Type | Acid-modified polypropylene | Acid-modified polypropylene | Polyamide 6 | PPS |
|  |  | Structure | Nonfabric | Nonfabric | Nonfabric | Nonfabric |
|  |  | Mixing amount [mass %] | 58 | 58 | 58 | 58 |

TABLE 2-4-continued

|  |  |  | Example 2-13 | Example 2-14 | Example 2-15 | Example 2-16 |
|---|---|---|---|---|---|---|
| Process conditions | Step 1a | Substrate-formation process | Wet process | Wet process | Wet process | Wet process |
|  |  | Conc. of solid component in slurry [mass %] | 0.02 | 0.02 | 0.02 | 0.02 |
|  |  | Concentration ratio C1/C2 | 1.0 | 1.0 | 1.0 | 1.0 |
|  |  | Reinforcing fiber weight per unit area [g/m$^2$] | 100 | 100 | 100 | 100 |
|  |  | Moisture content of reinforcing fiber substrate (A1) [mass %] | 8 | 8 | 8 | 8 |
|  |  | Reinforcing fiber/solid content [mass %] | 100 | 100 | 100 | 100 |
|  | Step 2a | Heating after providing (meth) acrylic-based polymer | Present | Present | Present | Present |
|  |  | take-off speed [m/min] | 5 | 5 | 5 | 5 |
|  |  | Tensile strength [N/cm] | 7 | 7 | 7 | 7 |
|  | Step 3a | Pressurization step | Present | Present | Present | Present |
|  |  | Heating step | Present | Present | Present | Present |
|  |  | Cooling step | Present | Present | Present | Present |
|  | Step 4a | Take-off step | Present | Present | Present | Present |
|  |  | take-off speed [m/min] | 5 | 5 | 5 | 5 |
|  | On-line step |  | Step 1a-Step 2a-Step 3a-Step 4a | Step 1a-Step 2a-Step 3a-Step 4a | Step 1a-Step 2a-Step 3a-Step 4a | Step 1a-Step 2a-Step 3a-Step 4a |
|  | Off-line step |  | — | — | — | — |
| Evaluation | Production efficiency | ABCD | A | A | A | A |
|  | Dispersion state of reinforcing fiber | ABCD | A | A | A | A |
|  | specific strength | ABCD | B | B | AAA | AAA |
|  | specific rigidity | ABCD | A | B | B | B |
|  | Uniformity of molded product | ABCD | A | A | A | A |

TABLE 2-5

|  |  |  | Example 2-17 | Example 2-18 |
|---|---|---|---|---|
| Raw materials | Reinforcing bundle fiber | Type | A7 | A7 |
|  |  | Cut length [mm] | 6 | 6 |
|  |  | Mixing amount [mass %] | 40 | 40 |
|  | (meth)acrylic-based polymer | Type | B1 | B1 |
|  |  | Cohesive energy density CED [MPa] | 408 | 408 |
|  |  | Mixing amount [mass %] | 0.2 | 0.15 |
|  | Thermoplastic resin | Type | Acid-modified polypropylene | Acid-modified polypropylene |
|  |  | Structure | Nonfabric | Nonfabric |
|  |  | Mixing amount [mass %] | 59.8 | 59.85 |
| Process conditions | Step 1b | Substrate-formation process | Dry process | Wet process |
|  |  | Conc. of solid component in slurry [mass %] | — | 0.02 |
|  |  | Concentration ratio C1/C2 | — | 1.0 |
|  |  | Reinforcing fiber weight per unit area [g/m$^2$] | 100 | 100 |
|  |  | Moisture content of reinforcing fiber substrate (A1) [mass %] | 0 | 8 |
|  |  | Reinforcing fiber/solid content [mass %] | 100 | 100 |
|  |  | Heating after providing (meth)acrylic-based polymer | — | — |
|  |  | take-off speed [m/min] | 5 | 5 |
|  |  | Tensile strength [N/cm] | 7 | 7 |
|  | Step 2b | Pressurization step | Present | Present |
|  |  | Heating step | Present | Present |
|  |  | Cooling step | Present | Present |
|  | Step 3b | Take-off step | Present | Present |
|  |  | take-off speed [m/min] | 5 | 5 |
|  | On-line step |  | Step 1b | Step 1b-Step 2b-Step 3b |
|  | Off-line step |  | — | — |

TABLE 2-5-continued

|  |  |  | Example 2-17 | Example 2-18 |
|---|---|---|---|---|
| Evaluation | Production efficiency | ABCD | A | A |
|  | Dispersion state of reinforcing fiber | ABCD | C | C |
|  | specific strength | ABCD | C | B |
|  | specific rigidity | ABCD | A | A |
|  | Uniformity of molded product | ABCD | C | C |

TABLE 2-6

|  |  |  | Example 2-19 | Example 2-20 |
|---|---|---|---|---|
| Raw materials | Reinforcing fiber bundle | Type | A3 | A3 |
|  |  | Cut length [mm] | 6 | 6 |
|  |  | Mixing amount [mass %] | 40 | 40 |
|  | (meth)acrylic-based polymer | Type | B1 | B1 |
|  |  | Cohesive energy density CED [MPa] | 408 | 408 |
|  |  | Mixing amount [mass %] | 2 | 0.8 |
|  | Thermoplasitc resin | Type | Acid-modified polypropylene | Acid-modified polypropylene |
|  |  | Structure | Nonfabric | Nonfabric |
|  |  | Mixing amount [mass %] | 58 | 58 |
| Process conditions | Step 1c | Substrate-formation process | (Dry type) | Wet process |
|  |  | Conc. of solid component in slurry [mass %] | — | 0.02 |
|  |  | Concentration ratio C1/C2 | — | 1.0 |
|  |  | Reinforcing fiber weight per unit area [g/m²] | 100 | 100 |
|  |  | Moisture content of reinforcing fiber substrate (A1) [mass %] | — | 8 |
|  |  | Reinforcing fiber/solid content [mass %] | 100 | 100 |
|  |  | Heating after providing (meth)acrylic-based polymer | Present | Present |
|  |  | take-off speed [m/min] | 5 | 5 |
|  |  | Tensile strength [N/cm] | 7 | 7 |
|  | Step 2c | Pressurization step | Present | Present |
|  |  | Heating step | Present | Present |
|  |  | Cooling step | Present | Present |
|  | Step 3c | Take-off step | Present | Present |
|  |  | take-off speed [m/min] | 5 | 5 |
|  | On-line step |  | Step 1c-Step 2c-Step 3c | Step 1c-Step 2c-Step 3c |
|  | Off-line step |  | — | — |
| Evaluation | Production efficiency | ABCD | A | A |
|  | Dispersion state of reinforcing fiber | ABCD | C | B |
|  | specific strength | ABCD | C | B |
|  | specific rigidity | ABCD | A | A |
|  | Uniformity of molded product | ABCD | C | B |

TABLE 2-7

|  |  |  | Comparative example 2-1 | Comparative example 2-2 | Reference example 2-1 | Reference example 2-2 |
|---|---|---|---|---|---|---|
| Raw materials | Reinforcing fiber bundle | Type | A3 | A3 | A3 | A3 |
|  |  | Cut length [mm] | 6 | 6 | 6 | 6 |
|  |  | Mixing amount [mass %] | 40 | 40 | 40 | 40 |
|  | (meth)acrylic-based polymer | Type | — | B7 | B1 | B6 |
|  |  | Cohesive energy density CED [MPa] | — | 790 | 405 | 392 |
|  |  | Mixing amount [mass %] | — | 2 | 2 | 2 |
|  | Thermoplastic resin | Type | Acid-modified polypropylene | Acid-modified polypropylene | Acid-modified polypropylene | Acid-modified polypropylene |
|  |  | Structure | Nonfabric | Nonfabric | Nonfabric | Nonfabric |
|  |  | Mixing amount [mass %] | 60 | 59.6 | 58 | 59.6 |

TABLE 2-7-continued

|  |  |  | Comparative example 2-1 | Comparative example 2-2 | Reference example 2-1 | Reference example 2-2 |
|---|---|---|---|---|---|---|
| Process conditions | Step 1a | Substrate-formation process | Wet process | Wet process | Wet process | Wet process |
|  |  | Conc. of solid component in slurry [mass %] | 0.02 | 0.02 | 0.02 | 0.02 |
|  |  | Concentration ratio C1/C2 | 1.0 | 1.0 | 1.0 | 1.0 |
|  |  | Reinforcing fiber weight per unit area [g/m²] | 100 | 100 | 100 | 100 |
|  |  | Moisture content of reinforcing fiber substrate (A1) [mass %] | 8 | 8 | 8 | 8 |
|  |  | Reinforcing fiber/solid content [mass %] | 100 | 100 | 100 | 100 |
|  | Step 2a | Heating after providing (meth)acrylic-based polymer | Present | Present | Present | Present |
|  |  | take-off speed [m/min] | unable to take off | 5 | — | 5 |
|  |  | Tensile strength [N/cm] | 0.1 | 7 | — | 7 |
|  | Step 3a | Pressurization step | Present | Present | Present | Present |
|  |  | Heating step | Present | Present | Present | Present |
|  |  | Cooling step | Present | Present | Present | Present |
|  | Step 4a | Take-off step | Present | Present | — | Present |
|  |  | take-off speed [m/min] | — | 5 | — | 5 |
|  | On-line step |  | Step 1a-Step 2a-Step 3a-Step 4a | Step 1a-Step 2a Step 3a-Step 4a | Step 1a-Step 2a | Step 1a-Step 2a-Step 3a-Step 4a |
|  | Off-line step |  | — | — | Step 3a-Step 4a | — |
| Evaluation | Production efficiency | ABCD | unable to take off | A | D | A |
|  | Dispersion state of reinforcing fiber | ABCD | — | A | A | A |
|  | specific strength | ABCD | — | D | A | D |
|  | specific rigidity | ABCD | — | A | A | A |
|  | Uniformity of molded product | ABCD | — | A | A | A |

As is evident from Tables 2-1 to 2-7, each of Examples 2-1 to 2-20 could provide a fiber-reinforced thermoplastic resin composition that allows carbon fibers to be brought into a good dispersion state in a short time and keeps high mechanical characteristics even after being processed into a molded product. In particular, a fiber-reinforced thermoplastic resin composition having good mechanical characteristics even after being processed into a molded product could be efficiently produced by carrying out all the steps on-line while continuously introducing raw materials before carrying out the supply of a (meth)acrylic-based polymer (see Examples 2-2, 2-18, and 2-20). In addition, it is revealed that C1/C2 in the range of 0.8 to 1.2 could lead to a better dispersion state of reinforcing fibers and improvement in mechanical characteristics of the resulting molded product (see Examples 2-2 and 2-5).

In addition, the reinforcing fiber substrate could not take out in the case where no (meth)acrylic-based polymer was used (Comparative Example 2-1). Furthermore, the resulting molded product had extremely poor mechanical characteristics when polyvinyl alcohol was used instead of a (meth)acrylic-based polymer.

INDUSTRIAL APPLICABILITY

The fiber-reinforced thermoplastic resin composition and the reinforcing fiber bundle of the present invention can be used in various applications. It is particularly suitable for automobile parts like various modules such as instrumental panels, door beams, under covers, lamp housings, pedal housings, radiator supports, spare tire covers, and front ends; parts of electric and electronic apparatuses such as laptop computers, cell phones, digital still cameras, PDAs, and plasma displays; and parts of household and office electric appliances such as telephone sets, facsimiles, VTRs, copiers, television sets, electronic ovens, acoustic devices, toiletries, laser discs, refrigerators, and air conditioners; parts of civil engineering and construction; and aircraft parts. Among them, it is more preferably used in parts of electronic apparatuses and automobiles.

DESCRIPTION OF NOTATIONS

1 Reinforcing fiber
2 Dispersion medium
3 Manufacturing apparatus for reinforcing fiber substrates (A1) and (A2)
4 Dispersion tank
5 Opening cock
6 Sheet-forming tank
7 Sheet-forming surface
8 Mesh conveyor
9 Supply tank of (meth)acrylic-based polymer
10 (Meth)acrylic-based polymer emulsion supply part
11 Reinforcing fiber substrate (A)
12 Stirrer
13 Reinforcing fiber bundle
14 Dryer
15 Fiber-reinforced substrate (A2)
16 Creel
17 Fiber-reinforced thermoplastic resin composition
18 Reeler
19 Double-belt press apparatus
20 Manufacturing apparatus for fiber-reinforced thermoplastic resin composition
21 Manufacturing apparatus for fiber reinforcing fiber substrates (A1) and (A2) and fiber-reinforced thermoplastic resin composition
22 Manufacturing apparatus for fiber reinforcing fiber substrates (A1) and (A2) and fiber-reinforced thermoplastic resin composition
23 Carding device 24 Mesh sheet
25 Manufacturing apparatus for fiber reinforcing fiber substrates (A1) and (A2) and fiber-reinforced thermoplastic resin composition
26 Manufacturing apparatus for reinforcing fiber substrate (A1)

The invention claimed is:

1. A fiber-reinforced thermoplastic resin composition comprising:
   0.1 to 10 mass % of a (meth)acrylic-based polymer,
   1 to 70 mass % of carbon fiber as reinforcing fiber, and
   20 to 98.9 mass % of polypropylene as a thermoplastic resin,
   wherein the (meth)acrylic-based polymer has, in a side chain, at least one functional group selected from a hydroxyl group, a carboxyl group, an amide group, and an urea group, and has a cohesive energy density (CED) of 385 to 550 MPa as calculated by the following equation:

$$CED=1.15\times\Sigma\{P(n)\times CE(n)\}/\Sigma\{P(n)\times M(n)\}$$

wherein assuming that the (meth)acrylic-based polymer contains m types of (meth)acrylic-based monomer units and that each of the (meth)acrylic-based monomer units is referred to as (meth)acrylic-based monomer unit (n) with n being an integer of from one to m, $CE(n)$ denotes the cohesive energy calculated from chemical structure $CS(n)$ of (meth)acrylic-based monomer unit (n), $M(n)$ denotes the molecular weight of (meth)acrylic-based monomer unit (n), and $P(n)$ denotes the molar fraction of (meth)acrylic-based monomer unit (n) in the (meth)acrylic-based polymer, then $$\Sigma P(n)=1,$$

wherein the (meth)acrylic-based polymer contains 0 to 5 mass % of a (meth)acrylic-based monomer unit having a carboxyl group, 3 to 25 mass % of a (meth)acrylic-based monomer unit having a hydroxyl group, and 70 to 97 mass % of (meth)acrylic acid alkyl ester unit having an alkyl group with 1 to 4 carbon atoms.

2. The fiber-reinforced thermoplastic resin composition according to claim 1, wherein the (meth)acrylic-based polymer contains one or more (meth)acrylic-based monomer units selected from a 2-hydroxyethyl methacrylate unit, N-(2-hydroxyethyl) acrylic amide unit, and N-(2-methacryloyl oxyethyl) ethylene urea unit.

3. A fiber-reinforced thermoplastic resin composition comprising:
   0.1 to 10 mass % of a (meth)acrylic-based polymer,
   1 to 70 mass % of carbon fiber as reinforcing fiber, and
   20 to 98.9 mass % of polypropylene as a thermoplastic resin,
   wherein the (meth)acrylic-based polymer has, in a side chain, at least one functional group selected from a hydroxyl group, a carboxyl group, an amide group, and an urea group, and has a cohesive energy density (CED) of 385 to 550 MPa as calculated by the following equation:

$$CED=1.15\times\Sigma\{P(n)\times CE(n)\}/\Sigma\{P(n)\times M(n)\}$$

wherein assuming that the (meth)acrylic-based polymer contains m types of (meth)acrylic-based monomer units and that each of the (meth)acrylic-based monomer units is referred to as (meth)acrylic-based monomer unit (n) with n being an integer of from one to m, $CE(n)$ denotes the cohesive energy calculated from chemical structure $CS(n)$ of (meth)acrylic-based monomer unit (n), $M(n)$ denotes the molecular weight of (meth)acrylic-based monomer unit (n), and $P(n)$ denotes the molar fraction of (meth)acrylic-based monomer unit (n) in the (meth)acrylic-based polymer, then $\Sigma P(n)=1$,
   wherein of all the (meth)acrylic-based monomer units in the (meth)acrylic-based polymer, and the (meth)acrylic-based monomer units in which an acryloyloxy group or a methacryloyloxy group is bonded to a hydrogen and/or a primary carbon atom, account for 60 mass % or more.

4. The fiber-reinforced thermoplastic resin composition according to claim 1, wherein the (meth)acrylic-based polymer has a hydroxyl group in a side chain, and has a hydroxyl value of 10 to 100 mgKOH/g.

5. The fiber-reinforced thermoplastic resin composition according to claim 1, wherein the (meth)acrylic-based polymer has a carboxyl group in a side chain, and has an acid value of 1 to 10 mgKOH/g.

6. The fiber-reinforced thermoplastic resin composition according to claim 1, wherein the thermoplastic resin is a modified polyolefin resin containing at least one functional group selected from a carboxyl group, acid anhydride group, and epoxy group.

7. A reinforcing fiber bundle to which a (meth)acrylic-based polymer is attached comprising a (meth)acrylic-based polymer attached to reinforcing carbon fibers, wherein the (meth)acrylic-based polymer contains hydroxyl groups, has a cohesive energy density (CED) of 385 to 550 MPa as calculated by the equation given below, and accounts for 0.1 to 30 mass %;

$$CED=1.15\times\Sigma\{P(n)\times CE(n)\}/\Sigma\{P(n)\times M(n)\}$$

wherein assuming that the (meth)acrylic-based polymer contains m types of (meth)acrylic-based monomer units and that each of the (meth)acrylic-based monomer units is referred to as (meth)acrylic-based monomer unit (n) with n being an integer of from one to m, $CE(n)$ denotes the cohesive energy calculated from chemical structure $CS(n)$ of (meth)acrylic-based monomer unit (n), $M(n)$ denotes the molecular weight of (meth)acrylic-based monomer unit (n), and $P(n)$ denotes the molar fraction of (meth)acrylic-based monomer unit (n) in the (meth)acrylic-based polymer, then $$\Sigma P(n)=1.$$

8. The reinforcing fiber bundle to which a (meth)acrylic-based polymer is attached according to claim 7, wherein the (meth)acrylic-based polymer contains 0 to 5 mass % of a (meth)acrylic-based monomer unit having a carboxyl group, 3 to 25 mass % of a (meth)acrylic-based monomer unit having a hydroxyl group, and 70 to 97 mass % of (meth)acrylic acid alkyl ester unit having an alkyl group with 1 to 4 carbon atoms.

* * * * *